US012585386B2

(12) United States Patent
Kim et al.

(10) Patent No.: US 12,585,386 B2
(45) Date of Patent: Mar. 24, 2026

(54) MEMORY DEVICE WITH COMPUTATION FUNCTION AND OPERATION METHOD THEREOF

(71) Applicant: SAMSUNG ELECTRONICS CO., LTD., Suwon-si (KR)

(72) Inventors: Chinam Kim, Suwon-si (KR); Do-Han Kim, Suwon-si (KR); Changmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/441,475

(22) Filed: Feb. 14, 2024

(65) Prior Publication Data

US 2025/0044941 A1 Feb. 6, 2025

(30) Foreign Application Priority Data

Aug. 2, 2023 (KR) ........................ 10-2023-0101019

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC .............................. G06F 3/0659; G06F 3/0673
USPC ........................................................ 711/105
See application file for complete search history.

(56) References Cited

U.S. PATENT DOCUMENTS

| 5,822,268 A | 10/1998 | Kirihata | |
| 5,905,690 A * | 5/1999 | Sakurai | ............ G01R 31/31701 |
| | | | 365/201 |
| 6,205,533 B1 | 3/2001 | Margolus | |
| 6,333,894 B1 * | 12/2001 | Nakayama | ............... G11C 8/12 |
| | | | 365/220 |
| 9,836,277 B2 | 12/2017 | Guz et al. | |

(Continued)

FOREIGN PATENT DOCUMENTS

| KR | 10-2020-0059153 A | 5/2020 |
| KR | 10-2020-0079059 A | 7/2020 |

OTHER PUBLICATIONS

Ravi Hosamani et al., "Design and Analysis of 1-Bit SRAM", International Journal of Engineering Research and Technology (IJERT), vol. 9, Issue 9, pp. 220-224, Sep. 2020.

*Primary Examiner* — Gautam Sain
(74) *Attorney, Agent, or Firm* — Sughrue Mion, PLLC

(57) ABSTRACT

A memory device with a computation function includes a first cell array including first memory cells connected to word lines, a second cell array including second memory cells connected to the word lines, a first bit line sense amplifier that sense first voltages of first bit lines connected to the first memory cells, a second bit line sense amplifier that senses second voltages of second bit lines connected to the second memory cells, a first column selection circuit that outputs a first output signal among the first voltages based on a first column compute selection signal, a second column selection circuit that outputs a second output signal among the second voltages based on a second column compute selection signal different from the first column compute selection signal, and a column compute control circuit that generates the first column compute selection signal and the second column compute selection signal.

19 Claims, 35 Drawing Sheets

100

(56)     References Cited

U.S. PATENT DOCUMENTS

| | | | |
|---|---|---|---|
| 9,959,246 B2 | 5/2018 | Moudgill et al. | |
| 2002/0015328 A1* | 2/2002 | Dono | G11C 16/0441 |
| | | | 365/185.08 |
| 2004/0205429 A1* | 10/2004 | Yoshida | G11C 29/26 |
| | | | 714/718 |
| 2008/0151678 A1* | 6/2008 | Ikeda | G11C 8/12 |
| | | | 711/E12.003 |
| 2009/0034334 A1* | 2/2009 | Furuyama | G11C 16/12 |
| | | | 365/185.11 |
| 2010/0074039 A1* | 3/2010 | Kondo | G11C 29/44 |
| | | | 365/219 |
| 2010/0177582 A1* | 7/2010 | Kim | G11C 11/4096 |
| | | | 365/207 |
| 2017/0243623 A1 | 8/2017 | Kirsch et al. | |
| 2018/0033479 A1* | 2/2018 | Lea | G11C 7/1036 |
| 2020/0202200 A1 | 6/2020 | Son et al. | |
| 2021/0132908 A1 | 5/2021 | Wang | |
| 2021/0357538 A1 | 11/2021 | Colombo et al. | |
| 2022/0398032 A1 | 12/2022 | Jeong et al. | |

* cited by examiner

| LUT0 | | | | | |
|---|---|---|---|---|---|
| IN | | | | OUT | |
| [0] | [1] | [2] | [3] | [0] | [1] |
| 0 | 0 | 0 | 0 | 1 | 0 |
| 0 | 0 | 0 | 1 | 0 | 1 |
| 0 | 0 | 1 | 0 | 0 | 1 |
| 0 | 0 | 1 | 1 | 1 | 1 |
| 0 | 1 | 0 | 0 | 1 | 0 |
| 0 | 1 | 0 | 1 | 0 | 1 |
| 0 | 1 | 1 | 0 | 0 | 1 |
| 0 | 1 | 1 | 1 | 1 | 1 |
| 1 | 0 | 0 | 0 | 1 | 0 |
| 1 | 0 | 0 | 1 | 0 | 1 |
| 1 | 0 | 1 | 0 | 0 | 1 |
| 1 | 0 | 1 | 1 | 1 | 1 |
| 1 | 1 | 0 | 0 | 0 | 0 |
| 1 | 1 | 0 | 1 | 1 | 0 |
| 1 | 1 | 1 | 0 | 1 | 0 |
| 1 | 1 | 1 | 1 | 0 | 1 |

| LUT1,LUT2,LUT3 | | | | | |
|---|---|---|---|---|---|
| IN | | | | OUT | |
| [0] | [1] | [2] | [3] | [0] | [1] |
| 0 | 0 | 0 | 0 | 0 | 0 |
| 0 | 0 | 0 | 1 | 1 | 0 |
| 0 | 0 | 1 | 0 | 1 | 0 |
| 0 | 0 | 1 | 1 | 0 | 1 |
| 0 | 1 | 0 | 0 | 0 | 0 |
| 0 | 1 | 0 | 1 | 1 | 0 |
| 0 | 1 | 1 | 0 | 1 | 0 |
| 0 | 1 | 1 | 1 | 0 | 1 |
| 1 | 0 | 0 | 0 | 0 | 0 |
| 1 | 0 | 0 | 1 | 1 | 0 |
| 1 | 0 | 1 | 0 | 1 | 0 |
| 1 | 0 | 1 | 1 | 0 | 1 |
| 1 | 1 | 0 | 0 | 1 | 0 |
| 1 | 1 | 0 | 1 | 0 | 1 |
| 1 | 1 | 1 | 0 | 0 | 1 |
| 1 | 1 | 1 | 1 | 1 | 1 |

FIG. 7

| Input (Column Register, CCSL) | | | | | | Output(IOSA) | | | | | | | |
|---|---|---|---|---|---|---|---|---|---|---|---|---|---|
| [0] | [1] | [2] | [3] | [4] | [5] | [0] | [1] | [2] | [3] | [4] | [5] | [6] | [7] |
| 0 | 0 | 0 | 0 | 0 | 0 | x00 | x01 | x02 | x03 | x04 | x05 | x06 | x07 |
| 0 | 0 | 0 | 0 | 0 | 1 | x10 | x11 | x12 | x13 | x14 | x15 | x16 | x17 |
| 0 | 0 | 0 | 0 | 1 | 0 | x20 | x21 | x22 | x23 | x24 | x25 | x26 | x27 |

⋮ ⋮

| 1 | 1 | 1 | 1 | 1 | 0 | x620 | x621 | x622 | x623 | x624 | x625 | x626 | x627 |
| 1 | 1 | 1 | 1 | 1 | 1 | x630 | x631 | x632 | x633 | x634 | x635 | x636 | x637 |

MEMORY DEVICE WITH COMPUTATION FUNCTION AND OPERATION METHOD THEREOF

CROSS-REFERENCE TO RELATED APPLICATION

This application claims priority under 35 U.S.C. § 119 to Korean Patent Application No. 10-2023-0101019 filed on Aug. 2, 2023, in the Korean Intellectual Property Office, the disclosure of which being incorporated by reference herein in its entirety.

BACKGROUND

Devices, apparatuses, and methods consistent with the present disclosure relate to a semiconductor memory, and more particularly, to a memory device with a computation function and an operation method thereof.

A semiconductor memory may be classified as a volatile memory, which loses data stored therein when a power is turned off, such as, for example, a static random access memory (SRAM) or a dynamic random access memory (DRAM), or as a nonvolatile memory, which retains data stored therein even when a power is turned off, such as, for example, a flash memory, a phase-change RAM (PRAM), a magnetic RAM (MRAM), a resistive RAM (RRAM), or a ferroelectric RAM (FRAM).

Because a response speed and an operation speed of the DRAM are fast, the DRAM is widely used as a main memory of a system. Under control of a host, a related art DRAM stores data or outputs data stored therein. Nowadays, there is being developed a DRAM device that includes an internal processor performing a portion of a computing operation of the host (e.g., a CPU) as internal processing. The internal processing may make it possible to reduce the burden of the computing operation of the host, and thus, the overall performance of the system may be improved. However, the internal processing requires a separate processor or a separate arithmetic logic unit.

SUMMARY

It is an aspect to provide a memory device that provides a computation function while improving performance and reducing costs, and an operation method thereof.

According to an aspect of one or more embodiments, there is provided a memory device with a computation function, the memory device comprising a first cell array including first memory cells connected to a plurality of word lines; a second cell array including second memory cells connected to the plurality of word lines; a first bit line sense amplifier configured to sense first voltages of first bit lines connected to the first memory cells, and output the first voltages; a second bit line sense amplifier configured to sense second voltages of second bit lines connected to the second memory cells, and output the second voltages; a first column selection circuit configured to output a first output signal among the first voltages output by the first bit line sense amplifier based on a first column compute selection signal; a second column selection circuit configured to output a second output signal among the second voltages output by the second bit line sense amplifier based on a second column compute selection signal different from the first column compute selection signal; and a column compute control circuit configured to generate the first column compute selection signal and the second column compute selection signal.

According to another aspect of one or more embodiments, there is provided an operation method of a memory device with a computation function, the operation method comprising loading an input operand; setting a plurality of column registers based on the input operand; performing a first internal read operation on memory cells of the memory device with respect to a first word line based on a plurality of first column compute selection signals respectively generated from the plurality of column registers; updating the plurality of column registers and an output register based on a result of the first internal read operation; and performing a second internal read operation on the memory cells of the memory device with respect to the first word line based on a plurality of second column compute selection signals respectively generated from the plurality of column registers that have been updated.

According to yet another aspect of one or more embodiments, there is provided a memory device with a computation function, the memory device comprising a first cell array configured to store a first computation output pattern; a first bit line sense amplifier configured to sense first voltages of first bit lines connected to the first cell array, and output the first voltages; a first column selection circuit configured to output a first output signal among the first voltages output by the first bit line sense amplifier based on a first column compute selection signal; and a first column compute control circuit configured to generate the first column compute selection signal based on an input operand, wherein, as an internal read operation on the first computation output pattern is repeatedly performed, the first column compute control circuit updates the first column compute selection signal.

According to yet another aspect of one or more embodiments, there is provided an operation method of a controller configured to control a memory device with a computation function, the operation method comprising transmitting, to the memory device, a load command that instructs the memory device to load an input operand to the memory device; transmitting, to the memory device, a setup command that instructs the memory device to set a column compute control circuit of the memory device based on the input operand; transmitting an execution command that instructs the memory device to perform a computing operation on the input operand to the memory device such that an internal read operation is repeatedly performed in the memory device; and transmitting, to the memory device, a store command that instructs the memory device to store a result of the computing operation in the memory device.

According to yet another aspect of one or more embodiments, there is provided a memory device with a computation function, the memory device comprising a first bank including a plurality of first memory cells; and a second bank including a plurality of second memory cells. The first bank includes a first column selection circuit configured to output a first output signal among outputs of the plurality of first memory cells based on a first column compute selection signal; and a first column compute control circuit configured to generate the first column compute selection signal based on an input operand. The second bank includes a second column selection circuit configured to output a second output signal among outputs of the plurality of second memory cells based on a second column compute selection signal; and a second column compute control circuit configured to generate the second column compute selection signal based on the input operand. As an internal read operation is performed with respect to the plurality of first memory cells and the plurality of second memory cells, the first column selection circuit updates the first column compute selection signal based on the first output signal, and the second column selection circuit updates the second column compute selection signal based on the second output signal and information fed forward from the first column compute control circuit.

According to yet another aspect of one or more embodiments, there is provided a memory device with a computation function, the memory device comprising a cell array including memory cells connected to a plurality of word lines, a plurality of column registers configured according to an input operand, and an output register. The memory device is configured to perform a first internal read operation on the memory cells with respect to a first word line of the plurality of word lines based on a plurality of first column compute selection signals respectively generated from the plurality of column registers, update the plurality of column registers and the output register based on a result of the first internal read operation, and perform a second internal read operation on the memory cells with respect to the first word line based on a plurality of second column compute selection signals respectively generated from the plurality of column registers that have been updated.

BRIEF DESCRIPTION OF THE FIGURES

The above and other aspects will become apparent by describing in detail embodiments thereof with reference to the accompanying drawings, in which:

FIGS. 2A and 2B are diagrams for describing a read operation of a memory device, according to an embodiment;

FIGS. 3A to 3C are diagrams for describing a lookup table-based bit-serial computation, according to an embodiment;

FIG. 7 is a diagram for describing an example of a computation output pattern of the memory device of FIG. 1, according to an embodiment;

FIGS. 10 and 11 are diagrams for describing a computing operation of a cluster unit of the memory device of FIG. 9, according to an embodiment;

FIG. 21 is a block diagram illustrating a memory controller of a host of the memory system of FIG. 13, according to an embodiment;

DETAILED DESCRIPTION

Below, various embodiments will be described in detail such that one of ordinary skill in the art may easily carry out the various embodiments.

Figure 1:
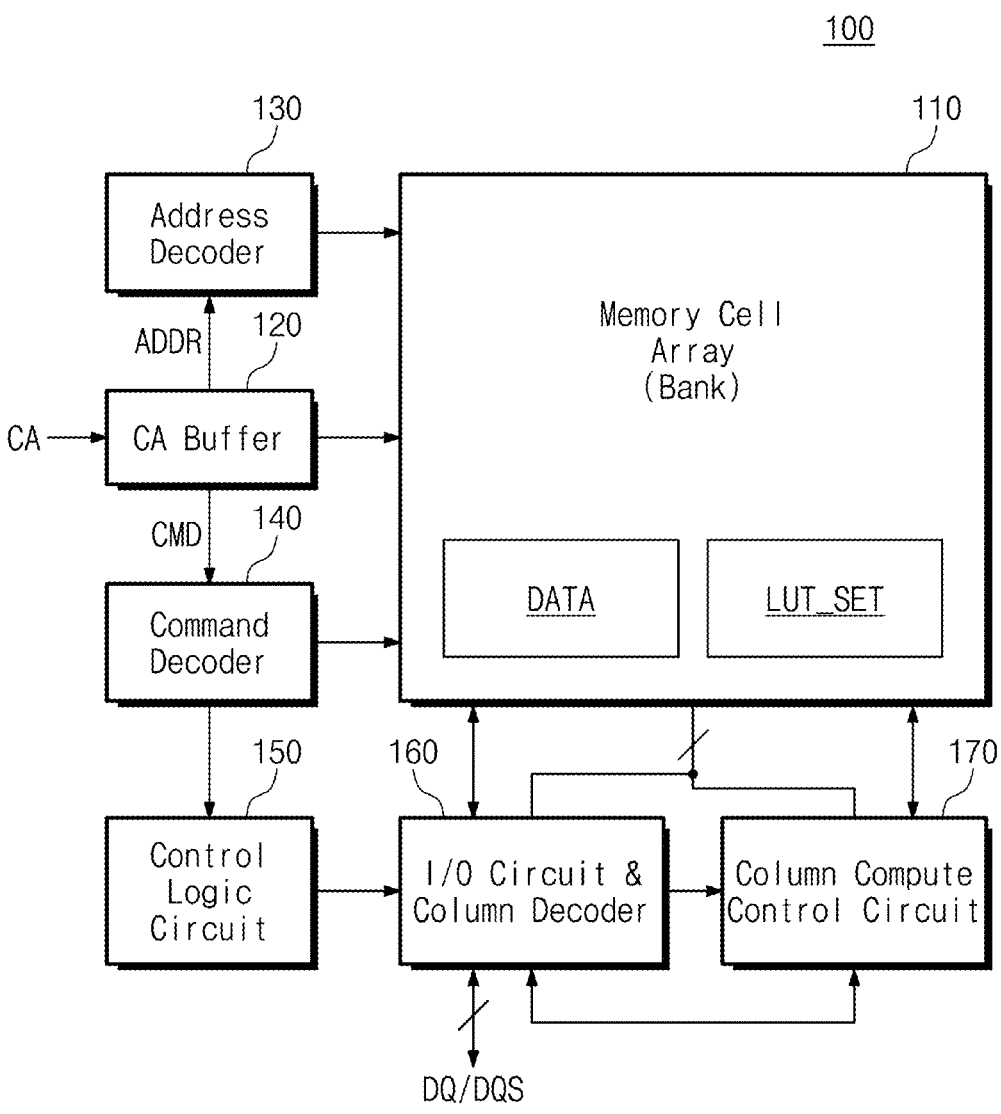
FIG. 1 is a block diagram illustrating a memory device according to an embodiment.

FIG. 1 is a block diagram illustrating a memory device according to an embodiment. Referring to FIG. 1, a memory device 100 may include a memory cell array 110, a command and address (CA) buffer 120, an address decoder 130, a command decoder 140, a control logic circuit 150, an input/output (I/O) circuit and column decoder 160, and a column compute control circuit 170.

The memory cell array 110 may include a plurality of memory cells. The plurality of memory cells may be connected to word lines and bit lines. In an embodiment, each of the plurality of memory cells may be a dynamic random access memory (DRAM) cell that includes an access transistor and a storage capacitor. However, embodiments are not limited thereto. In an embodiment, the memory cell array 110 may include various components (e.g., a word line driver, a bit line sense amplifier, and/or a column selection circuit) for controlling the plurality of memory cells, the word lines, or the bit lines. A configuration of the memory cell array 110 will be described in further detail below with reference to the drawings.

The CA buffer 120 may receive a command/address signal CA from an external device (e.g., a memory controller). The CA buffer 120 may be configured to buffer the received signals. In an embodiment, the signals buffered by the CA buffer 120 may include a command CMD and an address ADDR.

The address decoder 130 may receive the address ADDR from the CA buffer 120 and may decode the received address ADDR. Based on an address decoding result, the address decoder 130 may provide a row address to the memory cell array 110 (or, in some embodiments, a row driver) and may provide a column address to the input/output circuit and column decoder 160.

The command decoder 140 may receive the command CMD from the CA buffer 120 and may decode the received command CMD. The command decoder 140 may provide a command decoding result to the control logic circuit 150.

The control logic circuit 150 may control an overall operation of the memory device 100 based on the command decoding result from the command decoder 140. While FIG. 1 illustrates an embodiment in which the control logic circuit 150 is connected to the command decoder 140 and the I/O circuit and column decoder 160, in some embodiments, the control logic circuit 150 may also be connected to the other components of the memory device 100.

The input/output (I/O) circuit and column decoder 160 may be connected to the memory cell array 110 through the bit lines. The input/output circuit and column decoder 160 may control the bit lines based on the column address from the address decoder 130. The input/output circuit and column decoder 160 may receive data "DATA" from the external device (e.g., a memory controller) through a data signal DQ and a data strobe signal DQS and may store the received data "DATA" in the memory cell array 110. In an embodiment, the input/output circuit and column decoder 160 may receive the data "DATA" from the memory cell array 110 and may provide the received data "DATA" to the external device (e.g., a memory controller) through the data signal DQ and the data strobe signal DQS.

As described above, under control of the external device (e.g., a memory controller), the memory device 100 may store the data "DATA" or may output the stored data "DATA".

In an embodiment, the memory device 100 may provide a computation function. For example, the memory device 100 may perform various computing operations under control of the external device (e.g., a memory controller), and the memory device 100 may store a result of a computing operation in the memory device 100 or may provide the result of the computing operation to the external device (or a memory controller). In detail, the memory cell array 110 of the memory device 100 may be configured to store a computation output pattern LUT_SET, which will be described in more detail below.

When the memory device 100 performs the computing operation, memory cells in which the computation output pattern LUT_SET is stored may be activated. In this case, the column compute control circuit 170 may control the column selection circuit of the memory cell array 110 based on input operands. Specific values may be selected and output from the computation output pattern LUT_SET through the operation of the column compute control circuit 170, and a combination of the selected specific values may correspond to a computation result of the input operands. In an embodiment, the column compute control circuit 170 may support a lookup table-based bit-serial computation function. A structure and an operation of the memory device 100 according to various embodiments will be described in detail with reference to the drawings.

Figure 2A:
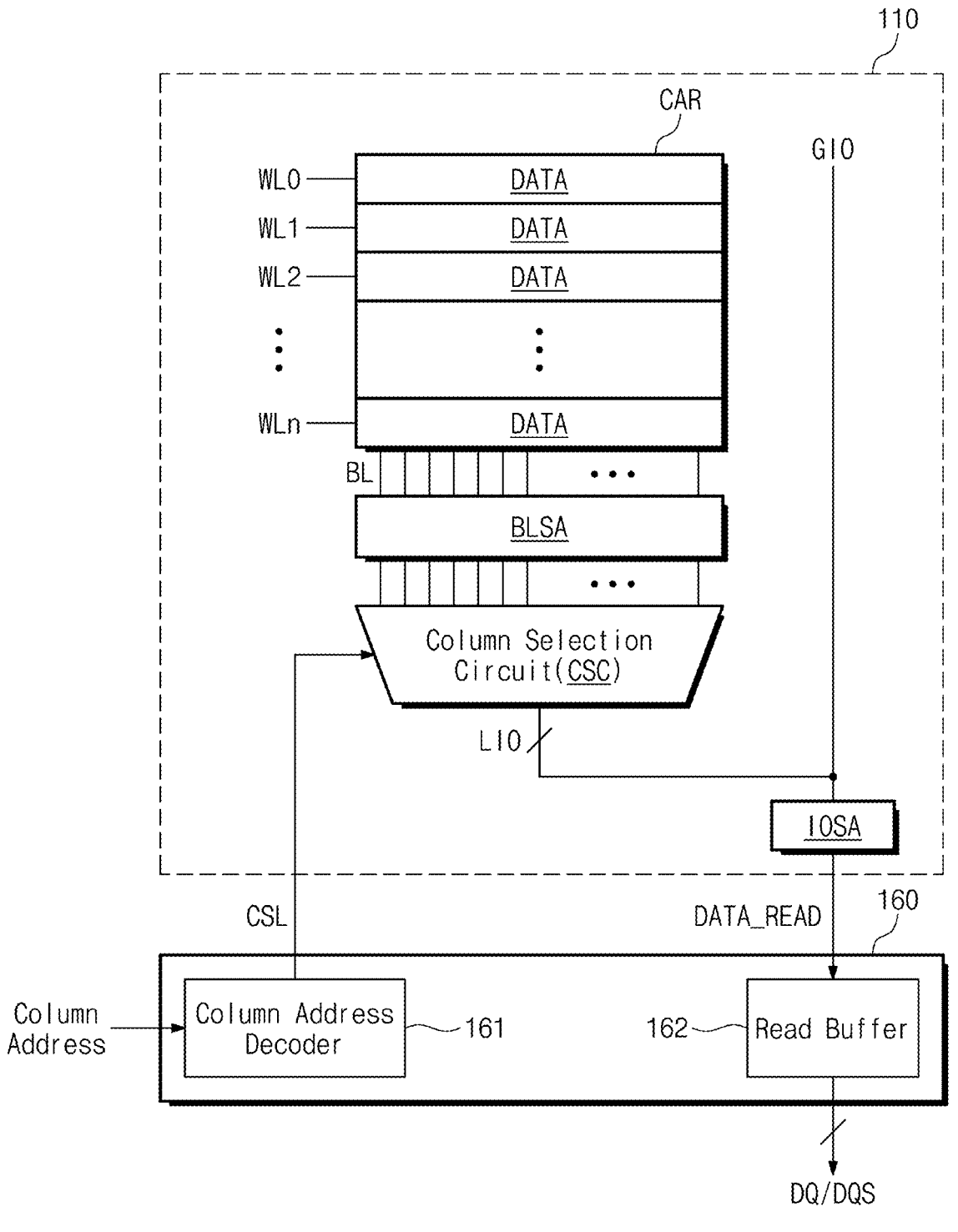
Figure 2B:
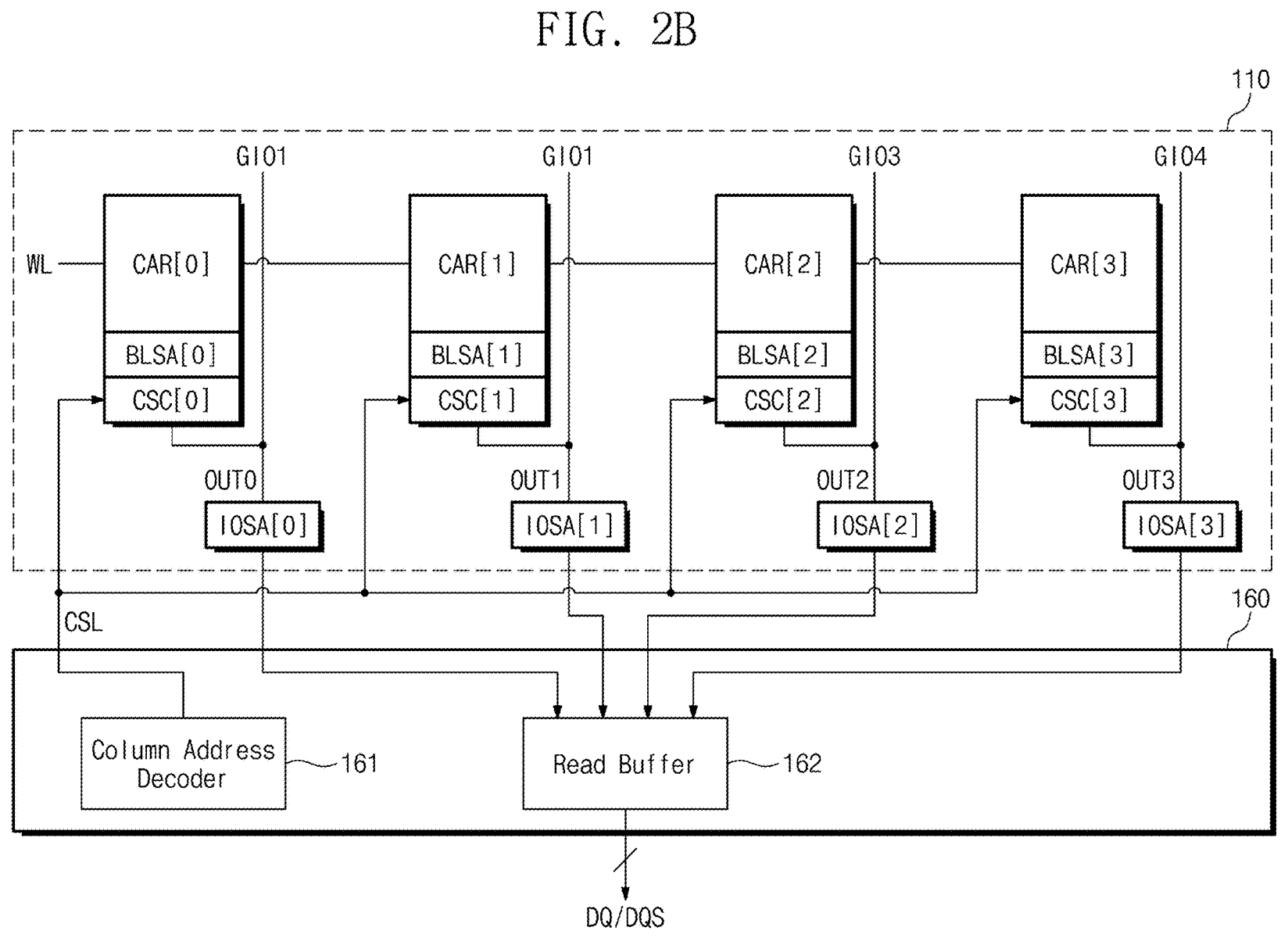

FIGS. 2A and 2B are diagrams for describing a read operation of a memory device, according to an embodiment. In an embodiment, the read operation of the memory device 100 will be described with reference to FIGS. 2A and 2B. In this case, the read operation of the memory device 100 may refer to a read operation (i.e., a normal read operation) on the user data "DATA".

Referring to FIGS. 1, 2A, and 2B, in some embodiments, the input/output (I/O) circuit and column decoder 160 may include a column address decoder 161 and a read buffer 162. The column address decoder 161 may receive the column address and may generate a column selection signal CSL based on the received column address. In an embodiment, the column address may be received from the address decoder 130.

The read buffer 162 may receive read data DATA_READ output from an input/output sense amplifier IOSA and may transmit the receive read data DATA_READ to the external device (e.g., a memory controller).

The memory cell array 110 may include a cell array CAR, a bit line sense amplifier BLSA, a column selection circuit CSC, and the input/output sense amplifier IOSA.

The cell array CAR may include a plurality of memory cells, and the plurality of memory cells may be connected to a plurality of word lines WL0 to WLn. The plurality of memory cells may store the data "DATA". In the read operation of the memory device 100, a word line selected from the plurality of word lines WL0 to WLn may be activated. Data stored in memory cells connected to the selected word line may be output through a plurality of bit lines BL.

The bit line sense amplifier BLSA may be connected to the plurality of memory cells of the cell array CAR through the plurality of bit lines BL. The bit line sense amplifier BLSA may be configured to sense voltage changes of the plurality of bit lines BL and to output the sensed voltage changes.

In response to the column selection signal CSL, the column selection circuit CSC may select some of the voltage changes output from the bit line sense amplifier BLSA so as to be output through local input/output lines LIO. The local input/output lines LIO may be connected to global input/output lines GIO.

The input/output sense amplifier IOSA may be configured to sense changes of the global input/output lines GIO and to output the sensed changes as the read data DATA_READ.

In an embodiment, the structure of the memory cell array 110 illustrated in FIG. 2A may correspond to one lane. One lane may refer to components associated with the read data that is output based on one column selection signal CSL.

In an embodiment, the memory device 100 may include a plurality of banks, and each of the plurality of banks may include a plurality of lanes. FIG. 2B illustrates one bank of the memory cell array 110, by way of example. For example, as illustrated in FIG. 2B, one bank of the memory cell array 110 may include four lanes. In detail, the memory cell array 110 may include a plurality of cell arrays CAR[0] to CAR[3]. The plurality of cell arrays CAR[0] to CAR[3] may be respectively connected to a plurality of bit line sense amplifiers BLSA[0] to BLSA[3]. The plurality of bit line sense amplifiers BLSA[0] to BLSA[3] may be respectively connected to a plurality of column selection circuits CSC[0] to CSC[3]. The plurality of column selection circuits CSC[0] to CSC[3] may respectively output a plurality of output signals OUT0 to OUT3 in response to the column selection signal CSL.

A plurality of input/output sense amplifiers IOSA[0] to IOSA[3] may be configured to amplify the plurality of output signals OUT0 to OUT3 output from the plurality of column selection circuits CSC[0] to CSC[3] through a plurality of global input/output lines GIO1 to GIO3 and to output the amplified signals.

The signals output from the plurality of input/output sense amplifiers IOSA[0] to IOSA[3] may be provided to the read buffer 162, and the read buffer 162 may output the received signals as read data to the external device.

In an embodiment, in the read operation of the memory device 100, the column selection signal CSL may be generated based on the column address, and the same column selection signal CSL may be provided to each of the plurality of column selection circuits CSC[0] to CSC[3]. In this case, the plurality of column selection circuits CSC[0] to CSC[3] may, respectively, select bit lines BL corresponding to the same column selection signal CSL or may output data corresponding to the column selection signal CSL.

Figure 3A:
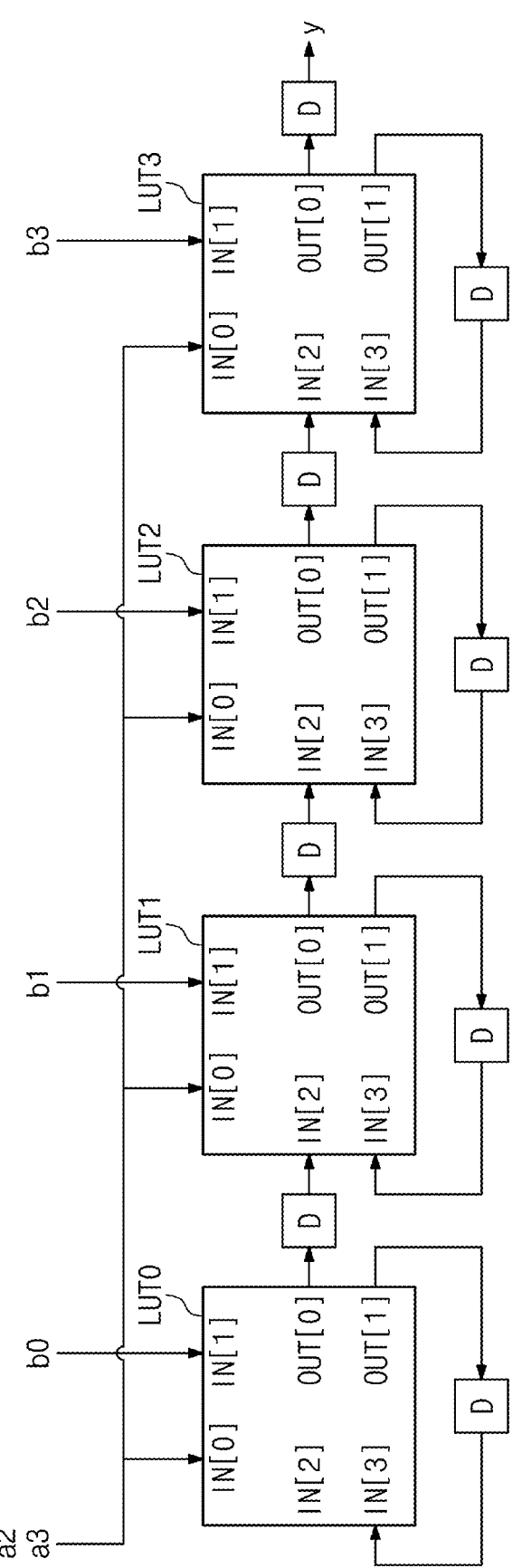
Figure 3C:
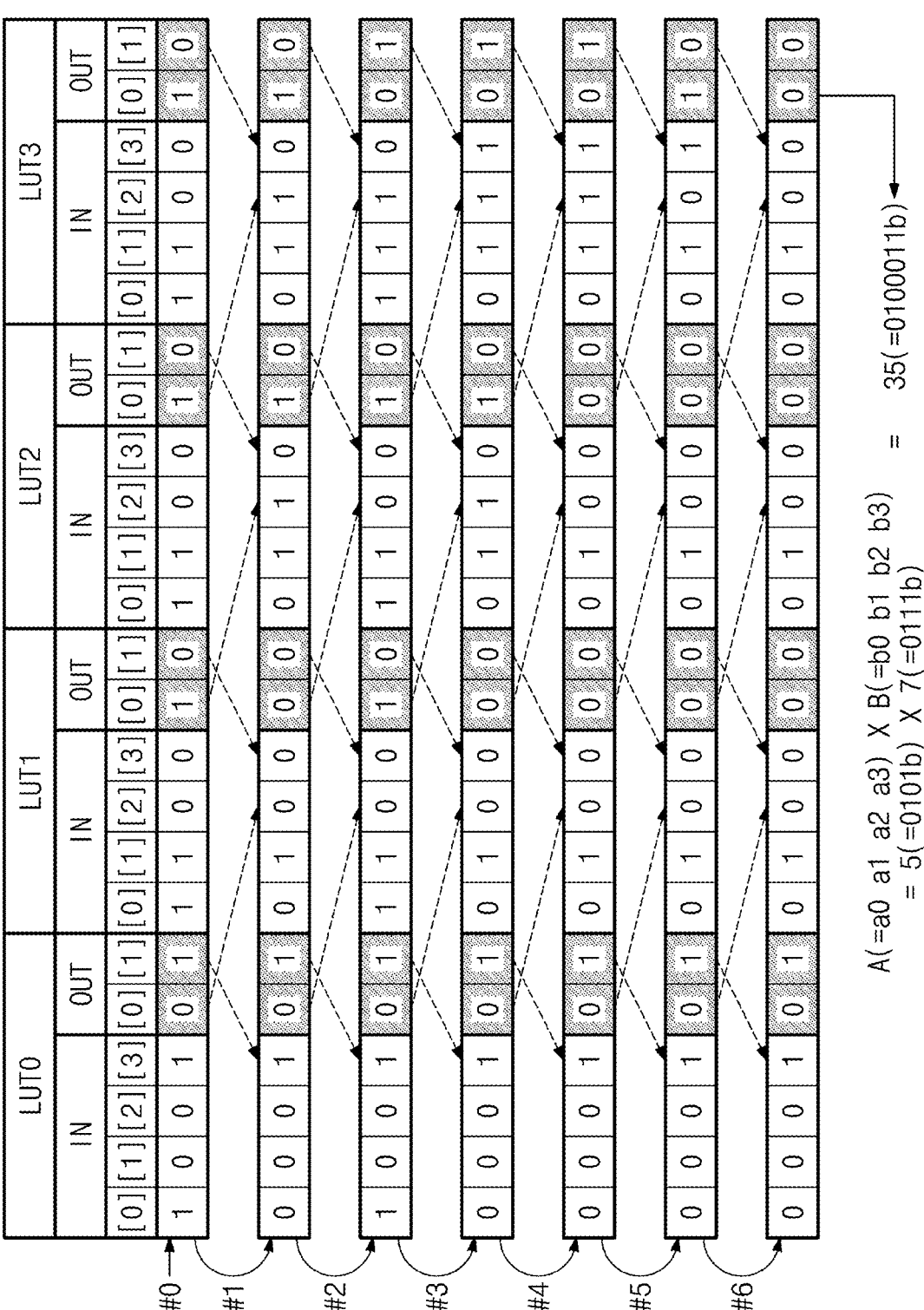

FIGS. 3A to 3C are diagrams for describing a lookup table-based bit-serial computation, according to an embodiment. The lookup table-based bit-serial computation corresponding to a 4-bit multiplication operation will be described with reference to FIGS. 3A to 3C.

Referring to FIGS. 3A to 3C, for the 4-bit multiplication operation, four lookup tables LUT0 to LUT3 may be connected in series. Each of the four lookup tables LUT0 to LUT3 may receive four inputs IN[0] to IN[3] and may output two outputs OUT[0] and OUT[1] corresponding to the four inputs IN[0] to IN[3]. In an embodiment, in each of the four lookup tables LUT0 to LUT3, the number of inputs and the number of outputs are provided as an example for the 4-bit multiplication operation, and embodiments are not limited thereto.

In each of the four lookup tables LUT0 to LUT3, the 0-th output OUT[0] may be fed forward to the second input IN[2] of a next lookup table through a delay "D" (hereinafter referred to as a "feedforward operation FF") and the first output OUT[1] may be fed back to the third input IN[3] thereof through a delay "D" (hereinafter referred to as a "feedback operation FB"). For example, the 0-th output OUT[0] of the 0-th lookup table LUT0 is provided to the second input IN[2] of the first lookup table LUT1 through the delay "D". The first output OUT[1] of the 0-th lookup table LUT0 is provided to the third input IN[3] of the 0-th lookup table LUT0 through the delay "D". Operations of the first and second lookup tables LUT1 and LUT2 are similar to the operation of the 0-th lookup table LUT0, and thus, additional description will be omitted to avoid redundancy and for conciseness. The 0-th output OUT[0] of the third lookup table LUT3 may be accumulated as a final output "y" through the delay "D".

For the 4-bit multiplication operation, bits a3, a2, a1, and a0 of a bit string corresponding to a first operand may be sequentially provided to be respectively input to the 0-th inputs IN[0] of the four lookup tables LUT0 to LUT3. For the 4-bit multiplication operation, bits b3, b2, b1, and b0 of a bit string corresponding to a second operand may be sequentially provided to be respectively input to the first inputs IN[1] of the four lookup tables LUT0 to LUT3.

The 4-bit multiplication operation may be performed through the structure of the four lookup tables LUT0 to LUT3 connected as described above. In this case, the four lookup tables LUT0 to LUT3 may be expressed as illustrated in FIG. 3B.

For example, as illustrated in FIG. 3B, when the 0-th to third inputs IN[0] to IN[3] of the 0-th lookup table LUT0 are {0000b}, the 0-th and first outputs OUT[0] and OUT[1] of the 0-th lookup table LUT0 may be {10b}. When the 0-th to third inputs IN[0] to IN[3] of the 0-th lookup table LUT0 are {0001b}, the 0-th and first outputs OUT[0] and OUT[1] of the 0-th lookup table LUT0 may be {01b}. Outputs corresponding to the remaining combinations are expressed as illustrated in FIG. 3B, and thus, additional description will be omitted to avoid redundancy and for conciseness.

When the 0-th to third inputs IN[0] to IN[3] of each of the first, second, and third lookup table LUT1, LUT2, and LUT3 are {0000b}, the 0-th and first outputs OUT[0] and OUT[1] thereof may be {00b}. When the 0-th to third inputs IN[0]

to IN[3] of each of the first, second, and third lookup table LUT1, LUT2, and LUT3 are {0001b}, the 0-th and first outputs OUT[0] and OUT[1] thereof may be {10b}. Outputs corresponding to the remaining combinations are expressed as illustrated in FIG. 3B, and thus, additional description will be omitted to avoid redundancy and for conciseness.

The 4-bit multiplication operation may be performed through the structure described with reference to FIGS. 3A and 3B. For example, as illustrated in FIG. 3C, it is assumed that the 4-bit multiplication operation on "5×7" is performed. In this case, a first operand "A" may be 5 and may be expressed by {0101b}. A second operand "B" may be 7 and may be expressed by {0111b}. In this case, a0=0, a1=1, a2=0, a3=1, b0=0, b1=1, b2=1, and b3=1.

In the 0-th cycle #0, a value (i.e., 1) of bit a3 of the first operand "A" is provided to each of the 0-th inputs IN[0] of the 0-th to third lookup tables LUT0 to LUT3. Bit values (i.e., 0, 1, 1, 1) of the second operand "B" is respectively provided to the first inputs IN[1] of the 0-th to third lookup tables LUT0 to LUT3. The third input IN[3] of the 0-th lookup table LUT0 is set to "1", and the remaining inputs thereof are set to "0".

In this case, {1001b} are input to the 0-th to third inputs IN[0] to IN[3] of the 0-th lookup table LUT0, and {1100b} are input to the 0-th to third inputs IN[0] to IN[3] of each of the first, second, and third lookup table LUT1, LUT2, and LUT3. In response to the values provided to the 0-th to third inputs IN[0] to IN[3], the 0-th lookup table LUT0 may output {01b} as the 0-th and first outputs OUT[0] and OUT[1], and each of first, second, and third lookup table LUT1, LUT2, and LUT3 may output { 10b} as the 0-th and first outputs OUT[0] and OUT[1].

In the first cycle #1, a value (i.e., 1) of bit a2 of the first operand "A" is input to each of the 0-th inputs IN[0] of the 0-th to third lookup tables LUT0 to LUT3. The 0-th output OUT[0] of the 0-th lookup table LUT0 may be fed forward to the second input IN[2] of the first lookup table LUT1, and the first output OUT[1] of the 0-th lookup table LUT0 may be fed back to the third input IN[3] of the 0-th lookup table LUT0. The 0-th output OUT[0] of the first lookup table LUT1 may be fed forward to the second input IN[2] of the second lookup table LUT2, and the first output OUT[1] of the first lookup table LUT1 may be fed back to the third input IN[3] of the first lookup table LUT1. The 0-th output OUT[0] of the second lookup table LUT2 may be fed forward to the second input IN[2] of the third lookup table LUT3, and the first output OUT[1] of the second lookup table LUT2 may be fed back to the third input IN[3] of the second lookup table LUT2. The 0-th output OUT[0] of the third lookup table LUT3 may be accumulated as an output value, and the first output OUT[1] of the third lookup table LUT3 may be fed back to the third input IN[3] of the third lookup table LUT3.

In this case, {0001b} are input to the 0-th to third inputs IN[0] to IN[3] of the 0-th lookup table LUT0; {0100b} are input to the 0-th to third inputs IN[0] to IN[3] of the first lookup table LUT1; {0110b} are input to the 0-th to third inputs IN[0] to IN[3] of the second lookup table LUT2; and, {0110b} are input to the 0-th to third inputs IN[0] to IN[3] of the third lookup table LUT3. In response to the values provided to the 0-th to third inputs IN[0] to IN[3], the 0-th lookup table LUT0 may output {01b} as the 0-th and first outputs OUT[0] and OUT[1], the first lookup table LUT1 may output {00b} as the 0-th and first outputs OUT[0] and OUT[1], the second lookup table LUT2 may output {10b} as the 0-th and first outputs OUT[0] and OUT[1], and the third lookup table LUT3 may output {10b} as the 0-th and first outputs OUT[0] and OUT[1].

In the case of repeatedly performing the above operation for a given number of times, a computation result may be obtained by accumulating the 0-th output OUT[0] of the third lookup table LUT3. For example, as illustrated in FIG. 3C, when the computation using the 0-th to third lookup tables LUT0 to LUT3 is repeatedly performed 7 times (i.e., is performed from the zeroth cycle #0 to the sixth cycle #6), a cumulative value of the 0-th output OUT[0] of the third lookup table LUT3 may be {0100011b}. The cumulative value of {0100011b} may indicate a result value (i.e., 35) of the multiplication operation on "5×7".

FIGS. 3A-3C and the above paragraphs describe an example in which the computation is performed 7 times (i.e., from the zeroth cycle #0 to the sixth cycle #6). However, embodiments are not limited thereto. In an embodiment, the given number of times that the computing operation is repeated may be determined in advance based on the number of bits of a computation result. For example, a maximum number of bits of a result that is capable of being obtained by the 4-bit multiplication operation may be "8". Accordingly, a maximum number of times that the computation may be executed for a 4-bit multiplication operation may be 8 times. However, embodiments are not limited thereto. For example, the given number of times of iteration may be variously changed or modified depending on a type/format of operands or a computation result value.

The lookup table-based bit-serial computation for 4-bit multiplication described with reference to FIGS. 3A to 3C is provided as an example, but embodiments are not limited thereto. For example, the lookup table-based bit-serial computation may support various computations by variously modifying a pattern of a lookup table or through a combination of various lookup tables. A range (or the size) of an operand may be variously changed by adjusting the number of lookup tables participating in feedforward or feedback or the number of times that the computation is repeated. A position(s) of a bit(s) to be fed back or fed forward for each lookup table or the number of bits to be fed back or fed forward for each lookup table is not limited, and a computation type or a range of an operand may be variously changed by adjusting a position(s) of a bit(s) to be fed back or fed forward for each lookup table or the number of bits to be fed back or fed forward for each lookup table.

Figure 4A:
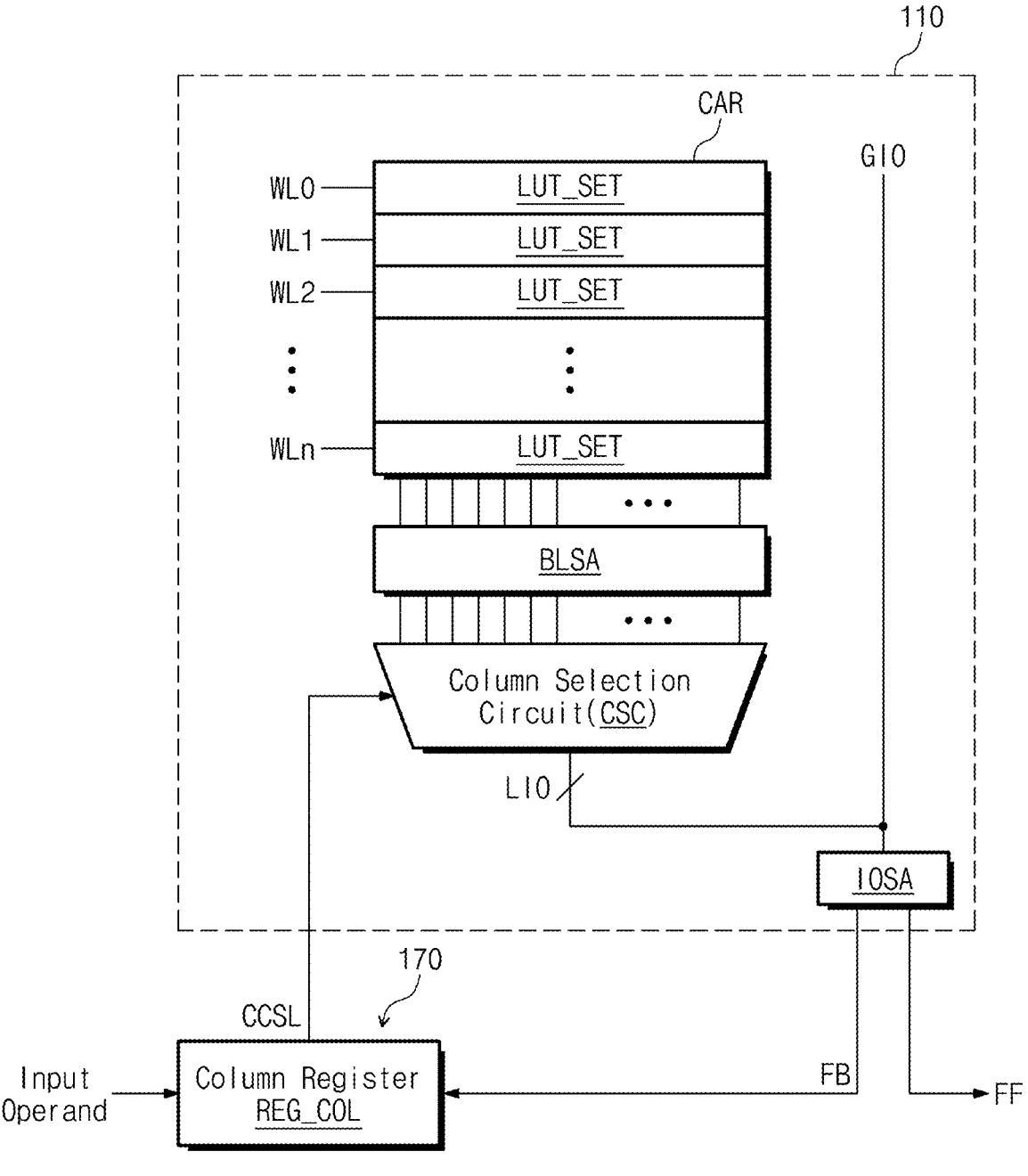
FIGS. 4A and 4B are diagrams for describing a computing operation of the memory device of FIG. 1, according to an embodiment.
Figure 4B:
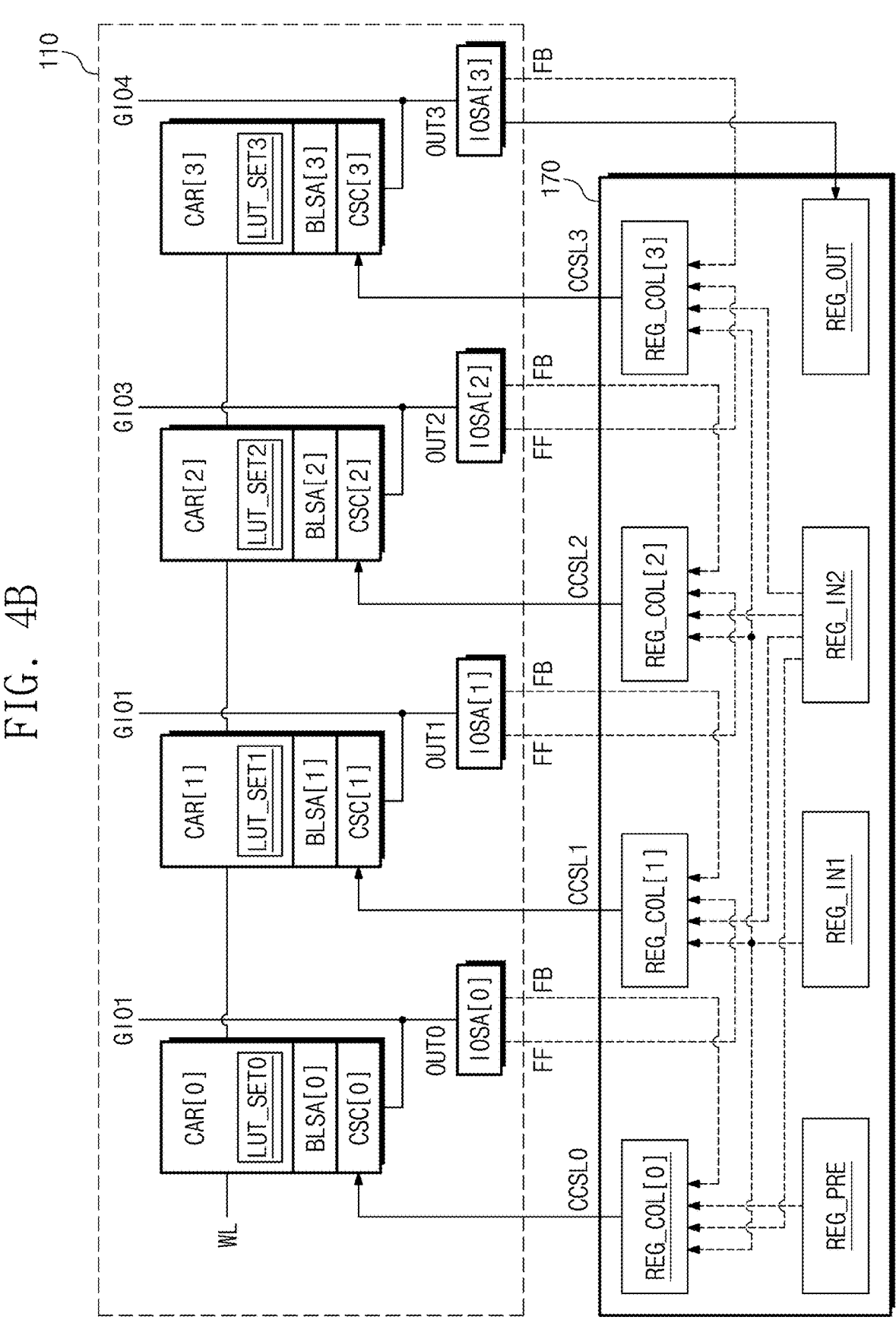

FIGS. 4A and 4B are diagrams for describing a computing operation of a memory device 100 of FIG. 1, according to an embodiment. For convenience of description, components that are unnecessary to describe the computing operation of the memory device 100 are omitted.

Referring to FIGS. 1, 4A, and 4B, the column compute control circuit 170 may include a column register REG_COL. The column register REG_COL may be configured to generate a column compute selection signal CCSL based on input operands.

The memory cell array 110 may include the cell array CAR, the bit line sense amplifier BLSA, the column selection circuit CSC, and the input/output sense amplifier IOSA. The cell array CAR may include a plurality of memory cells connected to the plurality of word lines WL0 to WLn. The plurality of memory cells may store a plurality of computation output patterns LUT_SET. In an embodiment, the plurality of computation output patterns LUT_SET may refer to a data set for supporting various computing operations. For example, the plurality of computation output patterns LUT_SET may include a data pattern corresponding to the output values of the lookup tables LUT0 to LUT3 described with reference to FIG. 3B. A configuration associated with the computation output pattern will be described in detail with reference to the drawings.

The bit line sense amplifier BLSA may be connected to the plurality of memory cells of the cell array CAR through the plurality of bit lines BL. The bit line sense amplifier BLSA may be configured to sense voltage changes of the plurality of bit lines BL and to output the sensed voltage changes.

In response to the column compute selection signal CCSL, the column selection circuit CSC may select some of the voltage changes output from the bit line sense amplifier BLSA so as to be output through the local input/output lines LIO. The local input/output lines LIO may be connected to the global input/output lines GIO.

The input/output sense amplifier IOSA may sense changes of the global input/output lines GIO. Some of signals (or bits) sensed by the input/output sense amplifier IOSA may be fed back to the column register REG_COL, and the others thereof may be fed forward to the column register REG_COL different therefrom.

The lookup table-based bit-serial computation may be implemented through the structure illustrated in FIG. 4A. For example, for convenience of description, it is assumed that the configuration illustrated in FIG. 4A correspond to the operation of the 0-th lookup table LUT0 described with reference to FIG. 3A. In this case, one (e.g., a computation output pattern stored in memory cells connected to the 0-th word line WL0) of the plurality of computation output patterns LUT_SET may include a combination of the 0-th and first outputs OUT[0] and OUT[1] of the 0-th lookup table LUT0 illustrated in FIG. 3B. The input operand may correspond to a0, a1, a2, a3, or b0.

In this case, when the 0-th word line WL0 is activated, one computation output pattern LUT_SET may be provided to the column selection circuit CSC through the bit line sense amplifier BLSA. The column selection circuit CSC may select and output a portion of the one computation output pattern LUT_SET in response to the column compute selection signal CCSL. In this case, the column compute selection signal CCSL illustrated in FIG. 4A may correspond to the 0-th to third inputs IN[0] to IN[3], and a value output by the column selection circuit CSC may be the 0-th and first outputs OUT[0] and OUT[1] corresponding to the 0-th to third inputs IN[0] to IN[3]. In detail, when the column compute selection signal CCSL is {0000b}, a value output from the column selection circuit CSC may be {10b}; when the column compute selection signal CCSL is {0001b}, a value output from the column selection circuit CSC may be {01b}.

The value output from the column selection circuit CSC may be provided to the global input/output lines GIO through the local input/output lines LIO. The input/output sense amplifier IOSA may sense voltage changes of the global input/output lines GIO and may store an output signal. A portion of the output signal sensed by the input/output sense amplifier IOSA may be fed back to the column register REG_COL, and the remaining portion thereof may be fed forward to another column register. The portion FF fed forward from the input/output sense amplifier IOSA and the portion FB fed back therefrom may be used to generate the column compute selection signal CCSL in a next iteration.

The structure described with reference to FIG. 4A is a structure corresponding to one lane. However, embodiments are not limited thereto. One bank of the memory device 100 may include a plurality of lanes, and various types of computations may be supported through the plurality of lanes. For example, as illustrated in FIG. 4B, the memory cell array 110 may include the plurality of cell arrays CAR[0] to CAR[3]. The plurality of cell arrays CAR[0] to CAR[3] may respectively store a plurality of computation output patterns LUT_SET0 to LUT_SET3. In an embodiment, the plurality of computation output patterns LUT_SET0 to LUT_SET3 may be variously changed or modified depending on a kind of the computation that is performed in the memory device 100.

The plurality of cell arrays CAR[0] to CAR[3] may be respectively connected to the plurality of bit line sense amplifiers BLSA[0] to BLSA[3]. The plurality of bit line sense amplifiers BLSA[0] to BLSA[3] may be respectively connected to the plurality of column selection circuits CSC [0] to CSC[3]. The plurality of column selection circuits CSC[0] to CSC[3] may respectively output the output signals OUT0 to OUT3 in response to a plurality of column compute selection signals CCSL0 to CCSL3.

The plurality of input/output sense amplifiers IOSA[0] to IOSA[3] may be configured to amplify the plurality of output signals OUT0 to OUT3 output from the plurality of column selection circuits CSC[0] to CSC[3] through the plurality of global input/output lines GIO1 to GIO3 and to output the amplified signals.

Some of the signals output from the plurality of input/output sense amplifiers IOSA[0] to IOSA[3] may be fed back (FB) or fed forward (FF) to a plurality of column registers REG_COL[0] to REG_COL[3].

In an embodiment, in the read operation of the memory device 100 described with reference to FIGS. 2A and 2B, the column selection signal CSL may be generated based on the column address, and the same column selection signal CSL may be provided to the plurality of column selection circuits CSC[0] to CSC[3]. In an embodiment, in the computing operation of the memory device 100 described with reference to FIGS. 4A and 4B, different or independent column compute selection signals CCSL0 to CCSL3 may be respectively provided to the plurality of column selection circuits CSC[0] to CSC[3].

For example, the column compute control circuit 170 may include a first input register REG_IN1, a second input register REG_IN2, a preset register REG_PRE, an output register REG_OUT, and the plurality of column registers REG_COL[0] to REG_COL[3].

The first input register REG_IN1 may be configured to store or set information about a first input operand. The second input register REG_IN2 may be configured to store or set information about a second input operand. The preset register REG_PRE may be configured to store or set initial values of the plurality of column registers REG_COL[0] to REG_COL[3] in an initialization phase of the computing operation of the memory device 100. The output register REG_OUT may be configured to accumulate a computation result. In an embodiment, the first input register REG_IN1 and the output register REG_OUT may be a shift register.

The plurality of column registers REG_COL[0] to REG_COL[3] may be configured to respectively generate the plurality of column compute selection signals CCSL0 to CCSL3 based on the set values. In an embodiment, each of the column compute selection signals CCSL0 to CCSL3 may be used as an input to a lookup table in the lookup table-based bit-serial computation. For example, each of the plurality of column compute selection signals CCSL0 to CCSL3 may correspond to the plurality of inputs IN[0] to IN[3] described with reference to FIGS. 3A to 3C. However, embodiments are not limited thereto. For example, the size and configuration of the column compute selection signals CCSL0 to CCSL3 may be variously changed and modified depending on a computation kind, a structure of the computation output pattern LUT_SET, a size of an operand, etc. An operation that is performed based on the structure of FIG. 4B will be described in detail with reference to FIGS. 5 to 6E.

According to the above structure, the lookup table-based bit-serial computation may be performed through the read operation that is repeatedly performed with respect to the memory device 100. A memory device (e.g., a processing-in-memory (PIM)) that provides a related art computation function provides the computation function by using an arithmetic processor in the related art memory device that is dedicated for the computing operation or an arithmetic logic unit (ALU) in the related art memory device that is dedicated for the computing operation.

In the case of the related art memory device having arithmetic processor or ALU in the memory device, time is necessary for the arithmetic processor or the arithmetic logic unit to perform computation, and power consumption increases. Also, the implementation of the separate arithmetic processor or arithmetic logic unit causes an increase in a chip size.

In contrast, according to various embodiments of the present disclosure, as an internal read operation is repeatedly performed in the memory device 100, various computation functions may be supported without a separate arithmetic processor or arithmetic logic unit. Accordingly, a memory device that provides a computation function while improving performance and reducing costs is provided.

Figure 5:
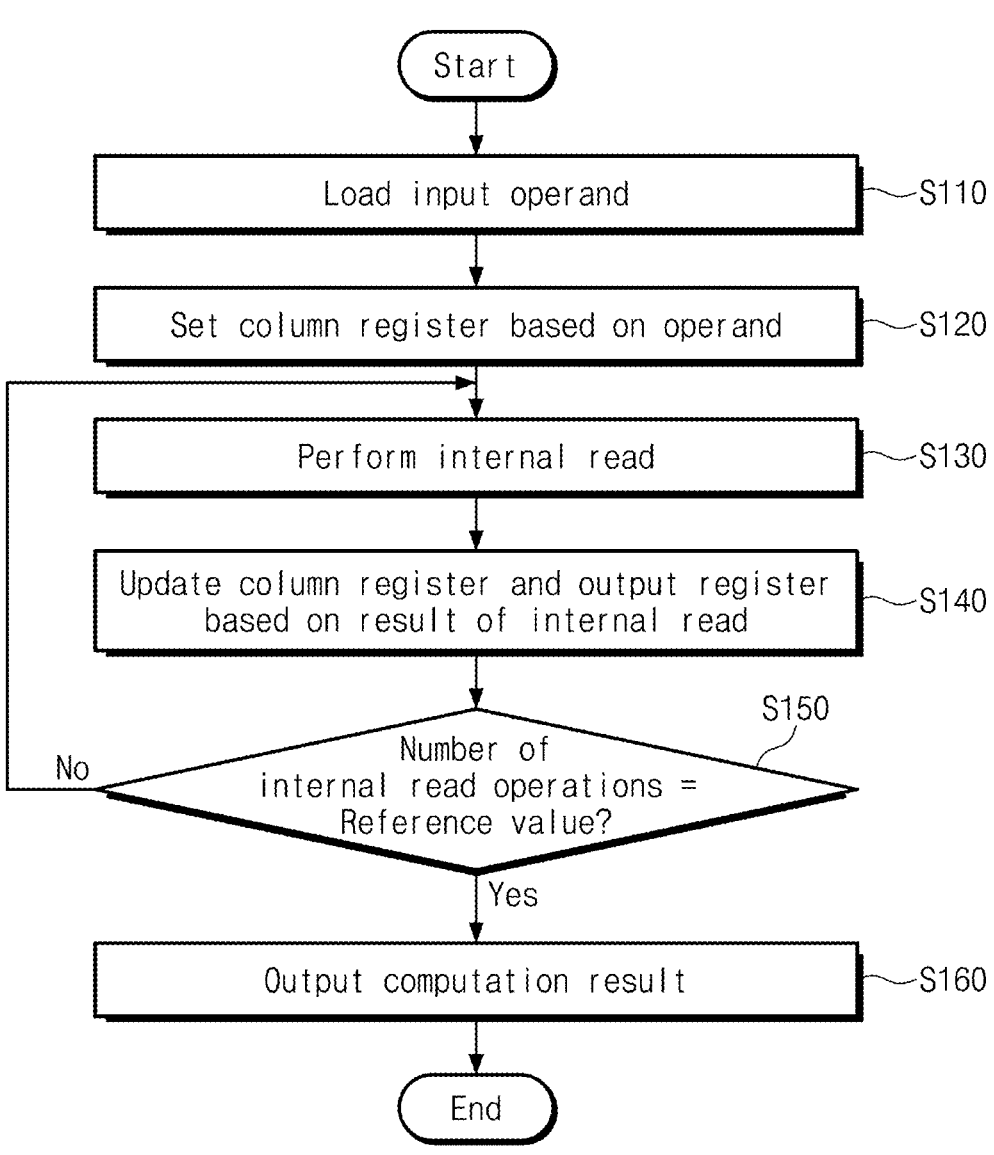
FIG. 5 is a flowchart for describing a computing operation of the memory device of FIG. 1, according to an embodiment.

FIG. 5 is a flowchart for describing a computing operation of the memory device 100 of FIG. 1, according to an embodiment. Referring to FIGS. 1, 4B, and 5, in operation S110, the memory device 100 may load an input operand. For example, the memory device 100 may receive an input operand from the external device (e.g., a memory controller). In some embodiments, the memory device 100 may read input operands stored in memory cells under control of the external device. The memory device 100 may store or set the input operands in the first input register REG_IN1 and the second input register REG_IN2.

In operation S120, the memory device 100 may set a column register based on the input operand. For example, as illustrated in FIG. 4B, the memory device 100 may set the plurality of column registers REG_COL[0] to REG_COL[3] based on the input operands loaded to the first input register REG_IN1 and the second input register REG_IN2. In an embodiment, as the plurality of column registers REG_COL [0] to REG_COL[3] are set, the plurality of column compute selection signals CCSL0 to CCSL3 may be generated.

In operation S130, the memory device 100 may perform the internal read operation. For example, the memory device 100 may activate a selected word line. When the selected word line is activated, the computation output patterns LUT_SET0 to LUT_SET3 stored in memory cells connected to the selected word line may be provided to the plurality of bit line sense amplifiers BLSA[0] to BLSA[3]. The plurality of column selection circuits CSC[0] to CSC[3] may respectively output the plurality of output signals OUT0 to OUT3 in response to the plurality of column compute selection signals CCSL0 to CCSL3. The plurality of input/output sense amplifiers IOSA[0] to IOSA[3] may sense the plurality of output signals OUT0 to OUT3. In an embodiment, the plurality of output signals OUT0 to OUT3 may be signals respectively output from the plurality of column selection circuits CSC[0] to CSC[3]. As described above, the memory device 100 may perform the internal read operation with respect to the selected word line based on the plurality of column compute selection signals CCSL0 to CCSL3 generated by the plurality of column registers REG_COL[0] to REG_COL[3].

In operation S140, the memory device 100 may update the plurality of column registers REG_COL[0] to REG_COL[3] and the output register REG_OUT based on a result of the internal read operation. For example, through the internal read operation in operation S130, the plurality of input/output sense amplifiers IOSA[0] to IOSA[3] may be in a state of storing the plurality of output signals OUT0 to OUT3. The plurality of output signals OUT0 to OUT3 stored in the plurality of input/output sense amplifiers IOSA[0] to IOSA[3] may be fed back (FB) and fed forward (FF) to the plurality of column registers REG_COL[0] to REG_COL[3], and one output signal (e.g., OUT3) thereof may be accumulated in the output register REG_OUT.

In detail, a portion of the 0-th output signal OUT0 stored in the 0-th input/output sense amplifier IOSA[0] is fed back to the 0-th column register REG_COL[0], and the remaining portion thereof is fed forward to the first column register REG_COL[1]. A portion of the first output signal OUT1 stored in the first input/output sense amplifier IOSA[1] is fed back to the first column register REG_COL[1], and the remaining portion thereof is fed forward to the second column register REG_COL[2]. A portion of the second output signal OUT2 stored in the second input/output sense amplifier IOSA[2] is fed back to the second column register REG_COL[2], and the remaining portion thereof is fed forward to the third column register REG_COL[3]. A portion of the third output signal OUT3 stored in the third input/output sense amplifier IOSA[3] is fed back to the third column register REG_COL[3], and the remaining portion thereof is accumulated.

In operation S150, the memory device 100 may determine whether the number of times of the internal read operation is a reference value (i.e., the given number of times). In some embodiments, the reference value may be a maximum value as described above. In an embodiment, the reference number of times of the internal read operation may be set by the external device (e.g., a memory controller). In some embodiments, the reference number of times of the internal read operation may be determined based on a kind of a target computation, a size of an operand, etc. When the number of times of the internal read operation is not the reference value (i.e., the given number of times) (operation S150, No), the memory device 100 again performs operation S130.

When the number of times of the internal read operation is the reference value (i.e., the given number of times) (operation S150, Yes), in operation S160, the memory device 100 may output a computation result. For example, as the internal read operation is repeatedly performed, bit values may be accumulated in the output register REG_OUT. The bit values accumulated in the output register REG_OUT may correspond to the computation result, and the memory device 100 may output the accumulated bit values of the output register REG_OUT as the computation result.

FIGS. 6A to 6E are diagrams for describing a computing operation of a memory device according to the flowchart of FIG. 5, according to some embodiments. For convenience of description, it is assumed that the memory device 100 performs the computing operation (i.e., the 4-bit multiplication operation: "5×7") described with reference to FIGS. 3A to 3C. However, embodiments are not limited thereto.

Figure 6A:
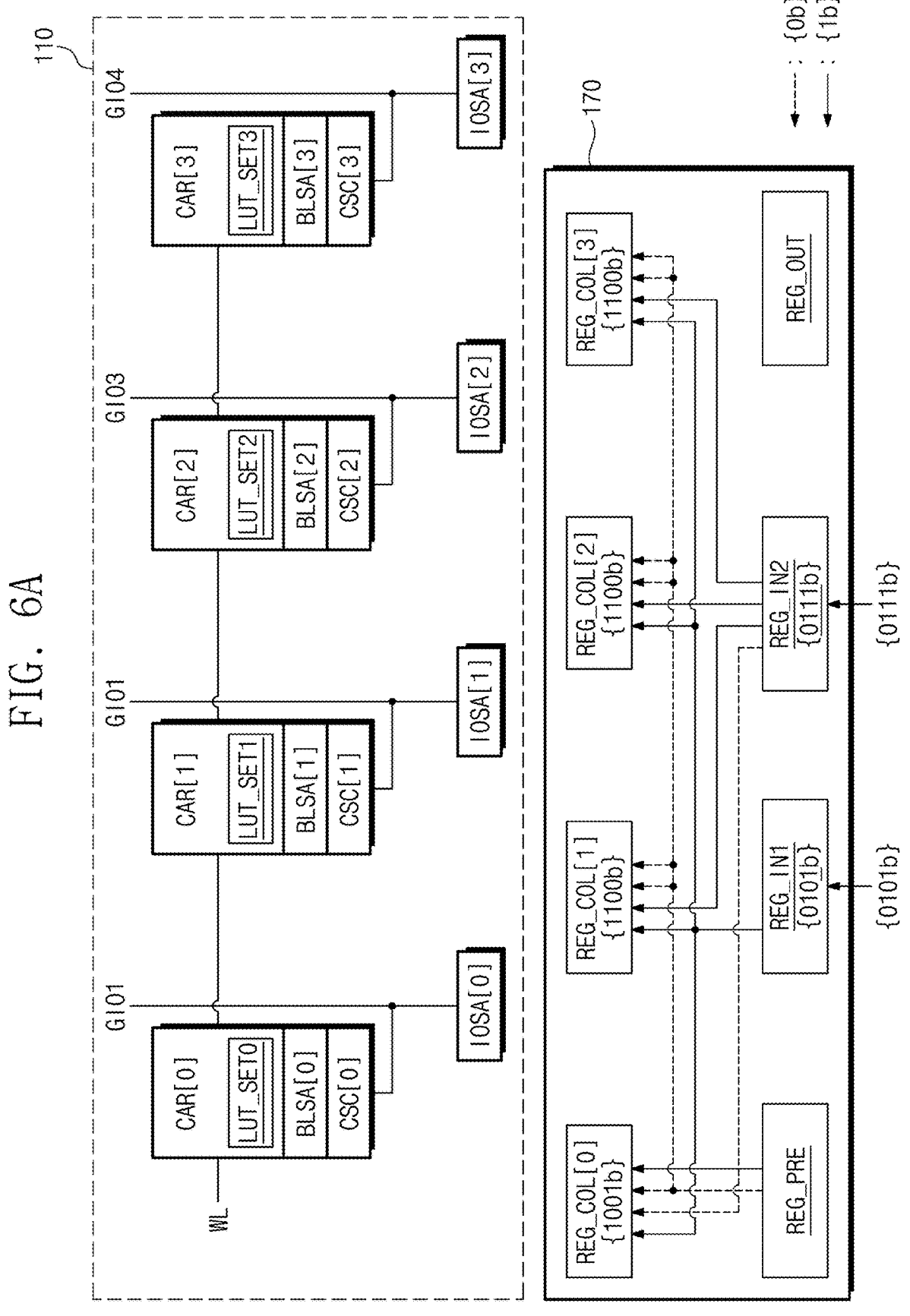
FIGS. 6A to 6E are diagrams for describing a computing operation of the memory device according to the flowchart of FIG. 5, according to an embodiment.

First, as illustrated in FIG. 6A, a first input operand (i.e., 5={0101b}) is set to the first input register REG_IN1, and a second input operand (i.e., 7={0111b}) is set to the second input register REG_IN2.

The least significant bit (LSB) (e.g., a3) (i.e., 1) of the first input register REG_IN1 is set as a 0-th input value of each of the 0-th to third column registers REG_COL[0] to REG_COL[3]. The most significant bit (MSB) (e.g., b0) (i.e., 1) of the second input register REG_IN2 is set as a first input value of the third column register REG_COL[3], the second MSB (e.g., b1) (i.e., 1) is set as a first input value of the second column register REG_COL[2], the second LSB (e.g., b2) (i.e., 1) is set as a first input value of the first column register REG_COL[1], and the least significant bit (LSB) (e.g., b3) (i.e., 0) is set as a first input value of the 0-th column register REG_COL[0]. The preset register REG_PRE sets a third input value of the 0-th column register REG_COL[0] to "1", and the remaining input values of the 0-th to third column registers REG_COL[0] to REG_COL[3] are set to "1".

In this case, a value set to the 0-th column register REG_COL[0] is {1001b}, a value set to the first column register REG_COL[1] is {1100b}, a value set to the second column register REG_COL[2] is {1100b}, and a value set to the third column register REG_COL[3] is {1100b}.

Figure 6B:
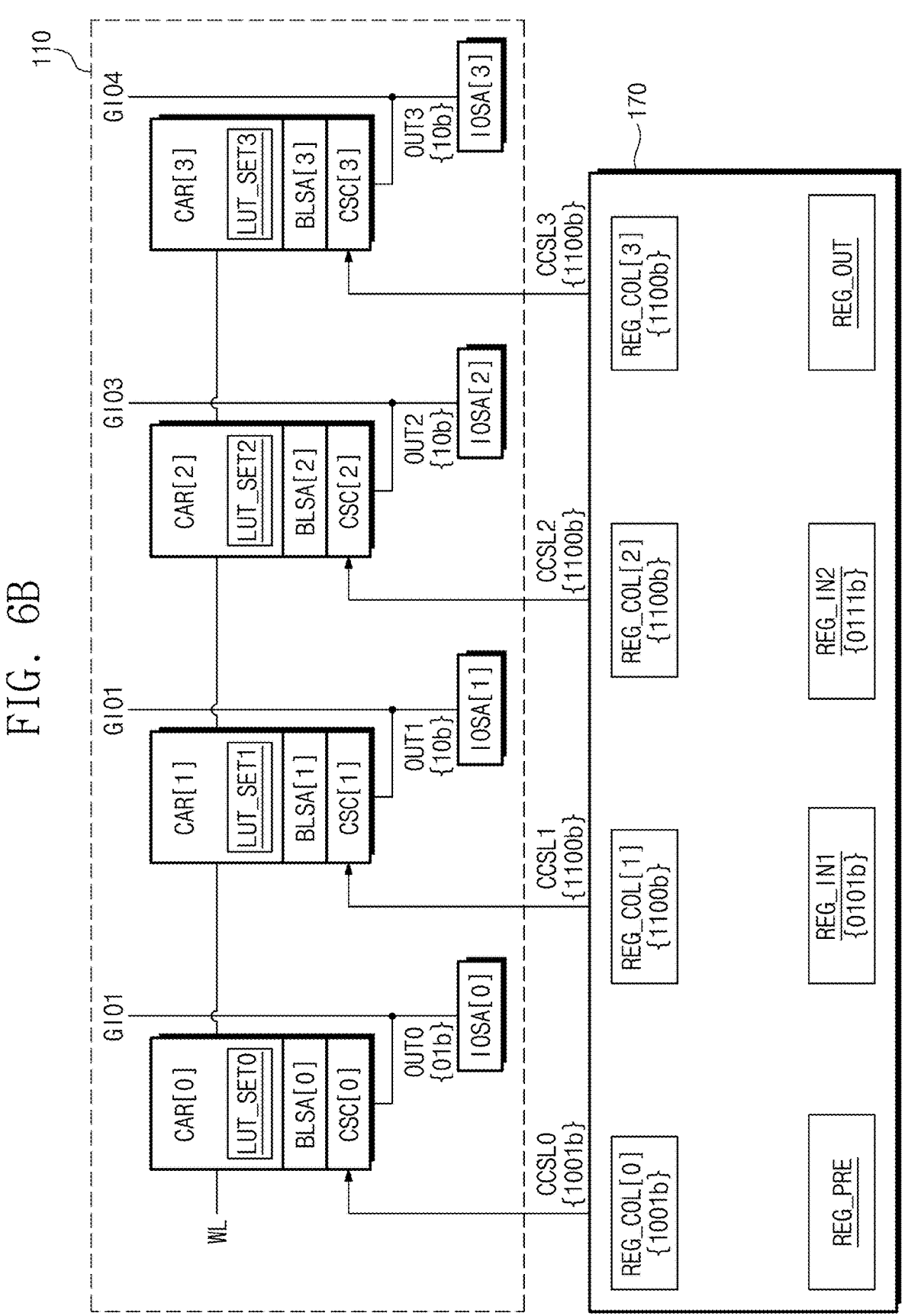

Next, referring to FIG. 6B, when the selected word line WL is activated, the 0-th to third computation output patterns LUT_SET0 to LUT_SET3 stored in the 0-th to third cell arrays CAR[0] to CAR[3] may be output through bit lines BL. The 0-th to third bit line sense amplifiers BLSA[0] to BLSA[3] may sense and output the 0-th to third computation output patterns LUT_SET0 to LUT_SET3 through the bit lines BL.

In response to the 0-th to third column compute selection signals CCSL0 to CCSL3, the 0-th to third column selection circuits CSC[0] to CSC[3] may output some of the outputs of the 0-th to third bit line sense amplifiers BLSA[0] to BLSA[3] as the 0-th to third output signals OUT0 to OUT3. For example, the 0-th to third bit line sense amplifiers BLSA[0] to BLSA[3] may respectively output the 0-th to third computation output patterns LUT_SET0 to LUT_SET3. In this case, the 0-th computation output pattern LUT_SET0 may correspond to the outputs of the 0-th lookup table LUT0 of FIG. 3B, and the first, second, and third computation output patterns LUT_SET1 to LUT_SET3 may correspond to the outputs of the first, second, and third lookup tables LUT1, LUT2, and LUT3.

In this case, the 0-th column selection circuit CSC[0] may output {01b} as the 0-th output signal OUT0 in response to the 0-th column compute selection signal CCSL0 of {1001b}. The first column selection circuit CSC[1] may output {10b} as the first output signal OUT1 in response to the first column compute selection signal CCSL1 of {1100b}. The second column selection circuit CSC[2] may output {10b} as the second output signal OUT2 in response to the second column compute selection signal CCSL2 of {1100b}. The third column selection circuit CSC[3] may output {10b} as the third output signal OUT3 in response to the third column compute selection signal CCSL3 of {1100b}.

Figure 6C:
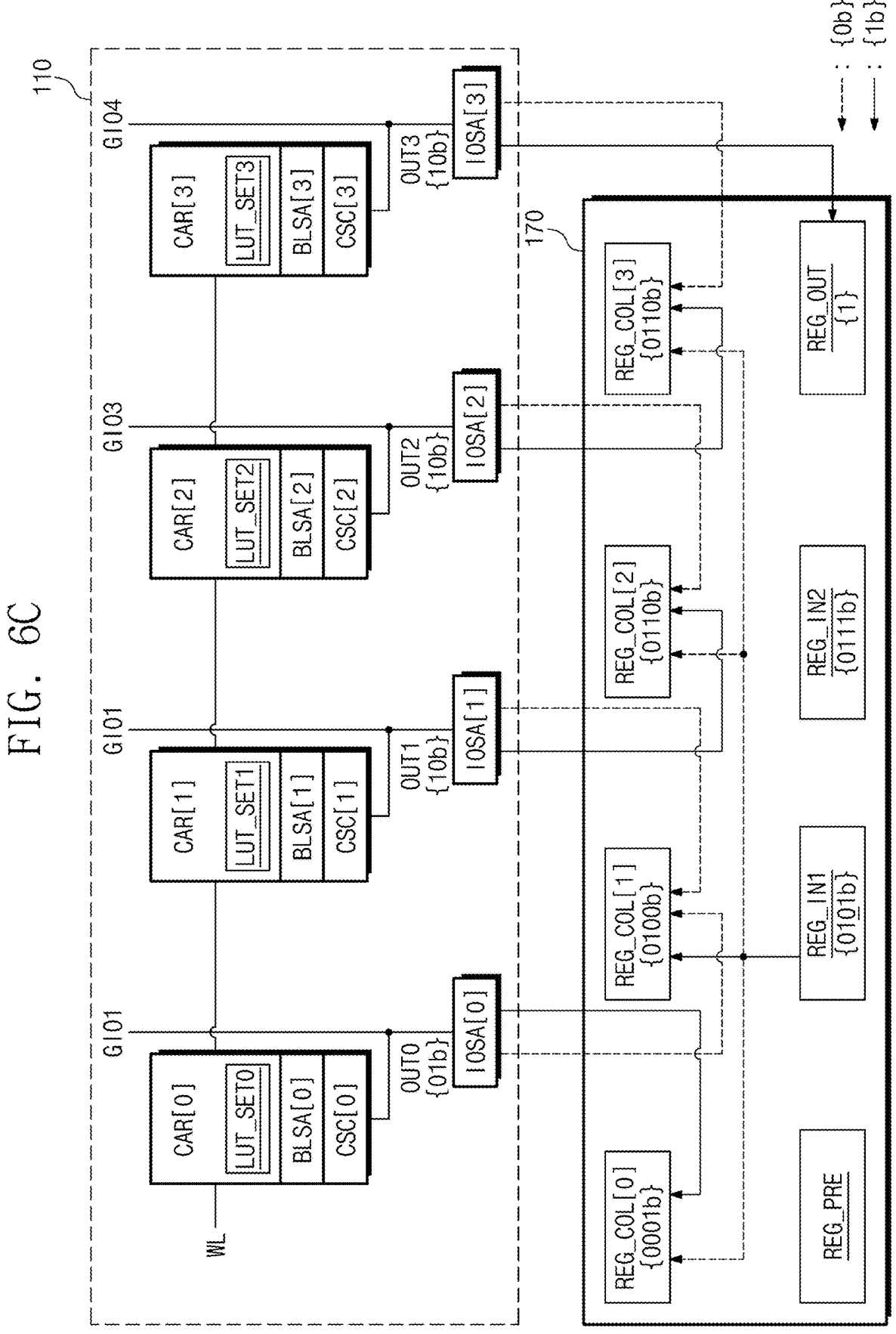

Next, as illustrated in FIG. 6C, the 0-th to third output signals OUT0 to OUT3 sensed by the 0-th to third input/output sense amplifiers IOSA[0] to IOSA[3] may be fed back or fed forward to the 0-th to third column registers REG_COL[0] to REG_COL[3]. For example, the least significant bit (i.e., "1") of the 0-th output signal OUT0 of {01b} may be fed back to the third input of the 0-th column register REG_COL[0], and the most significant bit (i.e., "0") may be fed forward to the second input of the first column register REG_COL[1]. The least significant (i.e., "0") of the first output signal OUT1 of {10b} may be fed back to the third input of the first column register REG_COL[1], and the most significant bit (i.e., "1") may be fed forward to the second input of the second column register REG_COL[2]. The least significant bit (i.e., "0") of the second output signal OUT2 of {10b} may be fed back to the third input of the second column register REG_COL[2], and the most significant bit (i.e., "1") may be fed forward to the second input of the third column register REG_COL[3]. The least significant bit (i.e., "0") of the third output signal OUT3 of {10b} may be fed back to the third input of the third column register REG_COL[3], and the most significant bit (i.e., "1") may be accumulated in the output register REG_OUT.

The 0-th inputs IN[0] of the 0-th to third column registers REG_COL[0] to REG_COL[3] may be updated based on the second LSB (e.g., a2) (i.e., "0") of the first input operand output from the first input register REG_IN1.

In this case, the 0-th column register REG_COL[0] is set to {0001b}, the first column register REG_COL[1] is set to {0100b}, the second column register REG_COL[2] is set to {0110b}, and the third column register REG_COL[3] is set to {0110b}.

Figure 6D:
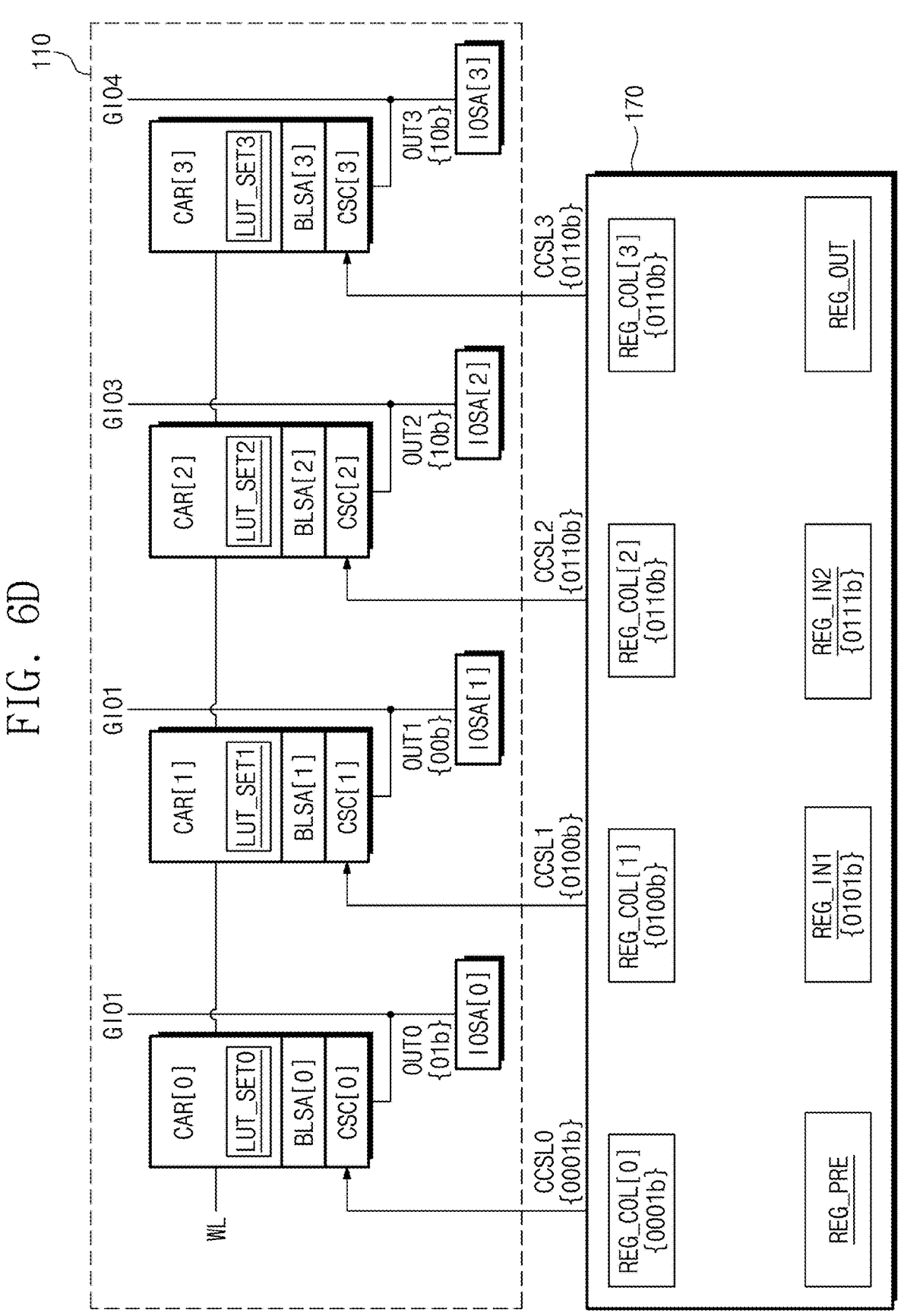

Afterwards, as illustrated in FIG. 6D, when the selected word line WL is activated, the 0-th to third computation output patterns LUT_SET0 to LUT_SET3 stored in the 0-th to third cell arrays CAR[0] to CAR[3] of the memory device 100 may be output through bit lines BL. The 0-th to third bit line sense amplifiers BLSA[0] to BLSA[3] may sense and output the 0-th to third computation output patterns LUT_SET0 to LUT_SET3 through the bit lines BL.

In response to the 0-th to third column compute selection signals CCSL0 to CCSL3, the 0-th to third column selection circuits CSC[0] to CSC[3] may output the 0-th to third output signals OUT0 to OUT3.

For example, in response to the 0-th column compute selection signal CCSL0 of {0001b}, the 0-th column selection circuit CSC[0] may output the 0-th output signal OUT0 of {01b}. In response to the first column compute selection signal CCSL1 of {0100b}, the first column selection circuit CSC[1] may output the first output signal OUT1 of {00b}. In response to the second column compute selection signal CCSL2 of {0110b}, the second column selection circuit CSC[2] may output the second output signal OUT2 of {10b}. In response to the third column compute selection signal CCSL3 of {0110b}, the third column selection circuit CSC[3] may output the third output signal OUT3 of {10b}.

Figure 6E:
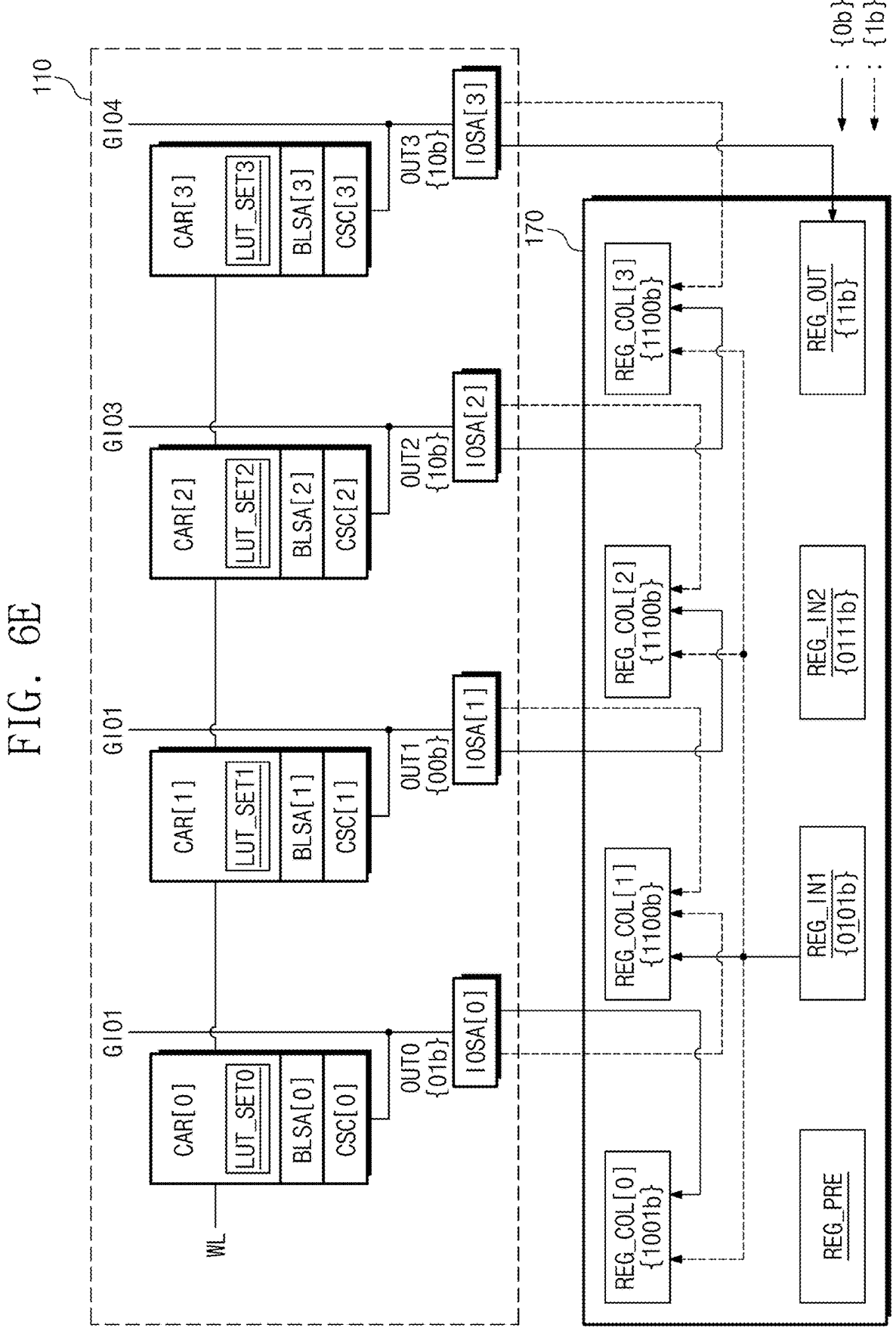

Next, as illustrated in FIG. 6E, the 0-th to third output signals OUT0 to OUT3 sensed by the 0-th to third input/output sense amplifiers IOSA[0] to IOSA[3] may be fed back or fed forward to the 0-th to third column registers REG_COL[0] to REG_COL[3]. The configuration in which the 0-th to third output signals OUT0 to OUT3 are fed back or fed forward to the 0-th to third column registers REG_COL[0] to REG_COL[3] is similar to that described with reference to FIG. 6C, and thus, additional description will be omitted to avoid redundancy and for conciseness.

As described above, the memory device 100 may perform the internal read operation on a computation output pattern corresponding to a target computation based on a plurality of column compute selection signals generated from a plurality of column registers and may update the plurality of column registers based on a result of the internal read operation. The memory device 100 may perform the target computation with respect to input operands by repeatedly performing the above operation.

Accordingly, the computing operation may be performed inside a memory device that does not include a separate arithmetic processor or a separate arithmetic logic unit. Also, because the computing operation is performed by repeatedly reading a plurality of computation output patterns stored in memory cells, various types of computations may be supported.

FIG. 7 is a diagram for describing an example of a computation output pattern of the memory device 100 of FIG. 1, according to some embodiments. The case where each of the column compute selection signals CCSL0 to CCSL3 is a 4-bit signal and each of the 0-th to third output signals OUT0 to OUT3 is a 2-bit signal is described with reference to FIGS. 4 to 6E. However, embodiments are not limited thereto.

For example, one column selection circuit CSC may be configured to receive 512 ($=2^6 \times 8$) signals from the bit line sense amplifier BLSA and to output eight signals among the 512 signals. In this case, the column compute selection signal CCSL that is generated by the column register REG_COL may be a 6-bit signal, and an output signal that is sensed by the input/output sense amplifier IOSA may be an 8-bit signal.

That is, output values (e.g., x00, x01, . . . x636, and x637) illustrated in FIG. 7 may be stored in memory cells, which are connected to one word line (e.g., a first word line), from among the plurality of memory cells included in the cell array CAR. When the internal read operation is performed with respect to the first word line, an output signal corresponding to the column compute selection signal CCSL may be output. For example, when the column compute selection signal CCSL is {000000b}, an output signal of {x00, x01, x02, x03, x04, x05, x06, x07 b} may be output through the internal read operation performed with respect to the first word line; when the column compute selection signal CCSL is {000001b}, an output signal of {x10, x11, x12, x13, x14, x15, x16, x17 b} may be output through the internal read operation performed with respect to the first word line.

In an embodiment, magnitudes of an input value and an output value of a lookup table may be determined based on the structure of the memory device 100, the memory cell array 110, or the cell array CAR. For example, the column selection circuit CSC may be implemented to select one of $2^n$ signal sets, and one signal set may include "m" bits. In this case, the column compute selection signal CCSL may include "n" bits, and the output signal may include "m" bits. As such, the computation output pattern LUT_SET stored in the cell array CAR may correspond to a lookup table that provides an m-bit output with respect to an n-bit input.

Figure 8A:
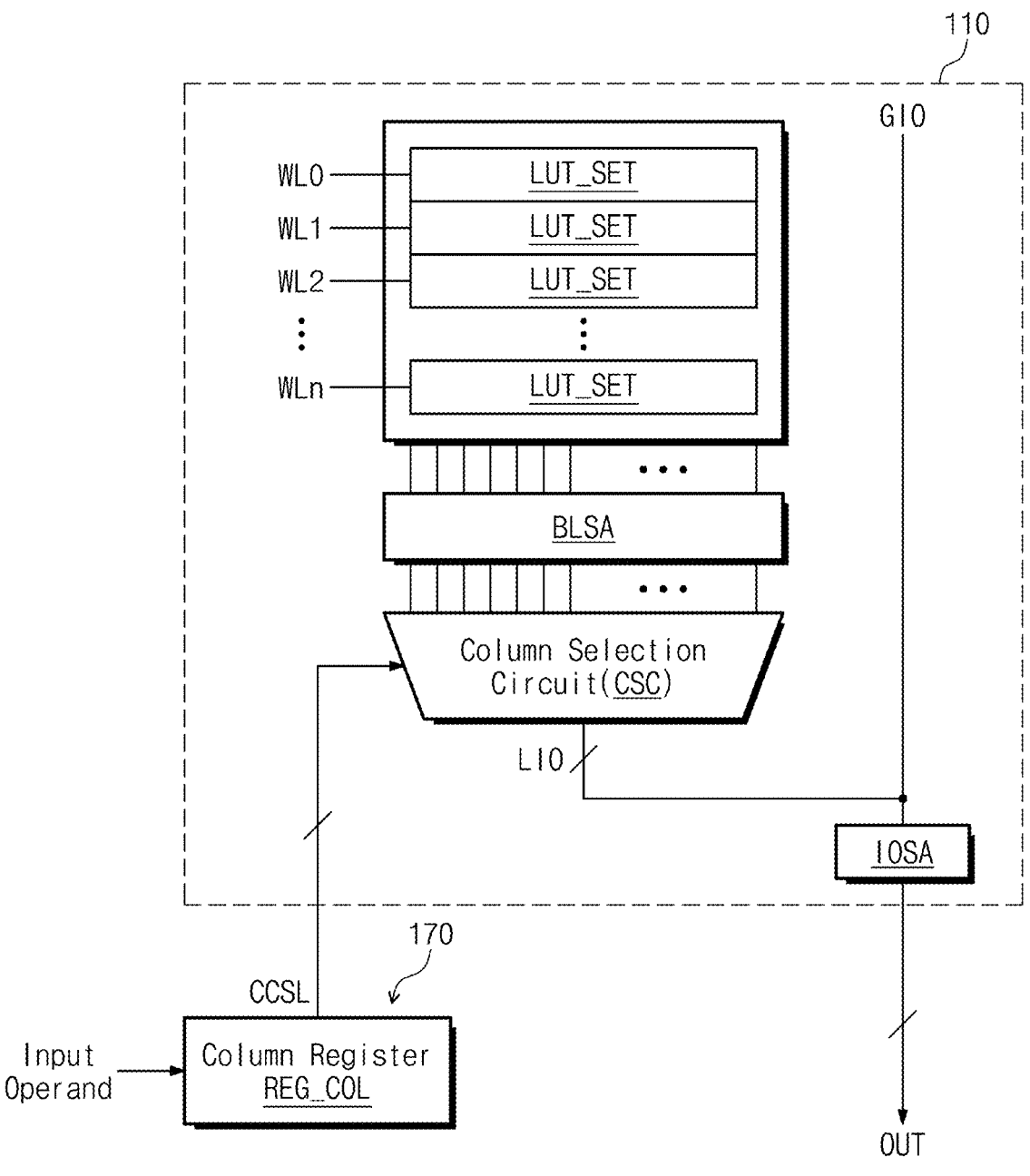
FIGS. 8A and 8B are diagrams for describing a computing operation of the memory device of FIG. 1, according to an embodiment.
Figure 8B:
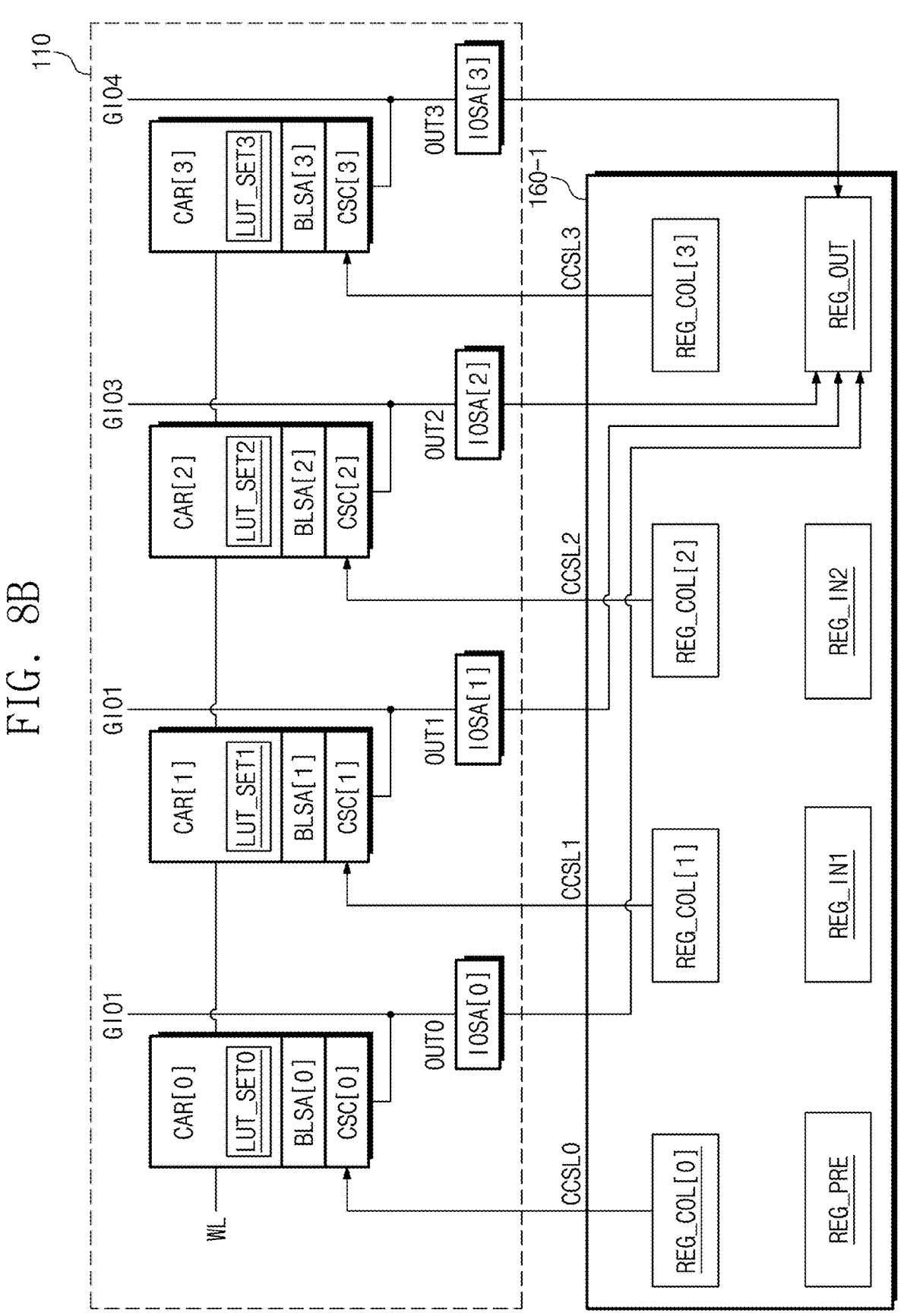

FIGS. 8A and 8B are diagrams for describing a computing operation of a memory device of FIG. 1, according to some embodiments. For convenience of description, components that are unnecessary to describe the computing operation of the memory device 100 are omitted for conciseness.

In an embodiment, the lookup table-based bit-serial computation of the memory device 100 is described with reference to FIGS. 3A to 7. However, embodiments are not limited thereto, and the memory device 100 may perform lookup table-based computation.

For example, as illustrated in FIG. 7, the column register REG_COL may generate the column compute selection signal CCSL based on an input operand. The memory cell array 110 may include the cell array CAR, the bit line sense amplifier BLSA, the column selection circuit CSC, and the input/output sense amplifier IOSA. Operations of the column register REG_COL, the cell array CAR, the bit line sense amplifier BLSA, the column selection circuit CSC, and the input/output sense amplifier IOSA are similar to those described above, and thus, additional description will be omitted to avoid redundancy and for conciseness.

In the embodiment of FIG. 8A, the memory device 100 may output the output signal OUT of the input/output sense amplifier IOSA as a computation result without repeatedly performing the internal read operation. In this case, the memory device 100 may perform the internal read operation only once and may output a lookup table-based computation result.

A computation of a cell array (CAR) unit of FIG. 8A may be expanded to a memory cell array (110) or bank unit. For example, as illustrated in FIG. 8B, a column compute control circuit 160-1 may include the first input register REG_IN1, the second input register REG_IN2, the preset register REG_PRE, the output register REG_OUT, and the plurality of column registers REG_COL[0] to REG_COL[3]. The first input register REG_IN1, the second input register REG_IN2, the preset register REG_PRE, the output register REG_OUT, and the plurality of column registers REG_COL[0] to REG_COL[3] are similar to those described above, and thus, additional description will be omitted to avoid redundancy and for conciseness.

The memory cell array 110 may include the plurality of cell arrays CAR[0] to CAR[3]. The plurality of cell arrays CAR[0] to CAR[3] may respectively store the plurality of computation output patterns LUT_SET0 to LUT_SET3. The plurality of cell arrays CAR[0] to CAR[3] may be respectively connected to the plurality of bit line sense amplifiers BLSA[0] to BLSA[3]. The plurality of bit line sense amplifiers BLSA[0] to BLSA[3] may be respectively connected to the plurality of column selection circuits CSC[0] to CSC[3]. The plurality of column selection circuits CSC[0] to CSC[3] may respectively output the output signals OUT0 to OUT3 in response to the plurality of column compute selection signals CCSL0 to CCSL3.

The plurality of input/output sense amplifiers IOSA[0] to IOSA[3] may be configured to amplify the plurality of output signals OUT0 to OUT3 output from the plurality of column selection circuits CSC[0] to CSC[3] through the plurality of global input/output lines GIO1 to GIO3 and to output the amplified signals. The 0-th to third outputs OUT0 to OUT3 from the plurality of input/output sense amplifiers IOSA[0] to IOSA[3] may be provided to the output register REG_OUT.

As described above, the memory device 100 may perform the lookup table-based computation through one internal read operation.

Figure 9:
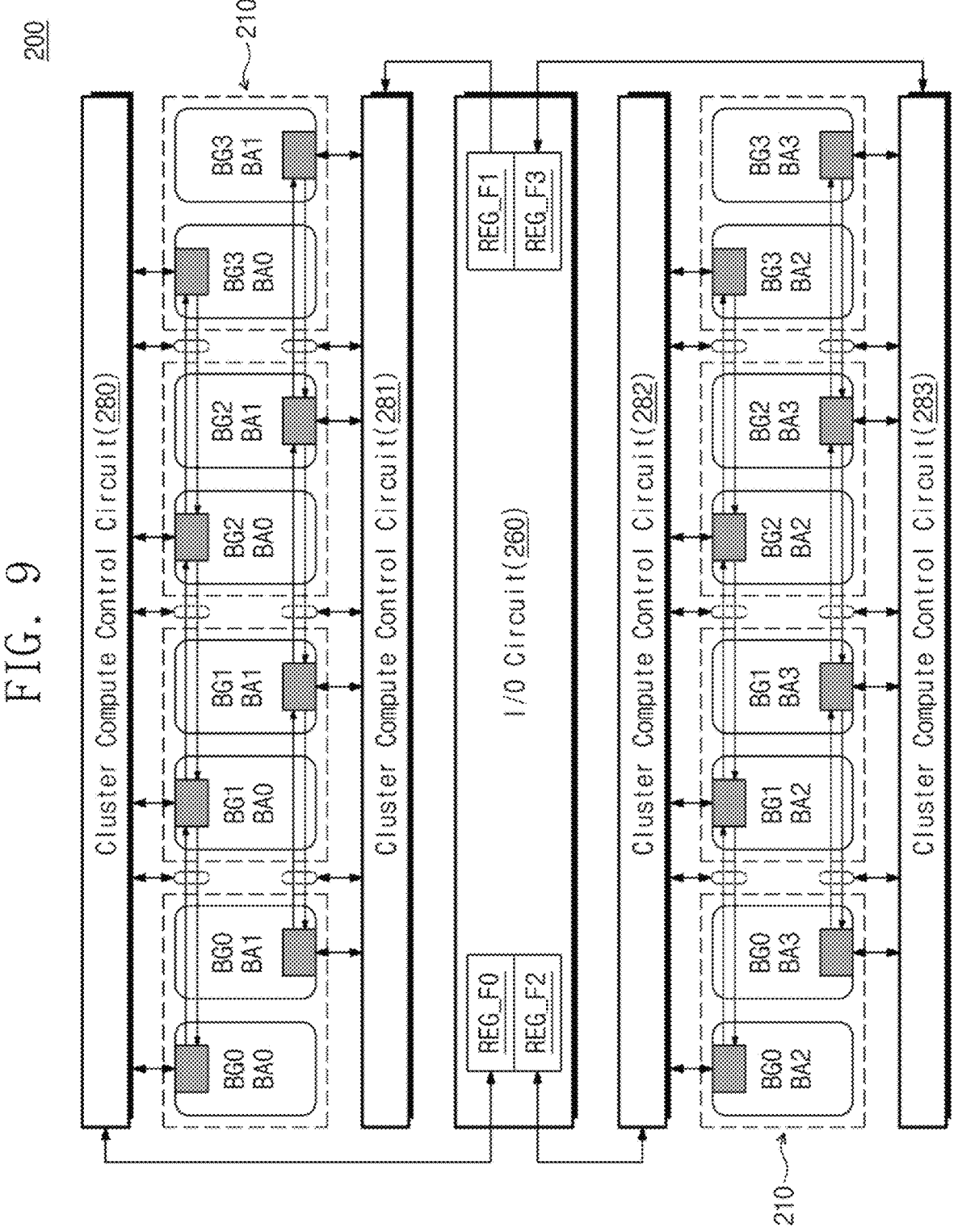
FIG. 9 is a block diagram illustrating a memory device according to an embodiment.

FIG. 9 is a block diagram illustrating a memory device according to an embodiment. In an embodiment, components that are unnecessary to describe a structure of a memory device 200 with the computation function are omitted in FIG. 9 for conciseness.

Referring to FIG. 9, the memory device 200 may include a memory cell array 210, an input/output (I/O) circuit 260, and a plurality of cluster compute control circuits 280 to 283. In an embodiment, the memory device 200 may further include various components such as a CA buffer, an address decoder, a command decoder, and a control logic circuit.

The memory cell array 210 may include a plurality of banks BG0/BA0 to BG3/BA3. Each of the plurality of banks BG0/BA0 to BG3/BA3 may be the memory cell array 110 or the plurality of cell arrays CAR, the plurality of bit line sense amplifiers, the plurality of column selection circuits, and the input/output sense amplifiers, which are described with reference to FIGS. 1 to 8B.

In an embodiment, each of the plurality of banks BG0/BA0 to BG3/BA3 may include the column compute control circuit described with reference to FIGS. 1 to 8B. That is, each of the plurality of banks BG0/BA0 to BG3/BA3 may be configured to perform the lookup table-based bit-serial computation or the lookup table-based computation.

In an embodiment, when the plurality of banks BG0/BA0 to BG3/BA3 perform independent computing operations, a range (or a size) of an operand may be limited depending on the structure of the plurality of banks BG0/BA0 to BG3/BA3. For example, it is assumed that each of the plurality of banks BG0/BA0 to BG3/BA3 includes 16 lanes. One lane may indicate a unit of data that are output in response to one column compute selection signal. That is, one lane may include a configuration implemented with the cell array CAR, the bit line sense amplifier BLSA, the column selection circuit CSC, and the input/output sense amplifier IOSA described with reference to FIG. 4A.

When each of the plurality of banks BG0/BA0 to BG3/BA3 includes 16 lanes, a range of an operand capable of being computed in a single bank may be limited by the number of lanes. To increase a range of an operand capable of being computed, there is a need to increase the size of the column compute selection signal CCSL or the size of the output signal OUT of the column selection circuit CSC. However, the size of the column compute selection signal CCSL or the size of the output signal OUT of the column selection circuit CSC may be limited depending on the structure of the memory device 100, and thus, a range of an operand capable of being computed in a single bank may be limited to a specific range.

In the embodiment of FIG. 9, the memory device 200 may perform the computing operation in units of a cluster. A cluster may be a unit in which a plurality of banks are included. The 0-th cluster may include the 0-th bank BA0 of the 0-th bank group BG0, the 0-th bank BA0 of the first bank group BG1, the 0-th bank BA0 of the second bank group BG2, and the 0-th bank BA0 of the third bank group BG3. The first cluster may include the first bank BA1 of the 0-th bank group BG0, the first bank BA1 of the first bank group BG1, the first bank BA1 of the second bank group BG2, and the first bank BA1 of the third bank group BG3. The second cluster may include the second bank BA2 of the 0-th bank group BG0, the second bank BA2 of the first bank group BG1, the second bank BA2 of the second bank group BG2, and the second bank BA2 of the third bank group BG3. The third cluster may include the third bank BA3 of the 0-th bank group BG0, the third bank BA3 of the first bank group BG1, the third bank BA3 of the second bank group BG2, and the third bank BA3 of the third bank group BG3.

The 0-th cluster compute control circuit 280 may control the computing operation of the banks included in the 0-th cluster. The first cluster compute control circuit 281 may control the computing operation of the banks included in the first cluster. The second cluster compute control circuit 282 may control the computing operation of the banks included in the second cluster. The third cluster compute control circuit 283 may control the computing operation of the banks included in the third cluster.

Below, for convenience of description, the computing operation of the cluster will be described with reference to the 0-th cluster and the 0-th cluster compute control circuit 280.

The feedback operation FB and the feedforward operation FF may be performed between the column compute control circuits of the banks included in the 0-th cluster under control of the 0-th cluster compute control circuit 280. In detail, the feedback operation FB and the feedforward operation FB may be performed between the column compute control circuit of the 0-th bank BA0 of the 0-th bank group BG0 and the column compute control circuit of the 0-th bank BA0 of the first bank group BG1. The feedback operation FB and the feedforward operation FF may be performed between the column compute control circuit of the 0-th bank BA0 of the first bank group BG1 and the column compute control circuit of the 0-th bank BA0 of the second bank group BG2. The feedback operation FB and the feedforward operation FF may be performed between the column compute control circuit of the 0-th bank BA0 of the second bank group BG2 and the column compute control circuit of the 0-th bank BA0 of the third bank group BG3.

In an embodiment, the 0-th cluster compute control circuit 280 may control the column compute control circuits included in the banks of the 0-th cluster based on a 0-th file register REF_F0 included in the input/output circuit 260. For example, the 0-th file register REF_F0 may include information about an input operand and information about a preset. The 0-th cluster compute control circuit 280 may set the input operand and preset information to the column compute control circuits included in the banks of the 0-th cluster based on the 0-th file register REF_F0.

In an embodiment, as the banks of the 0-th cluster perform the computing operation together, the computation unit may be expanded. For example, it is assumed that an operand capable of being computed in a single bank is a 16-bit operand. In this case, when four banks of the 0-th cluster perform the computing operation together, the size of the operand capable of being computed may be expanded to 64 bits (=16×4). The computing operation of the cluster unit will be described in detail with reference to the following drawings.

In the embodiments of FIG. 9, the input/output circuit 260 may include 0-th to third file registers REG_F0 to REG_F3. The 0-th to third file registers REG_F0 to REG_F3 may be configured to store input operand and preset information that are used by the 0-th to third cluster compute control circuits 280 to 283. An embodiment in which the 0-th to third file registers REG_F0 to REG_F3 are accessed by the 0-th to third cluster compute control circuits 280 to 283 is illustrated, but embodiments are not limited thereto. For example, the 0-th to third file registers REG_F0 to REG_F3 may be mutually shared by the 0-th to third cluster compute control circuits 280 to 283.

Figure 10:
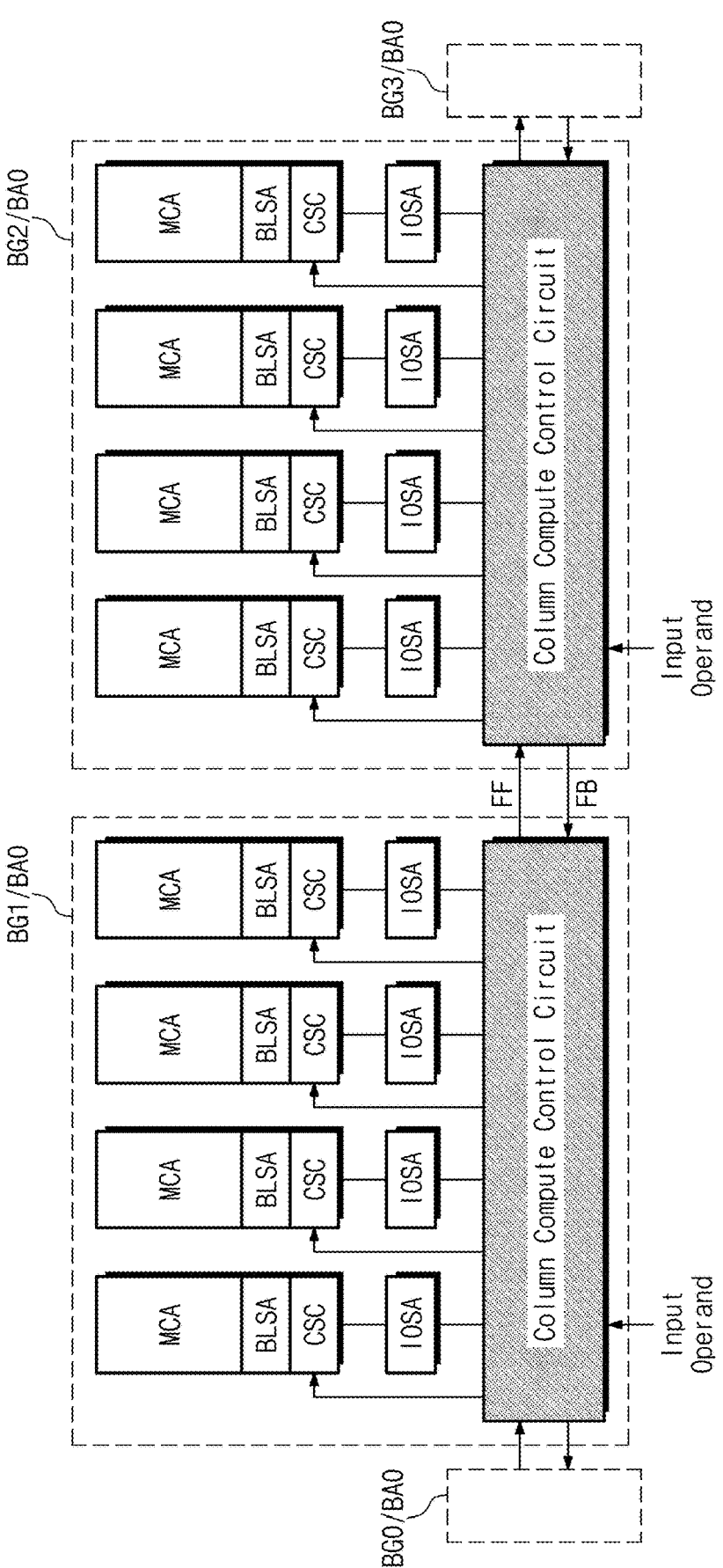
Figure 11:
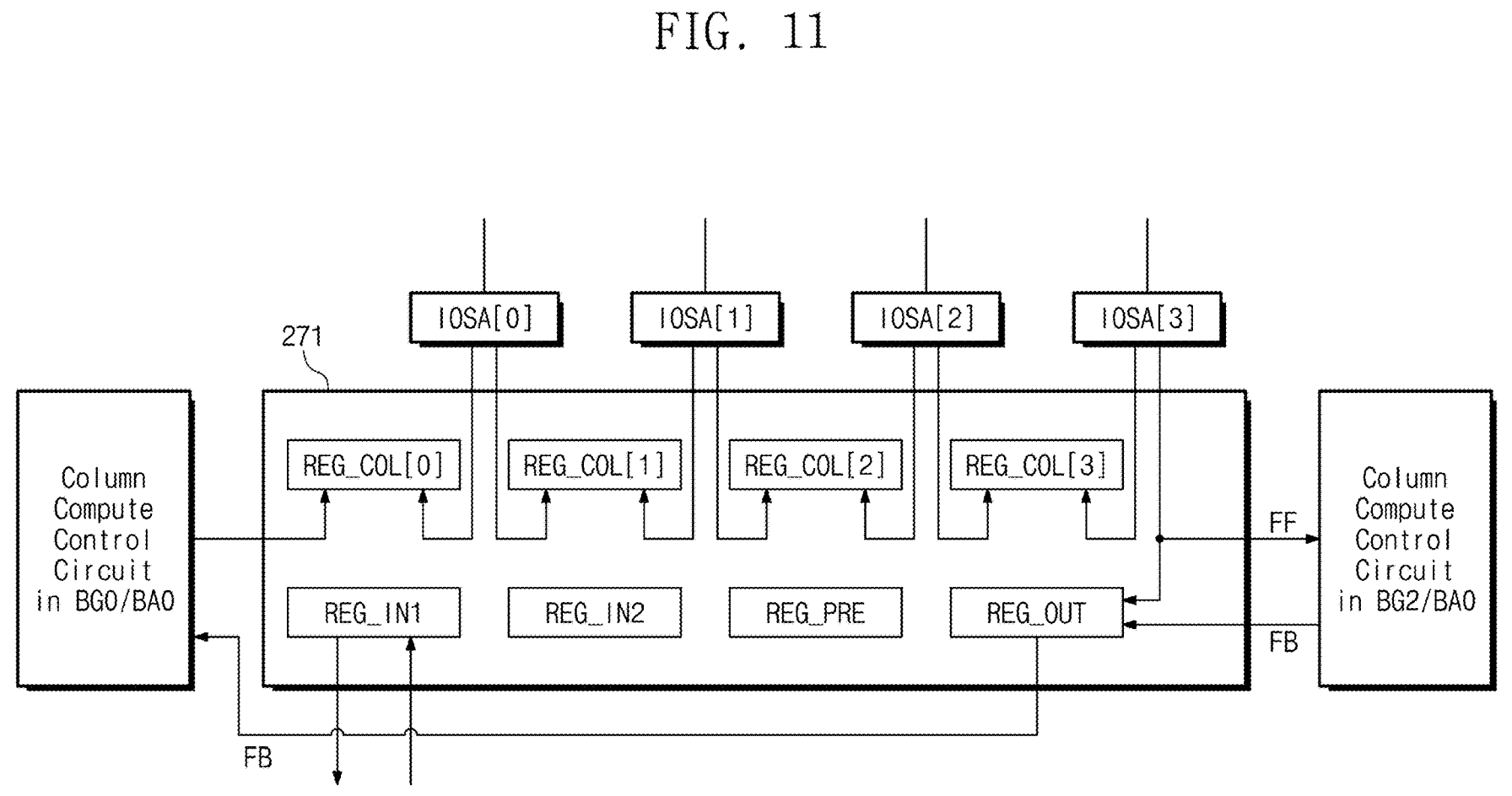

FIGS. 10 and 11 are diagrams for describing a computing operation of a cluster of the memory device 200 of FIG. 9. For convenience of description, components that are unnecessary to describe the computing operation of the cluster unit are omitted for conciseness.

Referring to FIGS. 9, 10, and 11, each of the 0-th bank BA0 of the first bank group BG1 and the 0-th bank BA0 of the second bank group BG2 may include the plurality of cell arrays CAR, the plurality of bit line sense amplifiers BLSA, the plurality of column selection circuits CSC, and the plurality of input/output sense amplifiers IOSA, and the column compute control circuit. A configuration of each of the 0-th bank BA0 of the first bank group BG1 and the 0-th bank BA0 of the second bank group BG2 is similar to that described with reference to FIGS. 3A to 8A, and thus, additional description will be omitted to avoid redundancy and for conciseness.

In an embodiment, the banks BG0/BA0, BG1/BA0, BG2/BA0, and BG3/BA0 included in the 0-th cluster may perform the computing operation together. In this case, input operands may be input to the column compute control circuits of the banks BG0/BA0, BG1/BA0, BG2/BA0, and BG3/BA0 included in the 0-th cluster, and the feedback operation FB and the feedforward operation FF may be performed between the column compute control circuits of the banks BG0/BA0, BG1/BA0, BG2/BA0, and BG3/BA0 included in the 0-th cluster.

In detail, as illustrated in FIG. 11, the 0-th bank BA0 of the first bank group BG1 may include a column compute control circuit 271. The column compute control circuit 271 may include the four column registers REG_COL[0] to REG_COL[3], the first input register REG_IN1, the second input register REG_IN2, the preset register REG_PRE, and the output register REG_OUT. An operation of the column compute control circuit 271 is similar to that described above, and thus, additional description will operation of the omitted to avoid redundancy and for conciseness.

In an embodiment, when the computing operation is performed in units of cluster, the size of the input operand may increase. For example, as described with reference to FIGS. 4A to 6E, it is assumed that the 4-bit multiplication operation is performed through the computing operation of the single bank. In this case, each of the four column registers REG_COL[0] to REG_COL[3], the first input register REG_IN1, and the second input register REG_IN2 may be implemented to store four bits. When the computing operation is performed in a cluster including four banks, the number of bits of the operand may increase to 16 (=4×4). In this case, the 16-bit operand is divided into four 4-bit operands, and the divided operands may be respectively set to column compute control circuits of the four banks.

Afterwards, when the computing operation is performed in units of cluster, the column compute control circuit 271 performs the feedforward operation FF such that some of bits from the last input/output sense amplifier are provided to the first column register of a next bank. The column compute control circuit of the last bank performs the feedback operation FB such that some of bits from the last input/output sense amplifier are provided to the output register of a previous bank. For example, it is assumed that the computing operation is performed in order of the 0-th bank BA0 of the 0-th bank group BG0, the 0-th bank BA0 of the first bank group BG1, the 0-th bank BA0 of the second bank group BG2, and the 0-th bank BA0 of the third bank group BG3. In this case, some of bits of the last input/output sense amplifier of the 0-th bank BA0 of the 0-th bank group BG0 are provided to the first column register of the 0-th bank BA0 of the first bank group BG1, some of bits of the last input/output sense amplifier of the 0-th bank BA0 of the first bank group BG1 are provided to the first column register of the 0-th bank BA0 of the second bank group BG2, and some of bits of the last input/output sense amplifier of the 0-th bank BA0 of the third bank group BG3 are fed back (FB) to the output register of the 0-th bank BA0 of the 0-th bank group BG0, the 0-th bank BA0 of the first bank group BG1, or the 0-th bank BA0 of the second bank group BG2.

As described above, the memory device 200 may perform the computing operation in units of a cluster including a plurality of banks. In the computing operation of the bank unit, a computation range may be limited due to a structural characteristic of the memory device 200. However, since the memory device 200 performs the computing operation in units of cluster, the computation range may be variously expanded.

Figure 12A:
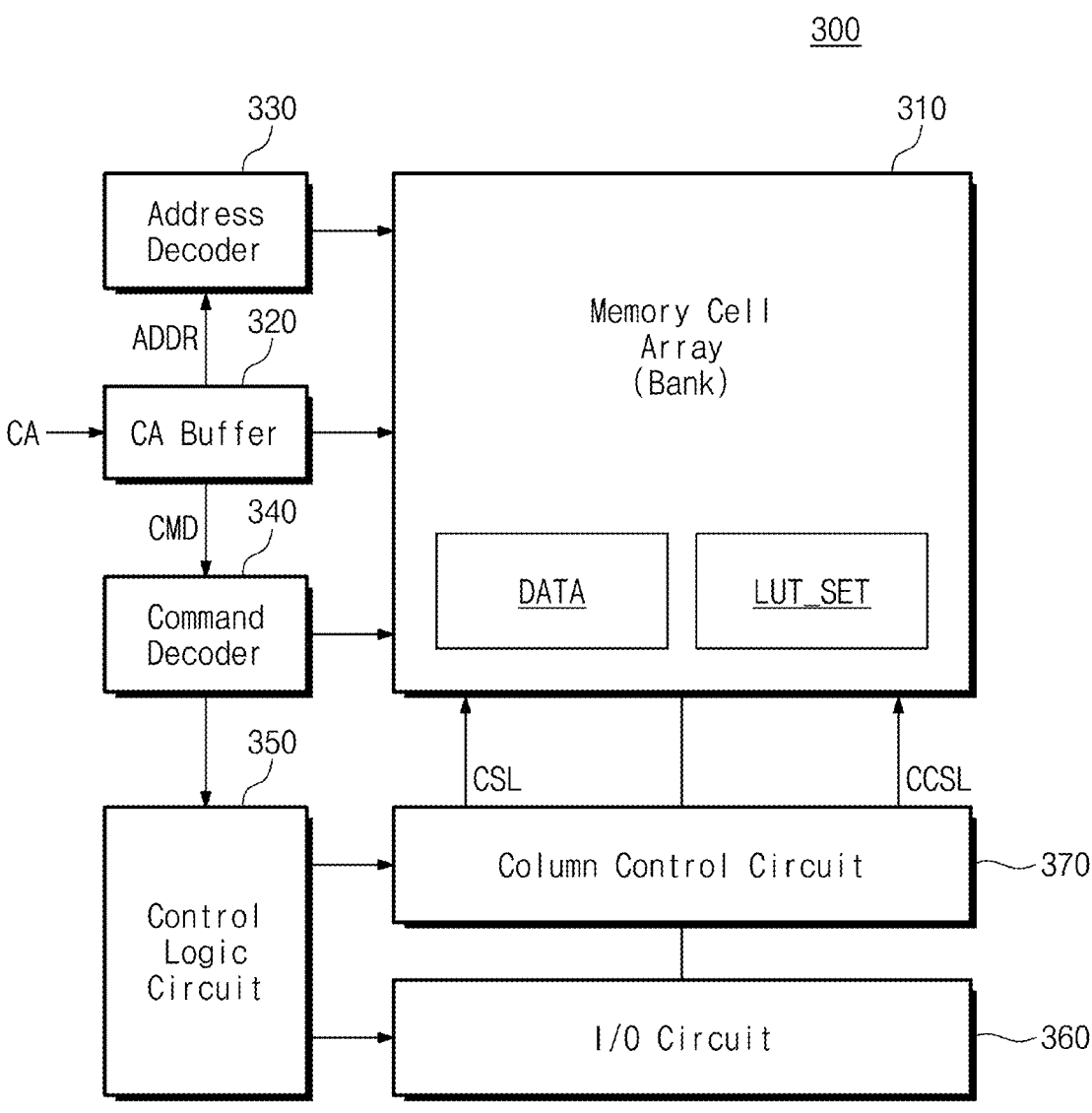
FIGS. 12A and 12B are block diagrams illustrating a memory device according to an embodiment.
Figure 12B:
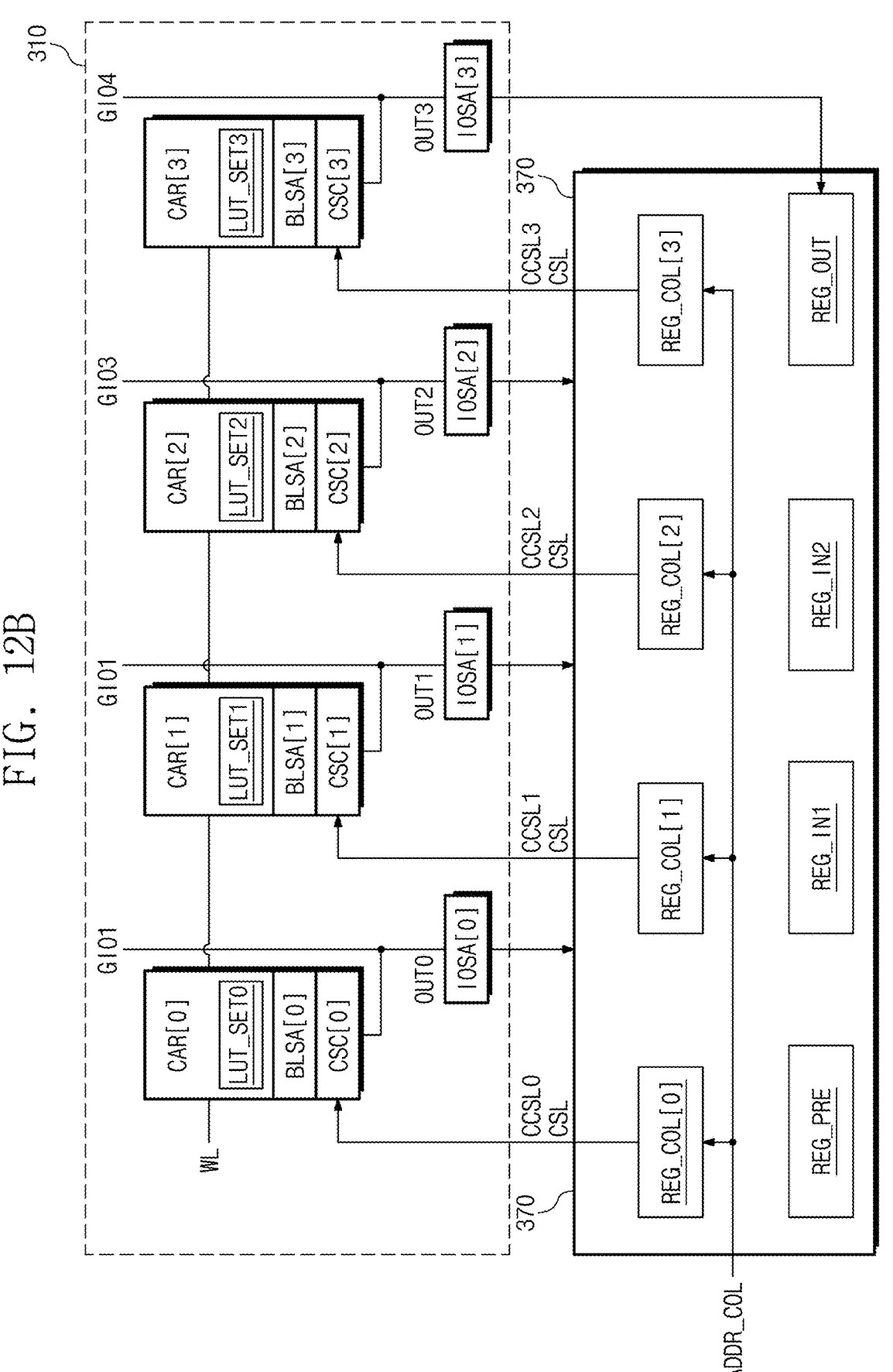

FIGS. 12A and 12B are block diagrams illustrating a memory device according to an embodiment. Referring to FIGS. 12A and 12B, a memory device 300 may include a memory cell array 310, a CA buffer 320, an address decoder 330, a command decoder 340, a control logic circuit 350, an input/output (I/O) circuit 360, and a column control circuit 370. The memory cell array 310, the CA buffer 320, the address decoder 330, the command decoder 340, the control logic circuit 350, and the input/output circuit 360 are described above, and thus, additional description will be omitted to avoid redundancy and for conciseness.

Under control of the control logic circuit 350, the column control circuit 370 may generate the column selection line CSL or the column compute selection signal CCSL. For example, when the memory device 300 operates in a normal mode, the column control circuit 370 may generate the column selection signal CSL based on a column address ADDR_COL as described with reference to FIGS. 2A and 2B. When the memory device 300 operates in a computation mode, the column control circuit 370 may generate the column compute selection signal CCSL based on input operands or a result of the internal computing operation.

In detail, as illustrated in FIG. 12B, the memory cell array 310 may include the plurality of cell arrays CAR[0] to CAR[3], the plurality of bit line sense amplifiers BLSA[0] to BLSA[3], the plurality of column selection circuits CSC [0] to CSC[3], and the plurality of input/output sense amplifiers IOSA[0] to IOSA[3]. The plurality of cell arrays CAR[0] to CAR[3], the plurality of bit line sense amplifiers BLSA[0] to BLSA[3], the plurality of column selection circuits CSC[0] to CSC[3], and the plurality of input/output sense amplifiers IOSA[0] to IOSA[3] are described above, and thus, additional description will be omitted to avoid redundancy and for conciseness.

The column control circuit 370 may include the first input register REG_IN1, the second input register REG_IN2, the preset register REG_PRE, the output register REG_OUT, and the plurality of column registers REG_COL[0] to REG_COL[3]. The first input register REG_IN1, the second input register REG_IN2, the preset register REG_PRE, the output register REG_OUT are described above, and thus, additional description will be omitted to avoid redundancy and for conciseness.

When the memory device 300 operates in the computation mode, the plurality of column registers REG_COL[0] to REG_COL[3] may generate the column compute selection signals CCSL0 to CCSL3 as described with reference to FIGS. 4A to 11. In this case, the column compute selection signals CCSL0 to CCSL3 may have different values depending on operands or a result of a previous internal read operation.

When the memory device 300 operates in the normal mode, the plurality of column registers REG_COL[0] to REG_COL[3] may generate the column selection signals CSL based on the column address ADDR_COL. In this case, the column selection signals CSL output from the plurality of column registers REG_COL[0] to REG_COL[3] may be identical to each other. That is, when the memory device 300 operates in the normal mode, as the same column selection signals CSL are output from the plurality of column registers REG_COL[0] to REG_COL[3], the memory device 300 may operate normally. In an embodiment, when the memory device 300 operates in the normal mode, outputs of the input/output sense amplifiers IOSA[0] to IOSA[3] may not be fed back or fed forward to the plurality of column registers REG_COL[0] to REG_COL[3] and may be provided to the input/output circuit 360.

Figure 13:
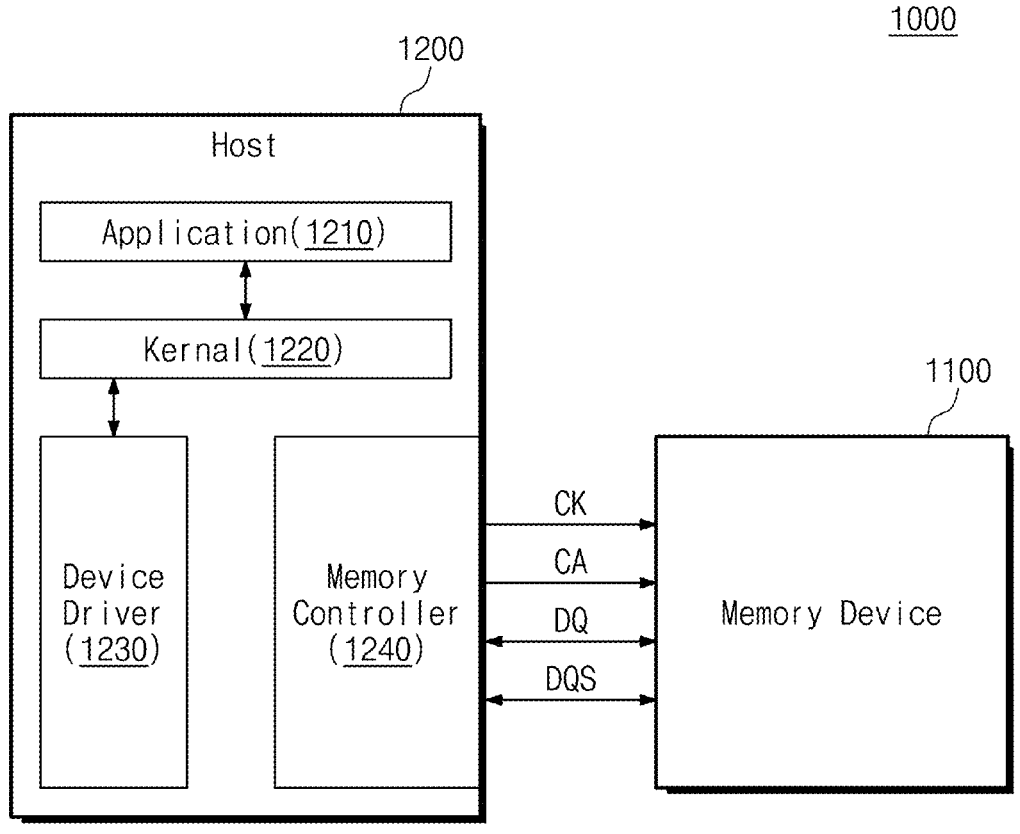
FIG. 13 is a block diagram illustrating a memory system according to an embodiment.

FIG. 13 is a block diagram illustrating a memory system according to an embodiment. Referring to FIG. 13, a memory system 1000 may include a memory device 1100 and a host 1200. Under control of the host 1200, the memory device 1100 may store data or may output the stored data. In an embodiment, the memory device 1100 may be a memory module including a plurality of memories. The memory module may be implemented with various types of dual in-line memory modules (DIMMs) such as an UDIMM (Unbuffered DIMM), an RDIMM (Reduced DIMM), and an SODIMM (Small Outline DIMM).

The host 1200 may be configured to control the memory device 1100. In an embodiment, the host 1200 may include a central processing unit (CPU) or an application processor (AP). For example, the host 1200 may include an application 1210, a kernel 1220, a device driver 1230, and a memory controller 1240. In some embodiments, the application 1210, the kernel 1220, the device driver 1230, and the memory controller 1240 may be executed by the CPU or the AP. In some embodiments, the application 1210, the kernel 1220, the device driver 1230, and the memory controller 1240 may be implemented by hardware control logic. The application 1210 may indicate various programs that are driven on the host 1200. The application 1210 may be configured to generate various access requests for accessing the memory device 1100.

The kernel 1220 may control or manage various system resources that are used in the host 1200. The kernel 1220 may be configured to provide an access request generated by the application 1210 to the device driver 1230. The device driver 1230 may translate the access request from the kernel 1220 into a memory request for accessing the memory device 1100. In an embodiment, the device driver 1230 may be configured to provide various functions for efficiently controlling the memory device 1100.

The memory controller 1240 may be configured to control the memory device 1100 under control of the device driver 1230. For example, to control the memory device 1100, the memory controller 1240 may transmit a clock signal CK and the command/address signal CA to the memory device 1100. The memory controller 1240 may exchange the data signal DQ and the data strobe signal DQS with the memory device 1100. In an embodiment, the memory controller 1240 may communicate with the memory device 1100 through a DDR interface or an LPDDR interface. However, embodiments are not limited thereto. in some embodiments, the memory controller 1240 may communicate with the memory device 1100, based on at least one of various interfaces such as an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, a CF (Compact Flash) card interface, and/or a CXL (Compute eXpress Link) interface.

In an embodiment, the memory device 1100 may be one of the memory devices 100, 200, and 300 described with reference to FIGS. 1 to 12B and may provide the computation function based on the operation method described with reference to FIGS. 1 to 12B.

For the computation function of FIGS. 1 to 12B, the memory device 1100 may store the computation output pattern LUT_SET. That is, as described with reference to FIGS. 1 to 12B, the lookup table-based bit-serial computation may be performed by repeatedly performing the internal read operation on the computation output pattern LUT_SET stored in the memory device 1100.

In an embodiment, the computation output pattern LUT_SET may be implemented by various combinations. The example, the memory device 1100 may store the plurality of computation output patterns LUT_SET. Each of the plurality of computation output patterns LUT_SET or combinations of at least some of the plurality of computation output patterns LUT_SET may support different types of computations. A combination of first and second computation output patterns among the plurality of computation output patterns LUT_SET may support a first arithmetic operation or a first logic operation, and a combination of first and third computation output patterns among the plurality of computation output patterns LUT_SET may support a second arithmetic operation different from the first arithmetic operation or a second logic operation different from the first logic operation. That is, various types of computations may be supported through various combinations of the plurality of computation output patterns LUT_SET.

Figure 14:
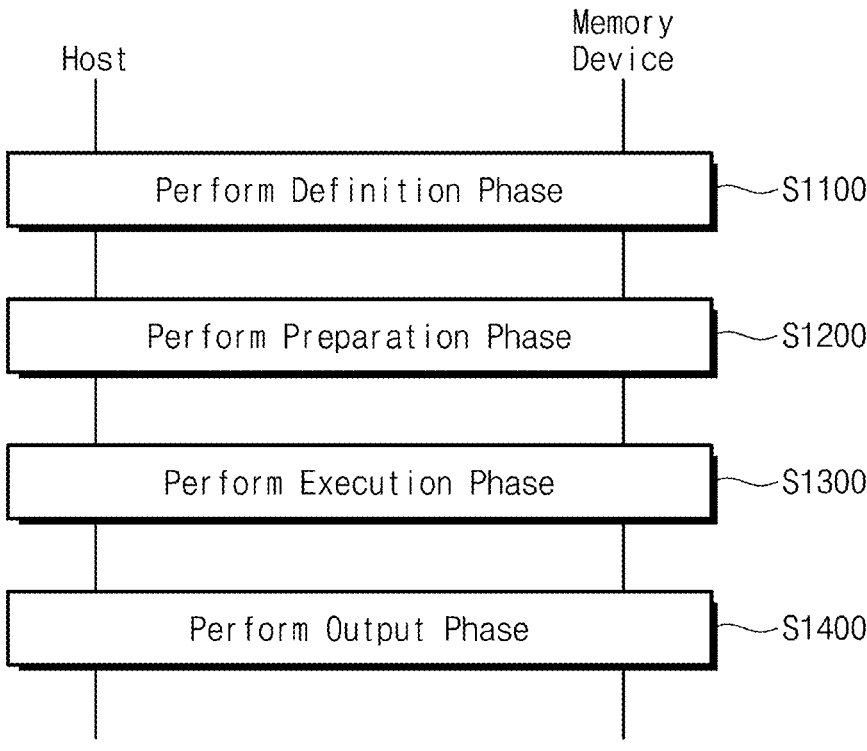
FIG. 14 is a flowchart illustrating an operation of the memory system of FIG. 13, according to an embodiment.

FIG. 14 is a flowchart illustrating an operation of the memory system 1000 of FIG. 13, according to an embodiment. Referring to FIGS. 13 and 14, in operation S1100, the host 1200 and the memory device 1100 may perform a computation definition phase. For example, the memory device 1100 may perform the computing operation by repeatedly performing the internal read operation on the computation output pattern LUT_SET. That is, before performing the computing operation in the memory device 1100, the plurality of computation output patterns LUT_SET may be stored in the memory device 1100. The host 1200 may store a plurality of computation output patterns determined in advance or a plurality of computation output patterns for supporting various computations in the memory device 1100. In an embodiment, the plurality of computation output patterns may be stored in an area of the memory device 1100, which is assigned in advance. In an embodiment, the computation definition phase in operation S1100 may be performed in the initialization phase of the memory device 1100. In some embodiments, the computation definition phase in operation S1100 may be performed while driving the memory device 1100. In an embodiment, through the computation definition phase in operation S1100, the plurality of computation output patterns may be stored or updated in the memory device 1100.

In operation S1200, the host 1200 and the memory device 1100 may perform a preparation phase. For example, operands targeted for the computing operation are used to perform the computing operation in the memory device 1100. The input operand may be a portion of the user data stored in the memory device 1100. In some embodiments, the host 1200 may control the memory device 1100 such that a portion of the user data stored in the memory device 1100 is set to a file register (refer to FIG. 9) or an input register (refer to FIG. 4B). In some embodiments, the host 1200 may transmit operands to the memory device 1100, and the memory device 1100 may set the operands received from the host 1200 to a file register (refer to FIG. 9) or an input register (refer to FIG. 4B).

In operation S1300, the host 1200 and the memory device 1100 may perform an execution phase. For example, under control of the host 1200, the memory device 1100 may repeatedly perform the internal read operation on the computation output pattern stored in memory cells connected to a selected word line. In this case, as described with reference to FIGS. 1 to 12B, as the internal read operation is repeated, column registers may be updated based on a result of the internal read operation. The memory device 1100 may repeat the internal read operation as much as the given number of times.

In operation S1400, the host 1200 and the memory device 1100 may perform an output phase. For example, through operation S1300, the memory device 300 may perform the computing operation and may store a result of the computing operation. In an embodiment, the result of the computing operation may be set to an output register or a file register of the memory device 1100. In some embodiments, the host 1200 may store the result of the computing operation in memory cells of the memory device 1100. In some embodiments, the host 1200 may move the result of the computing operation to any other file register. In some embodiments, the host 1200 may receive the result of the computing operation.

As described above, the host 1200 and the memory device 1100 may perform various computing operations in the memory device 1100 through the definition phase, the preparation phase, the execution phase, and the output phase.

Figure 15:
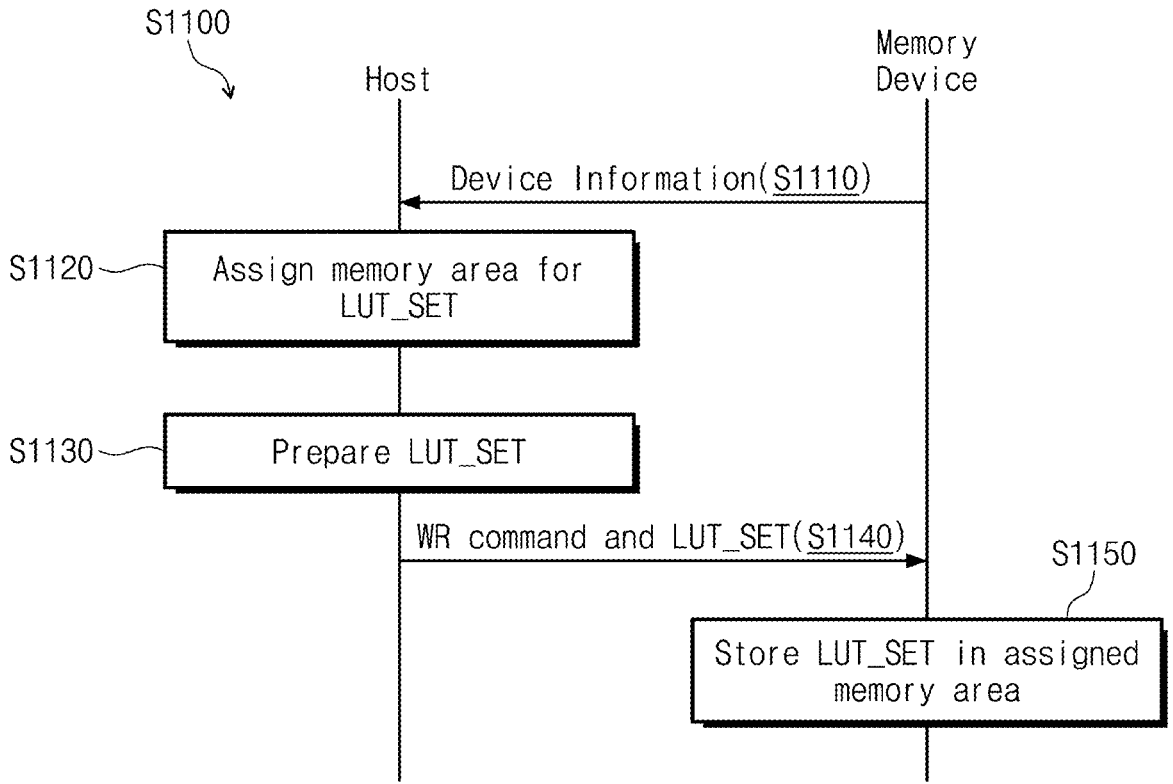
FIG. 15 is a flowchart for describing operation S1100 of the flowchart of FIG. 14 in detail, according to an embodiment.

FIG. 15 is a flowchart for describing operation S1100 of the flowchart of FIG. 14 in detail, according to some embodiments. Referring to FIGS. 13 to 15, operation S1100 may include operation S1110 to operation S1150.

In operation S1110, the host 1200 may receive device information from the memory device 1100. For example, the memory device 1100 may include a serial presence detect (SPD) configured to store the device information about the memory device 1100. The host 1200 may receive the device information of the SPD of the memory device 1100. In an embodiment, in the initialization operation of the memory device 1100, the host 1200 may receive the device information from the memory device 1100. However, embodiments are not limited thereto. For example, a location where the device information is stored and a point in time when the device information is obtained may be variously changed or modified.

In operation S1120, the host 1200 may assign a memory area for a computation output pattern LUT_SET. For example, based on the device information, the host 1200 may recognize the capacity of the memory device 1100 and that the memory device 1100 is a device supporting the lookup table-based bit-serial computation. The host 1200 may allocate a portion of the capacity of the memory device 1100 to the memory area for the computation output pattern LUT_SET.

In operation S1130, the host 1200 may prepare the computation output pattern LUT_SET. For example, the memory device 1100 may perform various types of computations through various combinations of the plurality of computation output patterns LUT_SET. The host 1200 may prepare the plurality of computation output patterns LUT_SET based on a structural characteristic of the memory device 1100 identified by using the device information. In an embodiment, the plurality of computation output patterns LUT_SET may have a data structure determined in advance. In some embodiments, the plurality of computation output patterns LUT_SET may be generated or changed by the user or a request of an application.

In operation S1140, the host 1200 may transmit a write command WR and the computation output pattern LUT_SET to the memory device 1100. In an embodiment, the write command WR may include an address corresponding to the memory area assigned for the computation output pattern LUT_SET. In operation S1150, the memory device

1100 may store the computation output pattern LUT_SET in the assigned memory area in response to the write command.

In an embodiment, depending on the size of the computation output pattern LUT_SET, the host 1200 and the memory device 1100 may repeatedly perform operation S1140 and operation S1150. In an embodiment, the write command used in operation S1140 may be the same as the write command for performing the normal write operation of the memory device 1100.

Figure 16:
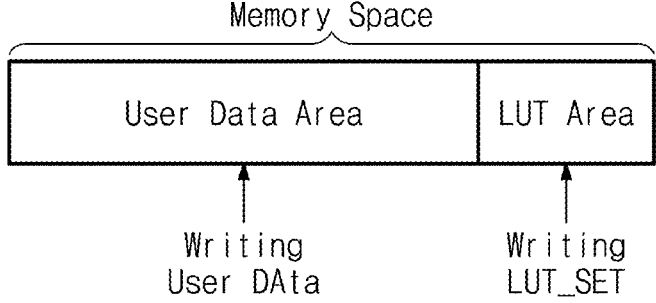
FIG. 16 is a diagram for describing a storage capacity of a memory device of the memory system of FIG. 13, according to an embodiment.

FIG. 16 is a diagram for describing a storage capacity of a memory device of the memory system 1000 of FIG. 13, according to some embodiments. Referring to FIGS. 13 and 16, the storage space (or memory space) of the memory device 1100 may include a user data area and a lookup table area (LUT Area). In an embodiment, the user data area and the lookup table area may be distinguished from each other physically or logically.

The user data area may be used as an area in which the host 1200 stores the user data, and the lookup table area may be used to store a computation output pattern. In an embodiment, the lookup table area may be assigned by the host 1200. In some embodiments, the lookup table area may be an area determined in advance.

Figure 17:
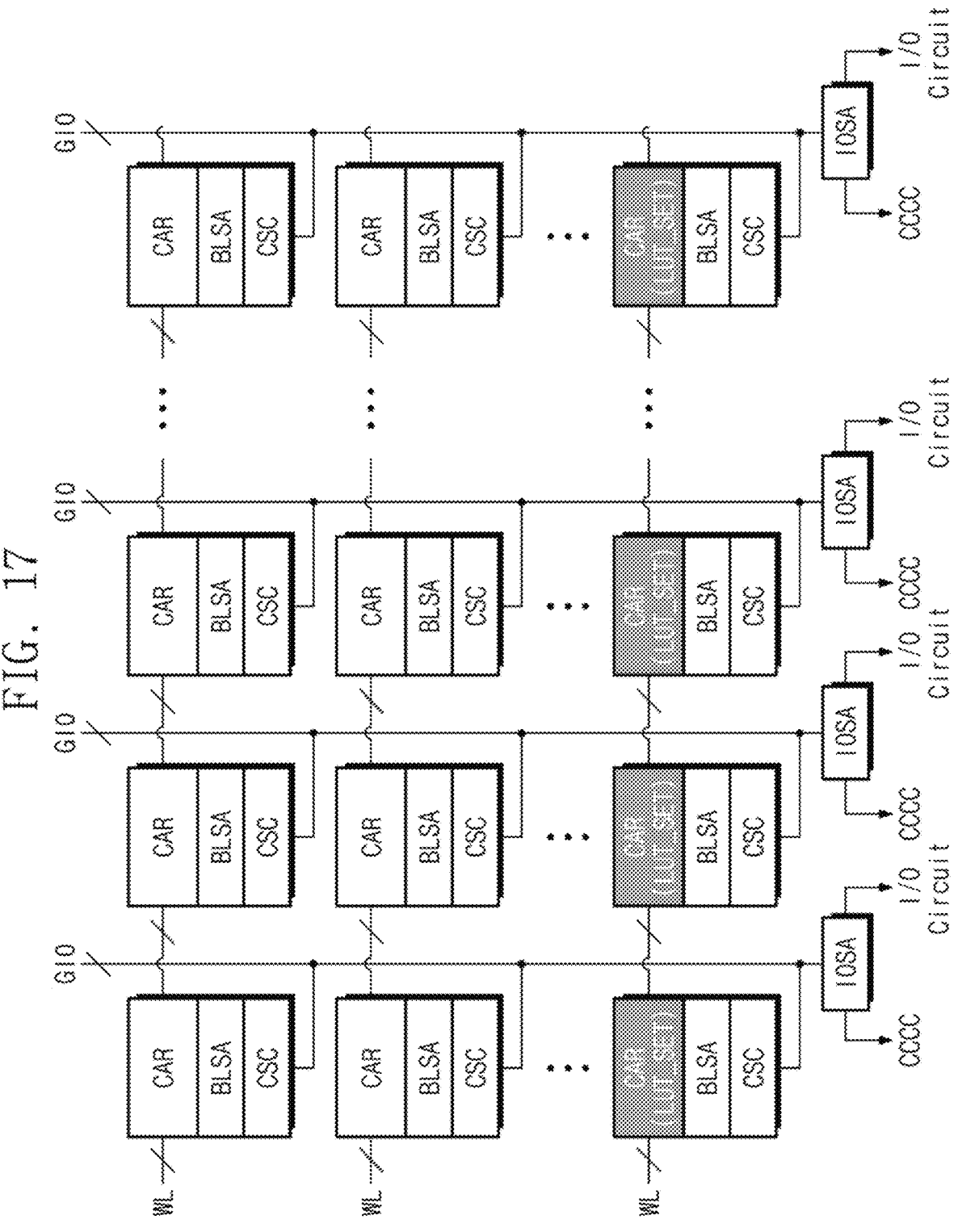
FIG. 17 is a diagram for describing a lookup table of the memory device of FIG. 16, according to an embodiment.

FIG. 17 is a diagram for describing a lookup table of the memory device of FIG. 16, according to some embodiments. In an embodiment, a memory cell array of the memory device 1100 may include the plurality of cell arrays CAR, the plurality of bit line sense amplifiers BLSA, the plurality of column selection circuits CSC, and the plurality of input/output sense amplifiers IOSA.

The plurality of cell arrays CAR may be respectively connected to the plurality of bit line sense amplifiers BLSA. The plurality of bit line sense amplifiers BLSA may be respectively connected to the plurality of column selection circuit CSC. The plurality of cell arrays CAR, the plurality of bit line sense amplifiers BLSA, and the plurality of column selection circuits CSC may be arranged in a row direction and a column direction. The cell arrays CAR disposed at the same row may share the same word lines WL.

The column selection circuits CSC disposed at the same column may be connected to the same global input/output lines GIO. In an embodiment, when the memory device 1100 performs the computing operation, column selection circuits disposed at different columns may operate in response to different or independent column compute selection signals CCSL. When the memory device 1100 performs the normal operation, column selection circuits may operate in response to the same column selection signal CSL.

The plurality of input/output sense amplifiers IOSA may be connected to the plurality of global input/output lines GIO in units of column. Depending on an operation mode (i.e., the computation mode or the normal mode) of the memory device 1100, the plurality of input/output sense amplifiers IOSA may be connected to a column compute control circuit CCCC or an input/output circuit.

In an embodiment, the plurality of cell arrays CAR, the plurality of bit line sense amplifiers BLSA, the plurality of column selection circuits CSC, and the plurality of input/output sense amplifiers IOSA are similar to those described above, and thus, additional description will be omitted to avoid redundancy and for conciseness.

In an embodiment, cell arrays sharing specific word lines from among the plurality of cell arrays CAR may be assigned to the lookup table area for storing the computation output pattern LUT_SET. For example, as illustrated in FIG.

17, the computation output pattern LUT_SET may be stored in the cell arrays CAR sharing a specific word line WL.

When the memory device 1100 operates in the computation mode or performs the computing operation, the memory device 1100 may access the cell arrays CAR connected to the specific word line WL under control of the host 1200 (or the memory controller 1240).

In the embodiment of FIG. 17, an example in which the computation output pattern LUT_SET is stored in a specific cell array CAR (e.g., the cell arrays CAR sharing the specific word line WL) is described, but embodiments are not limited thereto. For example, the computation output pattern LUT_SET may be stored in any other cell arrays CAR.

Figure 18A:
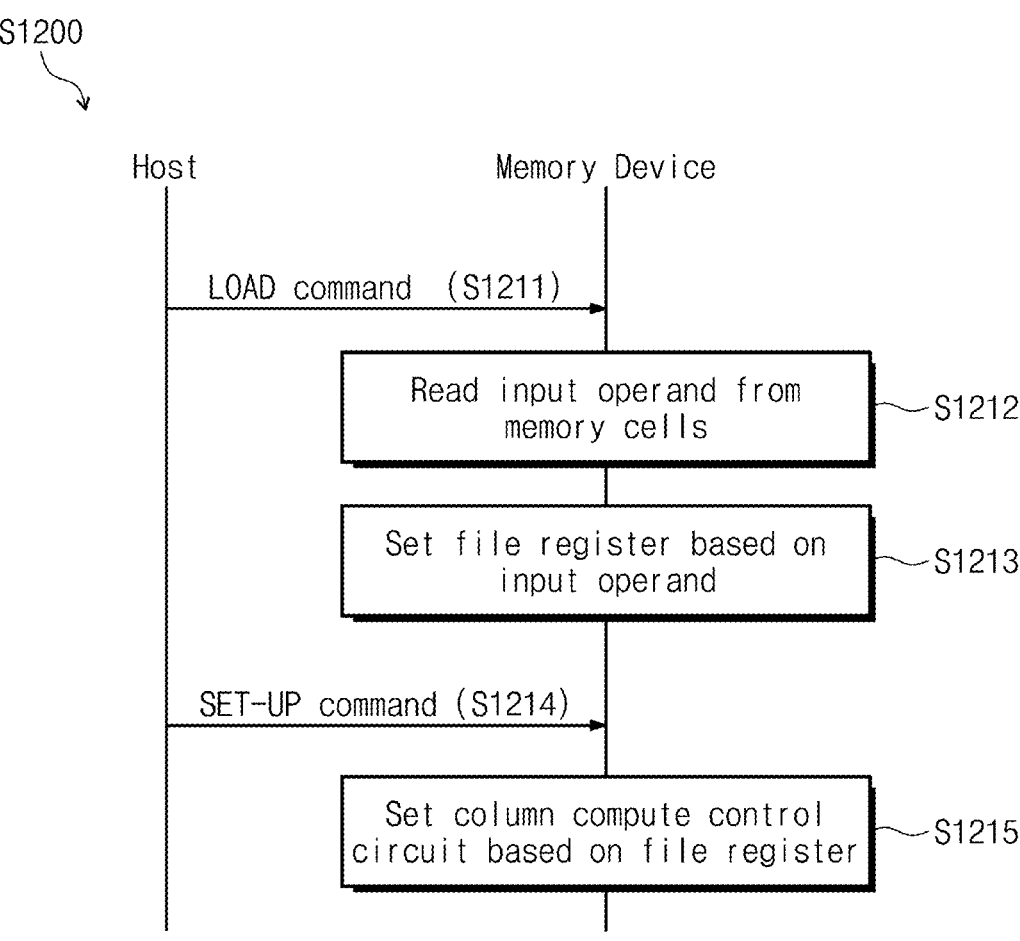
FIGS. 18A and 18B are diagrams illustrating operation S1200 of the flowchart of FIG. 14 in detail, according to an embodiment.
Figure 18B:
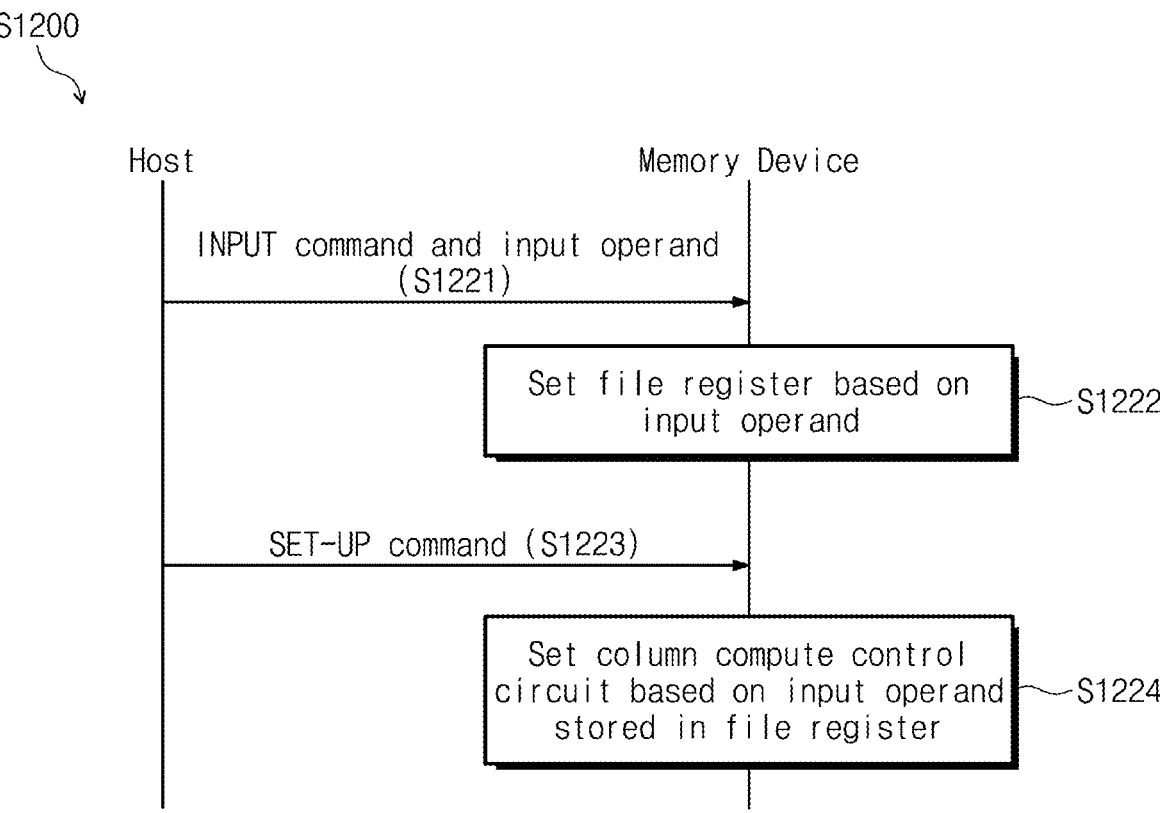

FIGS. 18A and 18B are diagrams illustrating operation S1200 of the flowchart of FIG. 14 in detail, according to some embodiments. Referring to FIGS. 13, 14, and 18A, operation S1200 may include operation S1211 to operation S1215.

In operation S1211, the host 1200 may transmit a load command LOAD to the memory device 1100. For example, the load command LOAD may be a command for loading an input operand stored in the memory device 1100 in a file register (refer to FIG. 9) of the memory device 1100. In some embodiments, the load command LOAD may instruct the memory device 1100 to load the input operand into the file register of the memory device 1100. In an embodiment, the load command LOAD may include information about a command delimiter indicating a load command, an address (e.g., a bank address and a column address), whether to perform an auto-precharge, a cluster number, and a target register.

In operation S1212, the memory device 1100 may read the input operand stored in memory cells in response to the load command LOAD. For example, the load command LOAD may include address information. The memory device 1100 may read the input operand from memory cells corresponding to the address information.

In operation S1213, the memory device 1100 may set a file register based on the read input operand. For example, the memory device 1100 may store the read input operand in the file register. For example, the load command LOAD may include information about a cluster number and a target register. The memory device 1100 may store the input operand in a file register corresponding to the cluster number and the target register.

In an embodiment, the memory device 1100 may perform the read operation on memory cells in response to the load command LOAD, but the read data (i.e., the input operand) may not be transmitted to the host 1200.

In operation S1214, the host 1200 may transmit a setup command SETUP to the memory device 1100. For example, the setup command SETUP may be a command for setting the input operand stored in the file register to various registers of the column compute control circuit. In some embodiments, the setup command SETUP may instruct the memory device 1100 to store the input operand that is stored in the file register into various registers of the column compute control circuit. In an embodiment, the setup command SETUP may include information about a command delimiter indicating a setup command, a cluster number, a first input register, a second input register, a preset register, the number of times of an internal read operation for a computing operation, and a computation unit.

In operation S1215, the memory device 1100 may set the column compute control circuit based on the input operand stored in the file register, in response to the setup command SETUP. For example, the setup command SETUP may include information about a cluster number, a first input register, a second input register, and a preset register. The memory device 1100 may set the first input register, the second input register, and the preset register of the column compute control circuit corresponding to the information included in the setup command SETUP.

Next, referring to FIGS. 13, 14, and 18B, operation S1200 may include operation S1221 to operation S1224.

In operation S1221, the host 1200 may transmit an input command INPUT and an input operand to the memory device 1100. For example, the input command INPUT may be a command for providing the memory device 1100 with an operand to be used in the computing operation of the memory device 1100. In an embodiment, the input command INPUT may include information about a command delimiter indicating an input command, an address (e.g., a bank address and a column address), whether to perform an auto-precharge, a cluster number, and a target register.

In operation S1222, the memory device 1100 may set a file register based on the input operand received from the host 1200 in response to the input command INPUT. For example, the memory device 1100 may load the input operand into the file register. For example, the input command INPUT may include information about a cluster number and a target register. The memory device 1100 may set the file register corresponding to the cluster number and the target register based on the input operand.

In operation S1223, the host 1200 may transmit the setup command SETUP to the memory device 1100. In operation S1224, the memory device 1100 may set the column compute control circuit based on the input operand stored in the file register, in response to the setup command SETUP. Operation S1223 and operation S1224 are similar to operation S1214 and operation S1215 of FIG. 18A, and thus, additional description will be omitted to avoid redundancy and for conciseness.

As described above, the memory device 1100 may set the data stored in the memory device 1100 or the data received from the host 1200 as an input operand.

In an embodiment, when operation S1200 is completed, all the column registers of the column compute control circuit of the memory device 1100 may be in an initial setting state.

Figure 19:
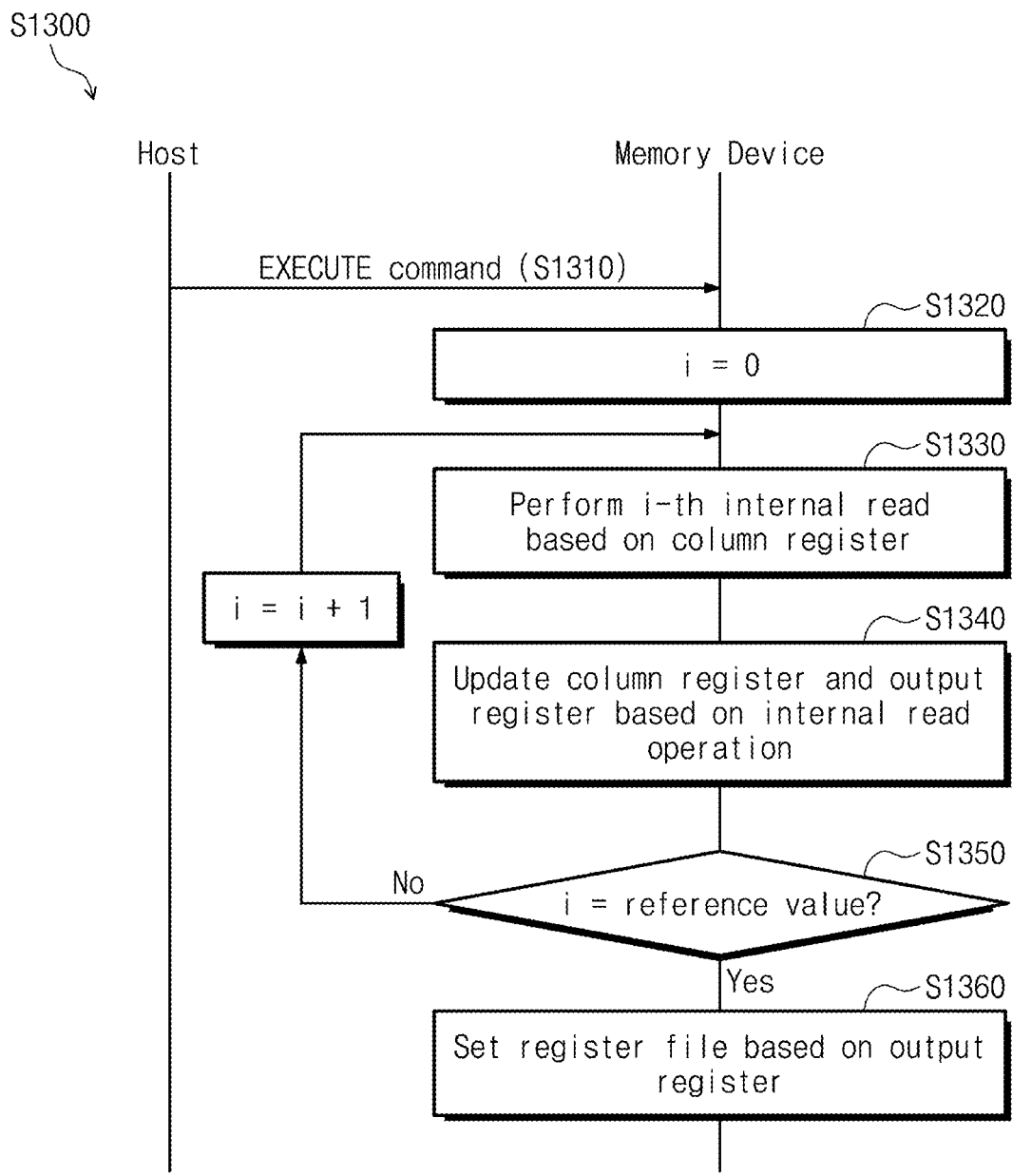
FIG. 19 is a flowchart illustrating operation S1300 of the flowchart of FIG. 14, according to an embodiment.

FIG. 19 is a flowchart illustrating operation S1300 of the flowchart of FIG. 14, according to some embodiments. Referring to FIGS. 13, 14, and 19, operation S1300 may include operation S1310 to operation S1360.

In operation S1310, the host 1200 may transmit an execution command EXECUTE to the memory device 1100. The execution command EXECUTE may be a command for repeating the internal read operation for the computing operation in the memory device 1100. In some embodiments, the execution command EXECUTE may instruct the memory device 1100 to repeat the internal read operation for the computing operation in the memory device 1100. In an embodiment, the execution command EXECUTE may include information about a command delimiter indicating an execution command, a cluster number, and a target register.

In operation S1320, a variable "i" is set to 0". The variable "i" is for describing the iteration of the internal read operation that is performed in the memory device 1100, and embodiments are not limited thereto.

In operation S1330, the memory device 1100 may perform the i-th internal read operation based on column registers of a column compute control circuit. For example, after operation S1200 is completed, the column registers of the memory device 1100 are set to an initial state for the computing operation. As such, the memory device 1100 may perform the internal read operation as described with reference to FIGS. 4A to 12B. When the internal read operation is performed, an output signal corresponding to a column compute selection signal generated from each column register may be provided to an input/output sense amplifier.

In operation S1340, the memory device 1100 may update a column register and an output register based on the internal read operation. A configuration associated with the updating of the column register and the output register is described with reference to FIGS. 6A to 6E, and thus, additional description will be omitted to avoid redundancy and for conciseness.

In operation S1350, whether the variable "i" is a reference value is determined. For example, the setup command SETUP in operation S1214 or operation S1223 may include information about the number of times of the internal read operation. That the variable "i" is not the reference value means that the internal read operation is not performed as much as the given number of times defined by the setup command SETUP. In some embodiments, the reference value may be the maximum value discussed above. When it is determined that the variable "i" is not the reference value (operation S1350, No), the variable "i" increases as much as "1", and the memory device 1100 again performs operation S1330.

When it is determined that the variable "i" is the reference value (operation S1350, Yes), the internal read operation is performed as much as the given number of times defined by the setup command SETUP, and in operation S1360, the memory device 1100 may set a file register based on a value of the output register. For example, the execution command EXECUTE may include information about a target register. The memory device 1100 may store a computation result (i.e., the value of the output register) in the file register corresponding to the target register whose information is included in the execution command EXECUTE.

Figure 20A:
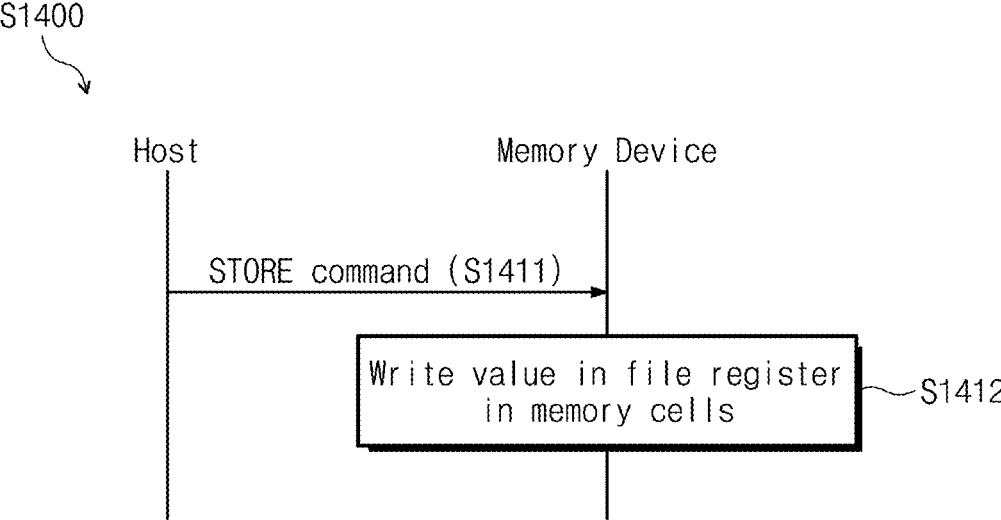
FIGS. 20A, 20B, and 20C are flowcharts illustrating operation S1400 of the flowchart of FIG. 14, according to an embodiment.
Figure 20B:
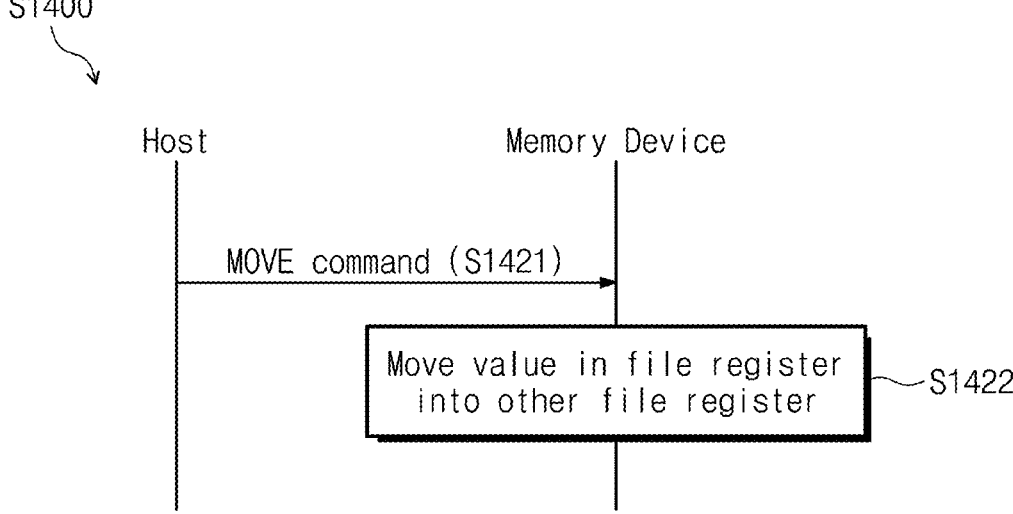
Figure 20C:
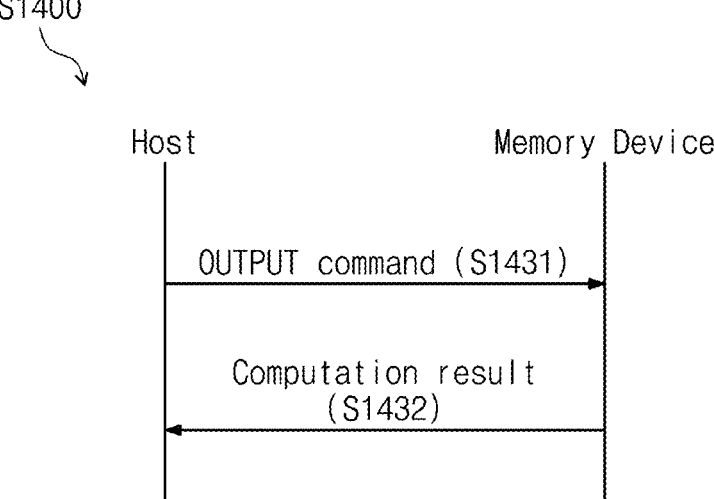

FIGS. 20A, 20B, and 20C are flowcharts illustrating operation S1400 of the flowchart of FIG. 14, according to some embodiments. Referring to FIGS. 13, 14, and 20A, operation S1400 may include operation S1411 and operation S1412.

In operation S1411, the host 1200 may transmit a store command STORE to the memory device 1100. For example, the store command STORE may be a command for storing a result of the computing operation of the memory device 1100 in memory cells of the memory device 1100. In some embodiments, the store command STORE may instruct the memory device 1100 to store the result of the computing operation of the memory device 1100 in memory cells of the memory device 1100. In an embodiment, the store command STORE may include information about a command delimiter indicating a store command, an address (e.g., a bank address and a column address), whether to perform an auto-precharge, a cluster number, and a source register.

In operation S1412, the memory device 1100 may write a value of a file register of the memory device 1100 in memory cells in response to the store command STORE. For example, when operation S1300 is completed, the computation result is set to the file register of the memory device 1100. The memory device 1100 may store the value of the file register corresponding to the cluster number in memory cells corresponding to an address. In this case, information about the cluster number and the address may be included in the store command STORE.

According to the flowchart of FIG. 20A, the host 1200 may instruct the memory device 1100 to directly store the result of the computing operation performed by the memory device 1100 in the memory device 1100.

Next, referring to FIGS. 13, 14, and 20B, operation S1400 may include operation S1421 and operation S1422.

In operation S1421, the host 1200 may transmit a move command MOVE to the memory device 1100. For example, the move command MOVE may be a command for moving the result of the computing operation of the memory device 1100 to any other file register of the memory device 1100. In some embodiments, the move command MOVE may instruct the memory device 1100 to move the result of the computing operation of the memory device 1100 to any other file register of the memory device 1100. In an embodiment, the move command MOVE may include information about a command delimiter indicating a move command, a source cluster number, a source register, a target cluster number, and a target register.

In operation S1422, the memory device 1100 may move a value of the file register of the memory device 1100 to any other file register in response to the move command MOVE. For example, when operation S1300 is completed, the computation result is stored in the file register of the memory device 1100. The memory device 1100 may move a value of a file register corresponding to the source cluster number and the source register to a file register corresponding to the target cluster number and the target register. In this case, information about the source cluster number, the source register, the target cluster number, and the target register may be included in the move command MOVE.

According to the flowchart of FIG. 20B, the host 1200 may instruct the memory device 1100 to move the result of the computing operation performed by the memory device 1100 to any other file register. In this case, the result of the computing operation may be used in any other computation of the memory device 1100.

Next, referring to FIGS. 13, 14, and 20C, operation S1400 may include operation S1431 and operation S1432.

In operation S1431, the host 1200 may transmit an output command OUTPUT to the memory device 1100. For example, the output command OUTPUT may be a command for outputting a result of the computing operation of the memory device 1100 to the host 1200. In some embodiments, the host 1200 may instruct the memory device 1100 to output the result of the computing operation of the memory device 1100 to the host 1200. In an embodiment, the output command OUTPUT may include information about a command delimiter indicating an output command, a cluster number, and a source register.

In operation S1432, the memory device 1100 may transmit the computation result to the host 1200 in response to the output command OUTPUT. For example, when operation S1300 is completed, the computation result of the memory device 1100 is stored in a file register. The memory device 1100 may transmit a value (i.e., the computation result) stored in the file register corresponding to the cluster number and the source register to the host 1200.

According to the flowchart of FIG. 20C, the host 1200 may receive the computation result of the memory device 1100.

As described above, the memory device 1100 may perform the computing operation under control of the host 1200. In this case, the memory device 1100 may perform the computing operation based on the method described with reference to FIGS. 1 to 12B. The host 1200 may transmit various commands to the memory device 1100 such that the memory device 1100 performs the computing operation. In other words, the host 1200 may transmit various commands to instruct the memory device 1100 to perform the computing operation. For example, the host 1200 may transmit the load command LOAD, the setup command SETUP, the input command INPUT, the execution command EXECUTE, the store command STORE, the move command MOVE, and the output command OUTPUT to the memory device 1100. The above commands may be defined by the interface between the memory device 1100 and the host 1200. In an embodiment, the memory device 1100 and the host 1200 may communicate with each other based on the DDR interface. The above commands may be implemented with a combination of various commands defined by the DDR interface, a reserved command, or a vender command.

Figure 21:
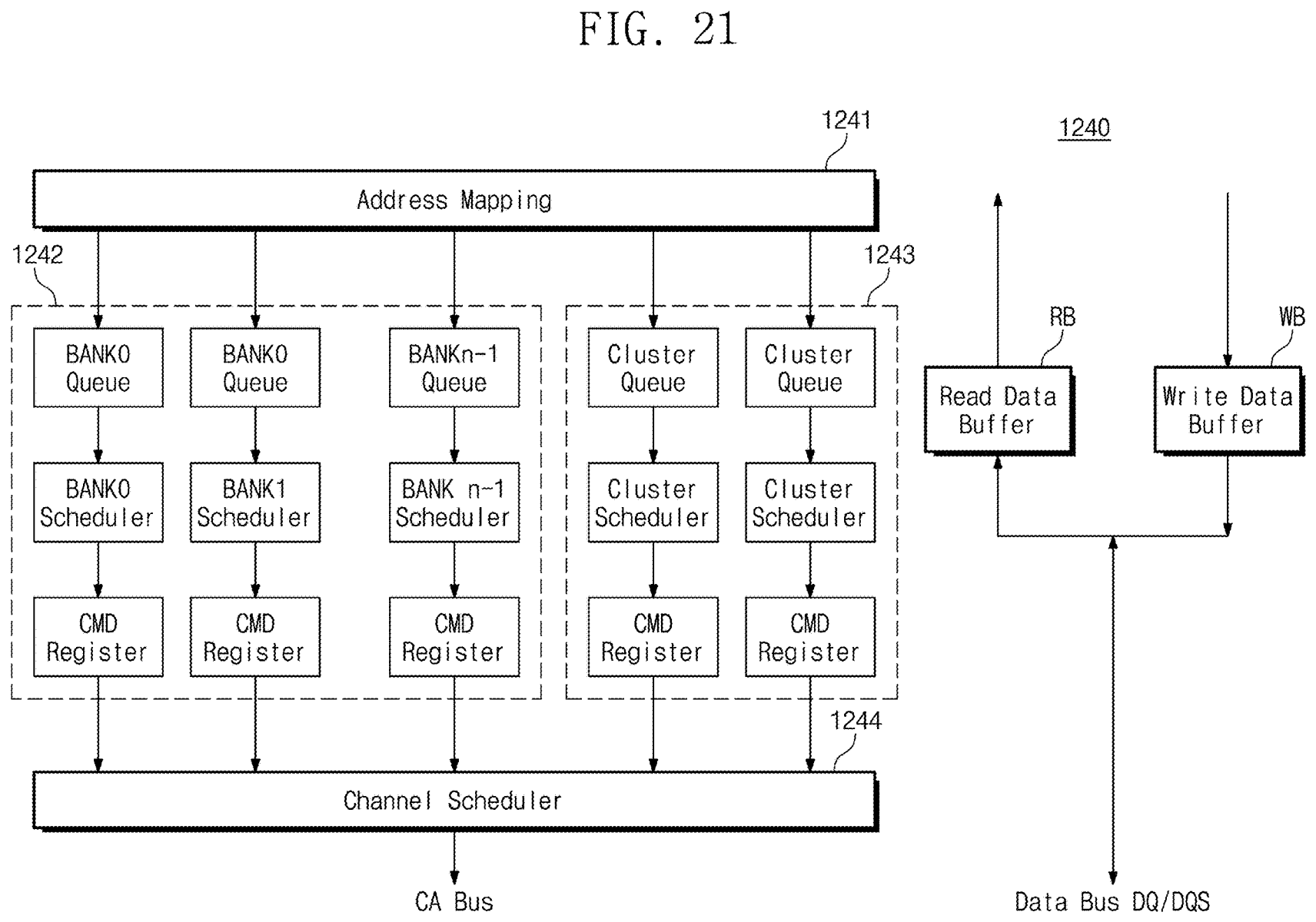

FIG. 21 is a block diagram illustrating a memory controller of a host of the memory system of FIG. 13, according to some embodiments. Referring to FIGS. 13 and 21, the memory controller 1240 may include an address mapping 1241, a bank control circuit 1242, a cluster control circuit 1243, a channel scheduler 1244, a read buffer RB, and a write buffer WB.

The address mapping 1241 may be configured to transfer a request provided from the application 1210, the kernel 1220, or the device driver 1230 of the host 1200 to the bank control circuit 1242 and the cluster control circuit 1243. In an embodiment, a request for the normal operation (e.g., a read operation or a write operation) of the memory device 1100 may be provided to the bank control circuit 1242, and a request for the computing operation of the memory device 1100 may be provided to the cluster control circuit 1243.

The bank control circuit 1242 may be configured to control the normal operation of the memory device 1100. For example, the bank control circuit 1242 may include a plurality of bank queues, a plurality of bank schedulers, and a plurality of command registers. Each of the bank queues may be configured to store requests for the corresponding bank (i.e., requests for the corresponding bank may be added to each of the bank queues). Each of the bank schedulers may be configured to schedule commands stored in the corresponding bank queue. Each of the plurality of command registers may be configured to store a command scheduled by the corresponding bank scheduler.

The cluster control circuit 1243 may be configured to control the computing operation of the memory device 1100. For example, the cluster control circuit 1243 may include a plurality of cluster queues, a plurality of cluster schedulers, and a plurality of command registers. Each of the plurality of cluster queues may be configured to store requests for the corresponding cluster (i.e., requests for the corresponding cluster may be added to each of the plurality of cluster queues). Each of the plurality of cluster schedulers may be configured to schedule commands stored in the corresponding cluster queue. Each of the plurality of command registers may store a command scheduled by the corresponding cluster scheduler.

Through the above configuration, the bank control circuit 1242 may process requests or commands associated with the normal operation (e.g., a read operation or a write operation) associated with the plurality of banks of the memory device 1100, and the cluster control circuit 1243 may process requests or commands associated with the computing operation of the memory device 1100.

The channel scheduler 1244 may be configured to schedule commands generated by the bank control circuit 1242 and the cluster control circuit 1243. For example, the channel scheduler 1244 may schedule the commands generated by the bank control circuit 1242 and the cluster control circuit 1243 and may transfer the scheduled commands to the memory device 1100 through a command address (CA) bus.

The read buffer RB may be configured to receive data from the memory device 1100 through a data bus (e.g., the data signal DQ and the data strobe signal DQS) and to temporarily store the received data. The data temporarily stored in the read buffer RB may be provided to the application 1210 through the device driver 1230.

The write buffer WB may be configured to receive data from the device driver 1230 and to temporarily store the received data. The data temporarily stored in the write buffer WB may be transmitted to the memory device 1100 through the data bus (e.g., the data signal DQ and the data strobe signal DQS).

In an embodiment, the computation output pattern LUT_SET to be stored in the memory device 1100 for the computing operation may be temporarily stored in the write buffer WB and may be transmitted to the memory device 1100 through the data bus (e.g., the data signal DQ and the data strobe signal DQS).

The computing operation of the memory device 1100 may be supported through the above structure of the memory controller 1240. For example, the CPU or AP of the host 1200 may provide an instruction set for offloading the computation function to the memory device 1100. The application 1210 may request the computing operation from the memory device 1100 by using the instruction set for offloading the computation function. In this case, the above instruction set may be provided to the memory controller 1240, and the memory controller 1240 may process the above instruction set or request by using the cluster control circuit 1243.

In an embodiment, the configuration of the memory controller 1240 illustrated in FIG. 21 is provided as an example, and embodiments are not limited thereto. For example, the address mapping 1241 of the memory controller 1240 may divide the instruction set for the computation function requested from the device driver 1230 in units of bank, so as to be transferred to the bank control circuit 1242. The channel scheduler 1244 may process commands for the computation function to be processed by the bank control circuit 1242 at the same time or in parallel. In this case, the computation function of the memory device 1100 may be supported without the cluster control circuit 1243. In other words, in some embodiments, the cluster control circuit 1243 may be omitted.

Figure 22:
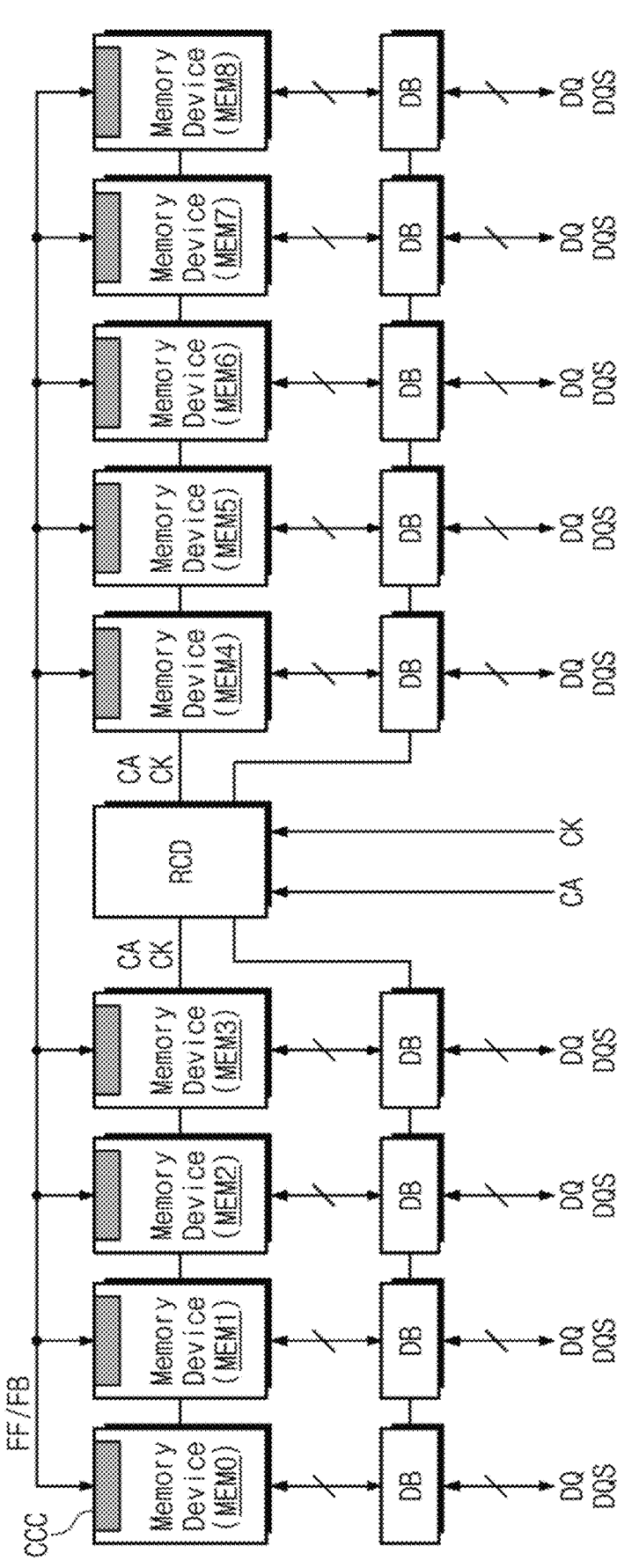
FIG. 22 is a diagram illustrating a memory module according to an embodiment.

FIG. 22 is a diagram illustrating a memory module according to an embodiment. Referring to FIG. 22, a memory module 2100 may include a plurality of memory devices MEM0 to MEM8, a register clock driver RCD, and a plurality of data buffers DB. In an embodiment, the memory module 2100 of FIG. 22 is illustrated as having a structure of an LRDIMM (Load Reduced Dual In-line Memory Module), but embodiments are not limited thereto. For example, the memory module 2100 may be implemented with various types of memory modules such as an UDIMM, an RDIMM, an SODIMM, and/or NVDIMM (Non-Volatile DIMM).

The register clock driver RCD may receive the command/address signal CA and the clock signal CK from the external device (e.g., a memory controller). The register clock driver RCD may control the plurality of data buffers DB based on the received signals or may transfer the received signals to the plurality of memory devices MEM0 to MEM8.

Under control of the register clock driver RCD, the plurality of data buffers DB may exchange data with the external device through the data signals DQ and the data strobe signals DQS. In some embodiments, under control of the register clock driver RCD, the plurality of data buffers DB may exchange data with the plurality of memory devices MEM0 to MEM8.

The plurality of memory devices MEM0 to MEM8 may operate in response to the received command/address signal CA and the received clock signal CK. In an embodiment, each of the plurality of memory devices MEM0 to MEM8 may include the memory device described with reference to FIGS. 1 to 21. Each of the plurality of memory devices MEM0 to MEM8 may include a compute control circuit CCC. The compute control circuit CCC may include the column compute control circuit and the cluster compute control circuit described with reference to FIGS. 1 to 21. That is, each of the plurality of memory devices MEM0 to MEM8 may perform the computing operation based on the method described with reference to FIGS. 1 to 21.

In an embodiment, at least some of the plurality of memory devices MEM0 to MEM8 may be configured to perform one computing operation together. For example, it is assumed that an operand capable of being computed in each of the plurality of memory devices MEM0 to MEM8 is an N-bit operand. In this case, when the 0-th and first memory devices MEM0 and MEM1 perform the computing operation together, the range of the operand capable of being computed may increase to 2×N bits. To this end, the compute control circuits CCC of the plurality of memory devices MEM0 to MEM8 may perform the feedback operation FB and the feedforward operation FF. A configuration in which the feedback operation FB and the feedforward operation FF are performed between memory devices is similar to the above configuration in which the feedback operation FB and the feedforward operation FF are performed between banks in a single memory device, and thus, additional description will be omitted to avoid redundancy and for conciseness.

In an embodiment, the plurality of memory devices MEM0 to MEM8 may perform the feedback operation FB and the feedforward operation FF through a separate dedicated line or a separate dedicated bus. In an embodiment, the plurality of memory devices MEM0 to MEM8 may perform the feedback operation FB and the feedforward operation FF through the plurality of data buffers DB.

Figure 23:
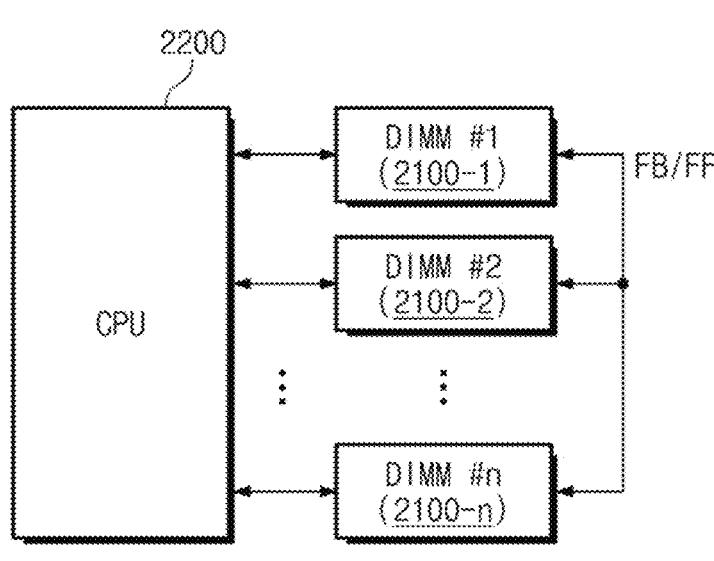
FIG. 23 is a block diagram illustrating a memory system according to an embodiment.

FIG. 23 is a block diagram illustrating a memory system according to an embodiment. Referring to FIG. 23, a memory system 2000 may include a CPU 2200 and a plurality of memory modules 2100-1 to 2100-n. The CPU 2200 may be the host 1200 described with reference to the memory system 1000 of FIG. 13. The CPU 2200 may control the plurality of memory modules 2100-1 to 2100-n. For example, the CPU 2200 may store data in the plurality of memory modules 2100-1 to 2100-n or may read data stored in the plurality of memory modules 2100-1 to 2100-n.

The plurality of memory modules 2100-1 to 2100-n may operate under control of the CPU 2200. In an embodiment, each of the plurality of memory modules 2100-1 to 2100-n may be the memory module 2100 described with reference to FIG. 22. That is, under control of the CPU 2200, each of the plurality of memory modules 2100-1 to 2100-n may perform the computing operation based on the method described with reference to FIGS. 1 to 22.

In an embodiment, at least some of the plurality of memory modules 2100-1 to 2100-n may be perform one computing operation together. For example, it is assumed that an operand capable of being computed in each of the plurality of memory modules 2100-1 to 2100-*n* is an M-bit operand. In this case, when the first and second memory modules 2100-1 and 2100-2 perform the computing operation together, the range of the operand capable of being computed may increase to 2×M bits. To this end, compute control circuits of the plurality of memory modules 2100-1 to 2100-*n* may perform the feedback operation FB and the feedforward operation FF. A configuration in which the feedback operation FB and the feedforward operation FF are performed between memory modules is similar to the configuration (refer to FIG. 22) in which the feedback operation FB and the feedforward operation FF are performed between memory devices, and thus, additional description will be omitted to avoid redundancy and for conciseness.

As described above, according to various embodiments of the present disclosure, a memory device may perform the lookup table-based bit-serial computation without a separate processor or a separate arithmetic logic unit. For example, the memory device may store a plurality of computation output patterns and may perform a target computation by repeatedly performing the internal read operation on a computation output pattern corresponding to the target computation from among the plurality of computation output patterns. In this case, an operand corresponding to the target computation may be applied to a column selection signal of the memory device.

In an embodiment, the computing operation according to various embodiments of the present disclosure may be performed in units of single lane, in units of bank including a plurality of lanes, in units of cluster including a plurality of banks, in units of memory device including a plurality of clusters, in units of memory module including a plurality of memory devices, or in units of memory system including a plurality of memory modules. As described above, to perform the computing operation by using various units, components may be implemented such that the feedback operation FB and the feedforward operation FF are performed therebetween.

Figure 24:
FIG. 24 is a block diagram illustrating a memory system according to an embodiment.

FIG. 24 is a block diagram illustrating a memory system according to an embodiment. Referring to FIG. 24, a memory system 3000 may include a CPU 3100 and a CXL memory 3200. The CPU 3100 may control an overall operation of the memory system 3000. In an embodiment, the CPU 3100 may be the host or the CPU described with reference to FIGS. 1 to 23. The CPU 3100 is illustrated in FIG. 24, but embodiments are not limited thereto. For example, the CPU 3100 may be replaced with one of various processors such as a graphics processing unit (GPU), a neural processing unit (NPU), and/or a data processing unit (DPU). In an embodiment, the CPU 3100 may include a single-core processor or a multi-core processor.

The CPU 3100 may be configured to control the CXL memory 3200. For example, the CPU 3100 may store data in the CXL memory 3200 or may read data stored in the CXL memory 3200. In an embodiment, the CPU 3100 may be configured to request the computing operation from the CXL memory 3200.

The CXL memory 3200 may include a CXL controller 3210 and a memory device 3220. Under control of the CPU 3100, the CXL controller 3210 may store data in the memory device 3220 or may transmit data stored in the memory device 3220 to the CPU 3100. In an embodiment, the memory device 3220 may include the memory device described with reference to FIGS. 1 to 23. That is, the memory device 3220 may include the compute control circuit CCC and may perform the computing operation based on the method described with reference to FIGS. 1 to 23.

In an embodiment, the CPU 3100 and the CXL memory 3200 may communicate with each other based on a CXL (Compute eXpress Link) interface. The CXL interface may refer to a low-latency and high-bandwidth link that supports coherency, memory access, and dynamic protocol muxing of IO protocols such that various connections between accelerators, memory devices, or various electronic devices are made.

The CPU 3100 may transmit a computation request to the CXL memory 3200 through the CXL interface. The CXL controller 3210 of the CXL memory 3200 may control the memory device 3220 in response to the computation request received through the CXL interface such that the computing operation is performed in the memory device 3220.

Figure 25:
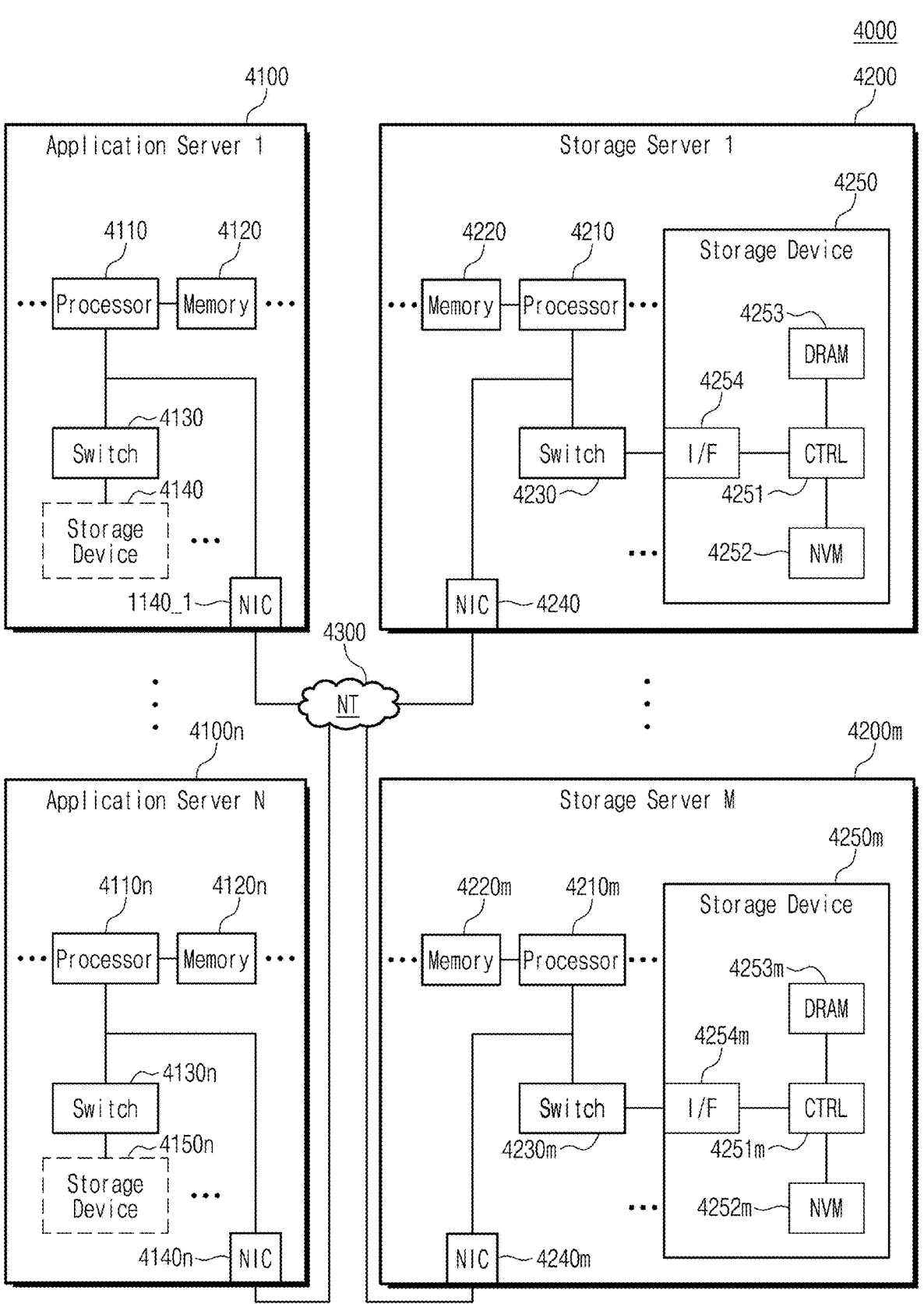
FIG. 25 is a diagram illustrating an example of a data center to which a memory device according to an embodiment is applied.

FIG. 25 is a diagram of a data center 4000 to which a memory device is applied, according to an embodiment.

Referring to FIG. 25, the data center 4000 may be a facility that collects various types of pieces of data and provides services and be referred to as a data storage center. The data center 4000 may be a system for operating a search engine and a database, and may be a computing system used by companies, such as banks, or government agencies. The data center 4000 may include application servers 4100 to 4100*n* and storage servers 4200 to 4200*m*. The number of application servers 4100 to 4100*n* and the number of storage servers 4200 to 4200*m* may be variously selected according to embodiments. The number of application servers 4100 to 4100*n* may be different from the number of storage servers 4200 to 4200*m*.

The application server 4100 or the storage server 4200 may include at least one of processors 4110 and 4210 and memories 4120 and 4220. The storage server 4200 will now be described as an example. The processor 4210 may control all operations of the storage server 4200, access the memory 4220, and execute instructions and/or data loaded in the memory 4220. The memory 4220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 4210 and memories 4220 included in the storage server 4200 may be variously selected. In an embodiment, the processor 4210 and the memory 4220 may provide a processor-memory pair. In an embodiment, the number of processors 4210 may be different from the number of memories 4220. The processor 4210 may include a single-core processor or a multi-core processor. The above description of the storage server 4200 may be similarly applied to the application server 4100. In some embodiments, the application server 4100 may not include a storage device 4150. The storage server 4200 may include at least one storage device 4250. The number of storage devices 4250 included in the storage server 4200 may be variously selected according to embodiments.

The application servers 4100 to 4100*n* may communicate with the storage servers 4200 to 4200*m* through a network 4300. The network 4300 may be implemented by using a fiber channel (FC) or Ethernet. In this case, the FC may be a medium used for relatively high-speed data transmission and use an optical switch with high performance and high availability. The storage servers 4200 to 4200*m* may be provided as file storages, block storages, or object storages according to an access method of the network 4300.

In an embodiment, the network 4300 may be a storage-dedicated network, such as a storage area network (SAN). For example, in some embodiments, the SAN may be an FC-SAN, which uses an FC network and is implemented according to an FC protocol (FCP). In some embodiments, the SAN may be an Internet protocol (IP)-SAN, which uses a transmission control protocol (TCP)/IP network and is implemented according to a SCSI over TCP/IP or Internet SCSI (iSCSI) protocol. In some embodiments, the network 4300 may be a general network, such as a TCP/IP network. For example, the network 4300 may be implemented according to a protocol, such as FC over Ethernet (FCoE), network attached storage (NAS), and NVMe over Fabrics (NVMe-oF).

Hereinafter, the application server 4100 and the storage server 4200 will mainly be described. A description of the application server 4100 may be applied to another application server 4100n, and a description of the storage server 4200 may be applied to another storage server 4200m.

The application server 4100 may store data, which is requested by a user or a client to be stored, in one of the storage servers 4200 to 4200m through the network 4300. The application server 4100 may obtain data, which is requested by the user or the client to be read, from one of the storage servers 4200 to 4200m through the network 4300. For example, the application server 4100 may be implemented as a web server or a database management system (DBMS).

The application server 4100 may access a memory 4120n or a storage device 4150n, which is included in another application server 4100n, through the network 4300. In some embodiments, the application server 4100 may access memories 4220 to 4220m or storage devices 4250 to 4250m, which are included in the storage servers 4200 to 4200m, through the network 4300. Thus, the application server 4100 may perform various operations on data stored in application servers 4100 to 4100n and/or the storage servers 4200 to 4200m. For example, the application server 4100 may execute an instruction for moving or copying data between the application servers 4100 to 4100n and/or the storage servers 4200 to 4200m. In this case, the data may be moved from the storage devices 4250 to 4250m of the storage servers 4200 to 4200m to the memories 4120 to 4120n of the application servers 4100 to 4100n directly or through the memories 4220 to 4220m of the storage servers 4200 to 4200m. The data moved through the network 4300 may be data encrypted for security or privacy.

The storage server 4200 will now be described as an example. An interface 4254 may provide physical connection between a processor 4210 and a controller 4251 and a physical connection between a network interface card (NIC) 4240 and the controller 4251. For example, the interface 4254 may be implemented using a direct attached storage (DAS) scheme in which the storage device 4250 is directly connected with a dedicated cable. For example, the interface 4254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 4200 may further include a switch 4230 and the NIC (Network InterConnect) 4240. The switch 4230 may selectively connect the processor 4210 to the storage device 4250 or selectively connect the NIC 4240 to the storage device 4250 via the control of the processor 4210.

In an embodiment, the NIC 4240 may include a network interface card and a network adaptor. The NIC 4240 may be connected to the network 4300 by a wired interface, a wireless interface, a Bluetooth interface, or an optical interface. The NIC 4240 may include an internal memory, a digital signal processor (DSP), and a host bus interface and be connected to the processor 4210 and/or the switch 4230 through the host bus interface. The host bus interface may be implemented as one of the above-described examples of the interface 4254. In an embodiment, the NIC 4240 may be integrated with at least one of the processor 4210, the switch 4230, and the storage device 4250.

In the storage servers 4200 to 4200m or the application servers 4100 to 4100n, a processor may transmit a command to storage devices 4150 to 4150n and 4250 to 4250m or the memories 4120 to 4120n and 4220 to 4220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 4150 to 4150n and 4250 to 4250m may transmit a control signal and a command/address signal to NAND flash memory devices 4252 to 4252m in response to a read command received from the processor. Thus, when data is read from the NAND flash memory devices 4252 to 4252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 4251 may control all operations of the storage device 4250. In an embodiment, the controller 4251 may include SRAM. The controller 4251 may write data to the NAND flash memory device 4252 in response to a write command or read data from the NAND flash memory device 4252 in response to a read command. For example, the write command and/or the read command may be provided from the processor 4210 of the storage server 4200, the processor 4210m of another storage server 4200m, or the processors 4110 and 4110n of the application servers 4100 and 4100n. DRAM 4253 may temporarily store (or buffer) data to be written to the NAND flash memory device 4252 or data read from the NAND flash memory device 4252. The DRAM 4253 may store metadata. Here, the metadata may be user data or data generated by the controller 4251 to manage the NAND flash memory device 4252. The storage device 4250 may include a secure element (SE) for security or privacy.

In an embodiment, the memories 4120 to 4120n of the application servers 4100 to 4100n or the memories 4220 to 4220m of the storage servers 4200 to 4200m may be implemented with the memory device or memory module described with reference to FIGS. 1 to 24 or may perform the computing operation based on the method described with reference to FIGS. 1 to 24. In an embodiment, at least some of the memories 4120 to 4120n of the application servers 4100 to 4100n or at least some of the memories 4220 to 4220m of the storage servers 4200 to 4200m may be configured to perform one computing operation together. For example, the memories 4120 and 4120m of the application servers 4100 and 4100m may be configured to perform the same computing operation together. In this case, as in the above description, a range of an operand capable of being computed may increase. To this end, the feedback operation and the feedforward operation may be performed between the memories 4120 to 4120*n* of the application servers 4100 to 4100*n* or the memories 4220 to 4220*m* of the storage servers 4200 to 4200*m*.

According to the present disclosure, a memory device repeatedly performs an internal read operation on a computation output pattern. In this case, the internal read operation is performed based on column compute selection signals generated based on operands, and as the internal read operation is performed, the column compute selection signals are updated. When the memory device performs the above operation, a result of computing the operands may be obtained. That is, the memory device may perform various types of computing operations without a separate arithmetic processor. Accordingly, a memory device that provides a computation function while improving performance and reducing costs and an operation method thereof are provided.

While the present disclosure has been described with reference to various embodiments thereof, it will be apparent to those of ordinary skill in the art that various changes and modifications may be made thereto without departing from the spirit and scope of the present disclosure as set forth in the following claims.

What is claimed is:

1. A memory device with a computation function, the memory device comprising:
    a first cell array including first memory cells connected to a plurality of word lines;
    a second cell array including second memory cells connected to the plurality of word lines;
    a first bit line sense amplifier configured to sense first voltages of first bit lines connected to the first memory cells, and output the first voltages;
    a second bit line sense amplifier configured to sense second voltages of second bit lines connected to the second memory cells, and output the second voltages;
    a first column selection circuit configured to output a first output signal among the first voltages output by the first bit line sense amplifier based on a first column compute selection signal;
    a second column selection circuit configured to output a second output signal among the second voltages output by the second bit line sense amplifier based on a second column compute selection signal different from the first column compute selection signal; and
    a column compute control circuit configured to generate the first column compute selection signal and the second column compute selection signal.

2. The memory device of claim 1, further comprising:
    a first input/output sense amplifier configured to sense the first output signal; and
    a second input/output sense amplifier configured to sense the second output signal.

3. The memory device of claim 1, wherein the column compute control circuit includes:
    a first column register configured to generate the first column compute selection signal based on an input operand; and
    a second column register configured to generate the second column compute selection signal based on the input operand.

4. The memory device of claim 3, wherein the first column register is updated based on a first portion of the first output signal and the input operand, and
    wherein the second column register is updated based on a second portion of the first output signal, a first portion of the second output signal, and the input operand.

5. The memory device of claim 4, wherein the column compute control circuit further includes:
    an output register configured to accumulate a second portion of the second output signal.

6. The memory device of claim 5, wherein memory cells connected to a first word line from among the first memory cells store a first computation output pattern,
    wherein memory cells connected to a second word line from among the first memory cells store a second computation output pattern,
    wherein memory cells connected to the first word line from among the second memory cells store a third computation output pattern, and
    wherein memory cells connected to the second word line from among the second memory cells store a fourth computation output pattern.

7. The memory device of claim 6, wherein, when an internal read operation is repeated with respect to the first word line, a value accumulated in the output register corresponds to a result of a first-type computing operation on the input operand, and
    wherein, when an internal read operation is repeated with respect to the second word line, a value accumulated in the output register corresponds to a result of a second-type computing operation on the input operand.

8. The memory device of claim 1, wherein the first cell array and the second cell array are included in a same bank.

9. The memory device of claim 1, wherein the first cell array is included in a different bank than the second cell array.

10. The memory device of claim 1, further comprising:
    a column decoder configured to generate a common column selection signal based on a column address,
    wherein, in a read operation of the memory device,
    the first column selection circuit outputs first read data among outputs of the first bit line sense amplifier based on the common column selection signal, and
    the second column selection circuit outputs second read data among outputs of the second bit line sense amplifier based on the common column selection signal.

11. An operation method of a memory device with a computation function, the operation method comprising:
    loading an input operand comprising data that is operated on by a computation of the computation function;
    setting a plurality of column registers based on the input operand;
    performing a first internal read operation on memory cells of the memory device with respect to a first word line based on a plurality of first column compute selection signals respectively generated from the plurality of column registers;
    updating the plurality of column registers and an output register based on a result of the first internal read operation; and
    performing a second internal read operation on the memory cells of the memory device with respect to the first word line based on a plurality of second column compute selection signals respectively generated from the plurality of column registers that have been updated.

12. The operation method of claim 11, wherein the plurality of first column compute selection signals are independent of each other, and the plurality of second column compute selection signals are independent of each other.

13. The operation method of claim 11, wherein the loading of the input operand includes:

receiving a load command from a controller; and reading the input operand stored in the memory cells based on the load command, and wherein the input operand is not output to the controller.

14. The operation method of claim 11, wherein the setting of the plurality of column registers based on the input operand includes:

receiving a setup command from a controller; and setting the plurality of column registers based on the input operand, based on the setup command.

15. The operation method of claim 11, further comprising:

receiving a store command from a controller; and storing a value of the output register in the memory cells based on the store command.

16. The operation method of claim 11, further comprising:

storing a computation output pattern in the memory cells connected to the first word line, in an initialization operation of the memory device.

17. A memory device with a computation function, the memory device comprising:

a first cell array configured to store a first computation output pattern;

a first bit line sense amplifier configured to sense first voltages of first bit lines connected to the first cell array, and output the first voltages;

a first column selection circuit configured to output a first output signal among the first voltages output by the first bit line sense amplifier based on a first column compute selection signal;

a first column compute control circuit configured to generate the first column compute selection signal based on an input operand that comprises data that is operated on by a computation of the computation function;

a second cell array configured to store a second computation output pattern;

a second bit line sense amplifier configured to sense second voltages of second bit lines connected to the second cell array, and output the second voltages; and a second column selection circuit configured to output a second output signal among the second voltages output by the second bit line sense amplifier based on a second column compute selection signal, wherein, as an internal read operation on the first computation output pattern is repeatedly performed, the first column compute control circuit updates the first column compute selection signal, wherein the first column compute control circuit is configured to generate the second column compute selection signal based on the input operand, and wherein, as an internal read operation on both the first computation output pattern and the second computation output pattern is repeatedly performed, the first column compute control circuit updates the first column compute selection signal and the second column compute selection signal.

18. The memory device of claim 17, wherein the first column compute selection signal is updated based on an output of the first column selection circuit, and wherein the second column compute selection signal is updated based on the output of the first column selection circuit and an output of the second column selection circuit.

19. The memory device of claim 17, further comprising:

a third cell array configured to store a third computation output pattern;

a third bit line sense amplifier configured to sense third voltages of third bit lines connected to the third cell array, and output the third voltages;

a third column selection circuit configured to output a third output signal among the third voltages output by the third bit line sense amplifier based on a third column compute selection signal; and a third column compute control circuit configured to generate the third column compute selection signal based on the input operand, and wherein, as an internal read operation on the third computation output pattern is repeatedly performed, the third column compute control circuit is further configured to update the third column compute selection signal based on a result of the internal read operation on the third computation output pattern and information fed forward from the first column compute control circuit.

* * * * *